United States Patent
Lu

(10) Patent No.: US 12,509,463 B2
(45) Date of Patent: Dec. 30, 2025

(54) JAK INHIBITOR AND PREPARATION METHOD THEREFOR

(71) Applicant: FELICAMED BIOTECHNOLOGY CO., LTD., Guangdong (CN)

(72) Inventor: Tingting Lu, Guangdong (CN)

(73) Assignee: FELICAMED BIOTECHNOLOGY CO., LTD., Guangdong (CN)

( * ) Notice: Subject to any disclaimer, the term of this patent is extended or adjusted under 35 U.S.C. 154(b) by 1188 days.

(21) Appl. No.: 17/426,933

(22) PCT Filed: Dec. 23, 2019

(86) PCT No.: PCT/CN2019/127494
§ 371 (c)(1),
(2) Date: Jul. 29, 2021

(87) PCT Pub. No.: WO2020/155931
PCT Pub. Date: Aug. 6, 2020

(65) Prior Publication Data
US 2022/0106319 A1  Apr. 7, 2022

(30) Foreign Application Priority Data

Jan. 30, 2019 (CN) .......................... 201910088713.0

(51) Int. Cl.
*C07D 487/04* (2006.01)
(52) U.S. Cl.
CPC .................................. *C07D 487/04* (2013.01)
(58) Field of Classification Search
CPC .................................................... C07D 487/04
See application file for complete search history.

(56) References Cited

U.S. PATENT DOCUMENTS

| | | |
|---|---|---|
| 4,551,464 A | 11/1985 | Mueller et al. |
| 8,158,616 B2 | 4/2012 | Rogers et al. |
| 8,618,103 B2 | 12/2013 | De Vicente et al. |
| 8,633,206 B2 | 1/2014 | Promo et al. |
| 9,035,074 B2 | 5/2015 | Brown et al. |
| 9,725,445 B2 | 8/2017 | Childers et al. |
| 9,926,327 B2 | 3/2018 | Stuk et al. |
| 9,957,264 B2 | 5/2018 | Childers et al. |
| 10,174,056 B2 | 1/2019 | Wu et al. |
| 10,253,046 B2 | 4/2019 | Dahlgren et al. |
| 10,640,506 B2 | 5/2020 | Rodgers et al. |
| 11,524,961 B2 | 12/2022 | Wang et al. |
| 2014/0242602 A1 | 8/2014 | Chiosis et al. |
| 2014/0243312 A1 | 8/2014 | Brown et al. |
| 2014/0315909 A1 | 10/2014 | Vankayalapati et al. |
| 2015/0225408 A1 | 8/2015 | Brown et al. |
| 2017/0360794 A1 | 12/2017 | Wu et al. |
| 2018/0051027 A1 | 2/2018 | Lim et al. |
| 2018/0072720 A1 | 3/2018 | Vechorkin et al. |
| 2018/0179209 A1 | 6/2018 | Wu et al. |
| 2019/0330215 A1 | 10/2019 | Zhou et al. |

FOREIGN PATENT DOCUMENTS

| | | | |
|---|---|---|---|
| CA | 3093706 | 9/2019 | |
| CN | 102026999 | 4/2011 | |
| CN | 102131812 | 7/2011 | |
| CN | 102574860 | 7/2012 | |
| CN | 103415515 | 8/2015 | |
| CN | 105008362 | 10/2015 | |
| CN | 105153150 | 12/2015 | |
| CN | 105189508 | 12/2015 | |
| CN | 108341820 | 7/2018 | |
| CN | 108699072 | 10/2018 | |
| EP | 2360158 | 8/2011 | |
| EP | 4105214 | 12/2022 | |
| JP | 2016514709 | 5/2016 | |
| JP | 2016518344 | 6/2016 | |
| KR | 20150109434 | 10/2015 | |
| RU | 2538204 | 1/2015 | |
| TW | I788655 | 1/2023 | |
| WO | WO-2005085249 A1 * | 9/2005 | ................ A61P 1/04 |

(Continued)

OTHER PUBLICATIONS

International Search Report and Written Opinion and English Translation for corresponding PCT/CN2019/127494, mailed Mar. 31, 2020, 9 pages.
International Preliminary Report on Patentability and English Translation for corresponding PCT/CN2019/127494, issued Jul. 27, 2021, 4 pages.
Extended European Search Report for corresponding EP Application No. 19913097.2, dated Feb. 9, 2022, 2 pages.
Wang, J., Zhang, J., Miao, K., Yun, H., Shen, H. C., Zhao, W., & Liang, C. (2017). Eaton's reagent-mediated metal-free and efficient synthesis of NH-sulfoximines, Tetrahedron Letters, 58(4), 333-337. doi:10.1016/j.tetlet.2016.12.031.
Sirvent JA, Lucking U. Novel Pieces for the Emerging Picture of Sulfoximines in Drug Discovery: Synthesis and Evaluation of Sulfoximine Analogues of Marketed Drugs and Advanced Clinical Candidates. ChemMedChem. Apr. 6, 2017;12(7):487-501. doi: 10.1002/cmdc.201700044. Epub Mar. 22, 2017. PMID: 28221724; PMCID: PMC5485063.

(Continued)

*Primary Examiner* — John S Kenyon
(74) *Attorney, Agent, or Firm* — NIXON & VANDERHYE, PC

(57) ABSTRACT

The present invention provides a compound represented by a general formula I and a pharmaceutically acceptable salt, stereisomer, ester, prodrug, metabolite, solvate, or deuterated compound thereof. The compound is a JAK inhibitor and can prevent and/or treat an inflammatory disease or cancer in humans and/or animals.

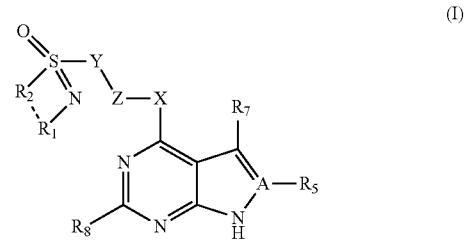

(I)

18 Claims, No Drawings

(56) References Cited

FOREIGN PATENT DOCUMENTS

| WO | 2009089851 | 7/2009 |
|---|---|---|
| WO | 2010020905 | 2/2010 |
| WO | 2010135650 | 11/2010 |
| WO | 2011/075334 A1 | 6/2011 |
| WO | 2011078143 | 6/2011 |
| WO | 2011154737 | 12/2011 |
| WO | 2013041634 | 3/2013 |
| WO | 2014/015107 A1 | 1/2014 |
| WO | 2016192563 | 12/2016 |
| WO | 2017143014 | 8/2017 |
| WO | 2018177899 | 10/2018 |

OTHER PUBLICATIONS

Sehgelmeble et al., "Sulfonimidamides as Sulfonamides Bioisosteres: Rational Evaluation through Synthetic, in Vitro, and in Vivo Studies with g-Secretase Inhibitors", ChemMedChem 2012, pp. 396-399.
Roskoski Jr., "Janus kinase (JAK) inhibitors in the treatment of inflammatory and neoplastic diseases", Blue Ridge Institute for Medical Research, Pharmacological Research, 2016, 87 pages.
Kier et al., "Bioisosterism: Quantitation of Structure and Property Effects", Chemistry & Biodiversity, vol. 1, 2004, pp. 138-151.
Olivera et al., "JAK inhibition in inflammatory bowel disease", Expert Review of Clinical Immunology, Feb. 7, 2017, 29 pages.
STN Registry Search Results, 8 pages, including 25 registration Nos. RN 1206144-12-8 etc., with STN entry dates from Feb. 11, 2010 to Oct. 21, 2016; provided by the Chinese Patent Office in counterpart Chinese Application No. 201911336860.1.
Fuchi, Pharmaceutical Society of Japan, 49:254 (2013); see relevance in NPL7.
Office Action in Japanese corresponding Application No. 2021-543513, dated Aug. 3, 2022, 6 pages.
Office Action in related BR Application No. 1120210145257, dated Aug. 1, 2024, 8 pages.
Office Action in related KR Application No. 10-2021-7027469, dated Jan. 6, 2025, 18 pages.
Office Action in related PH Application No. 1/2021/551844, dated Jan. 5, 2025, 5 pages.
Office Action and Search Report in related CO Application No. 20210010415, dated Sep. 2, 2024, 34 pages.

* cited by examiner

JAK INHIBITOR AND PREPARATION METHOD THEREFOR

This application is the U.S. national phase of International Application No. PCT/CN2019/127494 filed Dec. 23, 2019 which designated the U.S. and claims priority to CN patent application No. 201910088713.0 filed Jan. 30, 2019, the entire contents of each of which are hereby incorporated by reference.

FIELD OF THE INVENTION

The present invention belongs to the field of medicine and particualrly relates to a JAK inhibitor and a preparation method thereof.

BACKGROUND OF THE INVENTION

JAK-STAT signal pathway is a signal transduction pathway stimulated by cytokines to participate in cell proliferation, differentiation, apoptosis, immunoregulation and other lots of important biological processes. Compared with other signal pathway, this signal pathway has a relatively simple transmission process, and mainly consists of three components, namely, tyrosine kinase associated receptor, Janus kinase (JAK) and signal transducer and activator of transcription (STAT).

Tyrosine kinase associated receptor, lots of cytokines and growth factors, including interleukins 2-7 (IL-2-7), GM-CSF (granulocyte/macrophage colony stimulating factor), GH (growth hormone), EGF (epidermal growth factor), PDGF (platelet-derived growth factor), IFN (interferon), and the like, transmit signals through the JAK-STAT signal pathway. These cytokines and growth factor have corresponding receptors on cell membrane. The common characteristic of these receptors is that the receptors themselves have no kinase activity, but have binding sites to JAK in their intracellular domains. After binding to a ligand, the receptors are activated by JAK bound thereto to phosphorylate tyrosine residues of various target proteins, thus achieving signal transmission from extracellular to intracellular.

Many tyrosine kinases are cell-membrane receptors which are collectively referred to receptor tyrosine kinase (RTK); while JAK is a non-transmembrane tyrosine kinase. JAK is abbreviated for Janus kinase; and in Roman mythology, Janus is the double-faced god in charge of beginning and end. The reason why it is called Janus kinase is that JAK can not only phosphorylate cytokine receptors bound thereto, but also can phosphorylate multiple signal molecules containing specific SH2 domains. JAK protein family includes 4 members: JAK1, JAK2, JAK3 and Tyk2; they have 7 JAK homology domains (JH) in structure, where JH1 domain is a kinase domain, JH2 domain is a "fake" kinase domain; JH6 and JH7 are receptor binding domains.

STAT is called "signal transducer and activator of transcription". Just as its name implies, STAT plays a critical role in signal transduction and transcriptional activation. At present, 6 members of the STAT family have been found, namely, STAT1-STAT6. STAT protein can be divided into the following several functional segments in its structure: N-terminal conserved sequence, DNA binding domain, SH3 domain, SH2 domain and C-terminal transcription activation domain. The most conserved and functionally improtant segment in sequence is the SH2 domain which has a core sequence "GTFLLRFSS" the very same as the SH2 domain of tyrosine kinase Src.

The JAK-STAT signal pathway has extensive functions, and participates in cell proliferation, differentiation, apoptosis, immunoregulation and other lots of important biological processes. Currently, researches associated with disease and medicament innovation are focused on inflammatory diseases and neoplastic diseases. The inflammatory diseases include rheumatoid arthritis, canine dermatitis, psoriasis, ulcerative colitis and Crohn's disease; and the neoplastic diseases mainly involve myelofibrosis, polycythemia vera, and idiopathic thrombocythemia. Moreover, mutations of the JAK molecule itself may also lead to acute myelocytic leukemia (AML), acute lymphocytic leukemia (ALL), breast ductal carcinoma and non-small cell lung cancer (NSCLC), and the like.

JAK inhibitors may selectively inhibit JAK kinase to block the JAK-STAT pathway. At present, the JAK inhibitors which have been approved by the FDA include Tofacitinib, Ruxolitinib, Oclacitinib, and Baricitinib. Oclacitinib is a novel JAK inhibitor, and meanwhile can inhibit the functions of JAK1-dependent cytokine in some antiallergic, inflammatory and pruritus reactions. Researches show that after laboratory animals (dogs) were orally administered 0.4-0.6 mg/kg dosage twice a day, Oclacitinib is safe and effective in the treatment of pruritus caused by atopic dermatitis, and show better efficacy than oral corti costeroids such as prednisolone. During the treatment, the administration of Oclacitinib can relieve itching within 24 h, and more than 50% pruritus reaction have been relieved on the $7^{th}$ day for exceeding 70% laboratory animals. Oclacitinib has been approved by the FDA in 2013 to be used for controlling pruritus and atopic dermatitis caused by allergic dermatitis of canoidea, currently. Although Oclacitinib has good efficacy to allergic dermatitis of pet dogs, since Oclacitinib has little effect on cytokines not participating in the activation of JAK1, effects of Oclacitinib on allergic reaction are limited to only the stage of inhibiting the release of allergic mediators, it cannot directly block binding of the allergic mediators to related receptors, thus cannot fundamentally block development and progression of allergic dermatitis, thus limiting the application scope of Oclacitinib. Another JAK inhibitor Baricitinib is a selective JAK1 and JAK2 inhibitor with $IC_{50}$ of 5.9 nM and 5.7 nM, respectively, which is 70 and 10 folds around than the selectivity acting on JAK3 and Tyk2, while has no inhibiting effect on c-Met and Chk2. Baricitinib is a rheumatoid arthritis medicament developed by Eli Lilly and Company together with its partner Incyte, and has relatively single indication. Other indications, such as psoriasis and diabetic nephropathy, of Baricitinib are in the course of phase-II clinical development. To improve the defects of the prior art and expand the application scope of such JAK inhibitors, the present invention provides a JAK inhibitor capable of being applied in humans and animals, which has the advantages of good efficacy, wide range of action and low toxicity.

SUMMARY OF THE INVENTION

An objective of the present invention is to provide a JAK inhibitor, and another objective of the present invention is to provide a preparation method of a JAK inhibitor.

The objectives of the present invention are achieved by the following technical solutions:

The present invention provides a compound represented by general formula I:

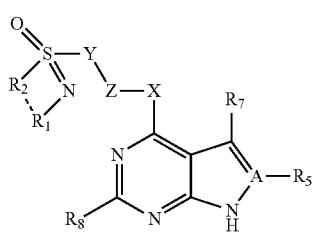
(I)

wherein A is selected from C or N; when A is N, $R_5$ is absent; and when A is C, $R_5$ is selected from: H, halogen, hydroxy, cyano, substituted or unsubstituted alkyl, substituted or unsubstituted haloalkyl, substituted or unsubstituted alkoxy, substituted or unsubstituted hydroxyalkyl, substituted or unsubstituted cycloalkyl, substituted or unsubstituted heterocycloalkyl, substituted or unsubstituted amino, substituted or unsubstituted sulfo, and substituted or unsubstituted sulfonyl.

Preferably, the $R_5$ is selected from: H, $C_{1-3}$ alkyl, and —$OC_{0-2}$ alkyl.

More preferably, the $R_5$ is selected from: H, and —$CH_3$.

X is selected from: —O— or

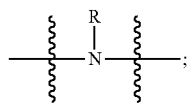

R is selected from: H, $C_{1-10}$ linear or branched alkyl, $C_{1-10}$ linear or branched alkenyl, $C_{1-10}$ linear or branched alkynyl, $C_{6-18}$ aryl, $C_{6-18}$ heterocycloaryl, $C_{3-10}$ cycloalkyl, —$OC_{0-10}$ alkyl, and —O heterocycloalkyl; H attached to carbon atoms may be substituted by the following groups: deutero, hydroxy, halogen, —CN, —$OCH_2F$, —$OCHF_2$, —$OCF_3$, $C_{1-10}$ linear or branched alkyl, —$N(C_{0-10}$ alkyl)($C_{0-10}$ alkyl), —$OC_{0-10}$ alkyl, $C_{3-10}$ cycloalkyl, —O heterocycloalkyl, —N heterocycloalkyl, —S heterocycloalkyl, $C_{6-18}$ aryl, —N heterocycloaryl, —O heterocycloaryl, or —S heterocycloaryl; wherein, an alkyl moiety of the groups may be optionally substituted by any one or more of the following groups: —$SO_2$, —$SO_2N(C_{0-10}$ alkyl)($C_{0-10}$ alkyl), —$N(C_{0-10}$ alkyl)$SO_2(C_{0-10}$ alkyl), —$CON(C_{0-10}$ alkyl)($C_{0-10}$ alkyl), —$N(C_{0-10}$ alkyl)$CO(C_{0-10}$ alkyl), —$N(C_{0-10}$ alkyl)$COO(C_{0-10}$ alkyl), —$OCON(C_{0-10}$ alkyl)($C_{0-10}$ alkyl), halogen, —CN, —$OCH_2F$, —$OCHF_2$, —$OCF_3$, —$N(C_{0-10}$ alkyl)($C_{0-10}$ alkyl), —$OC_{0-10}$ alkyl, $C_{6-18}$ aryl, —N heterocycloaryl, —O heterocycloaryl or —S heterocycloaryl.

Preferably, the X is selected from:

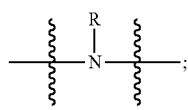

R is selected from: H, $C_{1-10}$ linear alkyl, and $C_{3-10}$ cycloalkyl; H attached to carbon atoms may be substituted by the following groups: deutero, hydroxy, halogen, —CN, —$OCH_2F$, —$OCHF_2$, —$OCF_3$, $C_{1-3}$ linear alkyl, —$N(C_{0-3}$ alkyl)($C_{0-3}$ alkyl), —$OC_{0-6}$ alkyl, and $C_{3-8}$ cycloalkyl; wherein an alkyl moiety of the groups may be optionally substituted by any one or more of the following groups: —$SO_2$, —$SO_2N(C_{0-10}$ alkyl)($C_{0-10}$ alkyl), —$N(C_{0-10}$ alkyl) $SO_2(C_{0-10}$ alkyl), —$CON(C_{0-10}$ alkyl)($C_{0-10}$ alkyl), —$N(C_{0-10}$ alkyl)$CO(C_{0-10}$ alkyl), —$N(C_{0-10}$ alkyl)$COO(C_{0-10}$ alkyl), —$OCON(C_{0-10}$ alkyl)($C_{0-10}$ alkyl), halogen, —CN, —$OCH_2F$, —$OCHF_2$, —$OCF_3$, —$N(C_{0-10}$ alkyl)($C_{0-10}$ alkyl), —$OC_{0-10}$ alkyl, $C_{6-18}$ aryl, —N heterocycloaryl, —O heterocycloaryl or —S heterocycloaryl.

More preferably, the X is selected from:

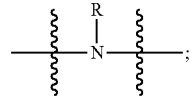

R is selected from $C_{1-6}$ linear alkyl; H attached to carbon atoms may be substituted by the following groups: deutero, hydroxy, —CN, —$OCH_2F$, —$OCHF_2$, —$OCF_3$, $C_{1-3}$ linear alkyl, or $C_{3-6}$ cycloalkyl.

In preferred embodiments of the present invention, the X is

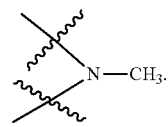 [SMILES: *N(*)C]

Y is selected from:

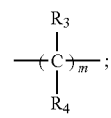

$R_3$ and $R_4$ are independently selected from: H, halogen, —CN, $C_{1-10}$ linear alkyl, $C_{3-10}$ cycloalkyl, —$CF_3$, —$OCF_3$, —$OCHF_2$, —$OCH_2F$, substituted or unsubstituted haloalkyl, substituted or unsubstituted aryl, substituted or unsubstituted alkenyl, substituted or unsubstituted alkynyl, —$OC_{0-10}$ alkyl, —$S(O)_mC_{0-10}$ alkyl, —$SO_2N(C_{0-10}$ alkyl)($C_{0-10}$ alkyl), —$N(C_{0-10}$ alkyl)($C_{0-10}$ alkyl), —$N(C_{0-10}$ alkyl)C (=O)($C_{0-10}$ alkyl), —$N(C_{0-10}$ alkyl)C(=O)O($C_{0-10}$ alkyl), —$N(C_{0-10}$ alkyl)C(=O)N($C_{0-10}$ alkyl), —C(=O)$C_{0-10}$ alkyl, —C(=O)O$C_{0-10}$ alkyl, —C(=O)N($C_{0-10}$ alkyl) ($C_{0-10}$ alkyl), —O heterocycloalkyl, —$N(C_{0-10}$ alkyl) heterocycloalkyl, —$N(C_{0-10}$ alkyl) heterocycloaryl, —S heterocycloaryl or —O heterocycloaryl, wherein, the heterocycloalkyl may be substituted by any one or more of the following groups: oxygen, $C_{1-10}$ alkyl, $C_{1-10}$ alkenyl, $C_{1-10}$ alkynyl, $C_{6-18}$ aryl, C(=O)O$C_{0-10}$ alkyl, C(=O)N($C_{0-10}$ alkyl)($C_{0-10}$ alkyl), —$SO_2N(C_{0-10}$ alkyl)($C_{0-10}$ alkyl) or $SO_2C_{1-10}$ alkyl, wherein, an alkyl moiety may be optionally substituted by any one or more of the following groups: hydroxy, —$OC_{1-10}$ alkyl, —$N(C_{0-10}$ alkyl)($C_{0-10}$ alkyl), —C(=O)N($C_{0-10}$ alkyl)($C_{0-10}$ alkyl), C(=O)O$C_{0-10}$ alkyl, $C_{6-18}$ aryl, heterocycloalkyl or heterocycloaryl, and m is any integer of 0-6, such as, 0, 1, 2, 3, 4, 5 or 6.

Preferably, the $R_3$ and $R_4$ are independently selected from: H, halogen, —CN, $C_{1-6}$ linear alkyl, and $C_{3-6}$ cycloalkyl; an alkyl moiety may be optionally substituted by any one or more of the following groups: hydroxy, —$OC_{1-10}$ alkyl, —$N(C_{0-10}$ alkyl)($C_{0-10}$ alkyl), $C_{6-18}$ aryl, heterocycloalkyl or heterocycloaryl; and m is selected from 0, 1, 2, 3 or 4;

More preferably, the $R_3$ and $R_4$ are independently selected from: H; and m is selected from 0, 1, or 2.

Z is selected from: $C_{1-10}$ linear or branched alkyl, $C_{1-10}$ linear or branched alkenyl, $C_{1-10}$ linear or branched alkynyl, substituted or unsubstituted hydroxyalkyl, $C_{3-12}$ cycloalkyl, $C_{1-20}$ alkoxy, $C_{3-12}$ cycloalkoxy, heterocycloalkyl (—N, —O, and —S), $C_{6-18}$ aryl, —N heterocycloaryl, —S heterocycloaryl, or —O heterocycloaryl, aromatic dicyclo, aromatic heterodicyclo, and tricyclo, wherein the alkyl moiety may be optionally substituted by any one or more of the following groups: —N($C_{0-10}$ alkyl)($C_{0-10}$ alkyl), —CON($C_{0-10}$ alkyl)($C_{0-10}$ alkyl), —N($C_{0-10}$ alkyl)CO($C_{0-10}$ alkyl), —N($C_{0-10}$ alkyl)COO($C_{0-10}$ alkyl), —OCON($C_{0-10}$ alkyl)($C_{0-10}$ alkyl), halogen, —CN, —OCH$_2$F, —OCHF$_2$, —OCF$_3$, —O$C_{0-10}$ alkyl, $C_{6-18}$ alkyl, —N heterocycloaryl, —O heterocycloaryl or —S heterocycloaryl.

Preferably, the Z is selected from: $C_{3-12}$ cycloalkyl or $C_{3-12}$ cycloalkoxy; wherein the alkyl moiety may be optionally substituted by any one or more of the following groups: —N($C_{0-10}$ alkyl)($C_{0-10}$ alkyl), —CON($C_{0-10}$ alkyl)($C_{0-10}$ alkyl), —N($C_{0-10}$ alkyl)CO($C_{0-10}$ alkyl), —N($C_{0-10}$ alkyl)COO($C_{0-10}$ alkyl), —OCON($C_{0-10}$ alkyl)($C_{0-10}$ alkyl), halogen, —CN, —OCH$_2$F, —OCHF$_2$, —OCF$_3$, —O$C_{0-10}$ alkyl, $C_{6-18}$ alkyl, —N heterocycloaryl, —O heterocycloaryl or —S heterocycloaryl.

More preferably, the Z is

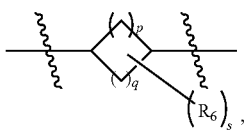

wherein p is any integer of 0-4; q is any integer of 0-4; p and q are not 0 at the same time; $R_6$ is a substituent of H attached to one or more carbon atoms of the cycloalkyl; $R_6$ is selected from: $C_{1-6}$ alkyl, and $C_{3-6}$ cycloalkyl, and s is an integer of 0-8; such as, 0, 1, 2, 3, 4, and 5.

Preferably, the $R_6$ is selected from: $C_{1-3}$ alkyl.

More preferably, the $R_6$ is selected from: —CH$_3$, and —CH$_2$CH$_3$.

In preferred embodiments of the present invention, the Z is selected from: $C_{4-10}$ cycloalkyl, such as,

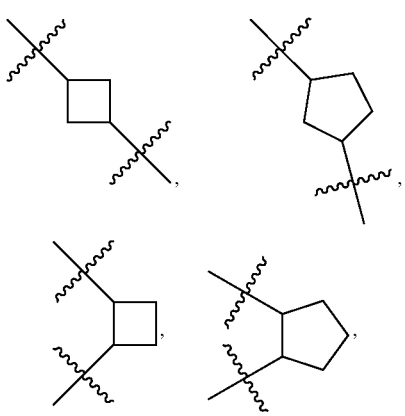

-continued

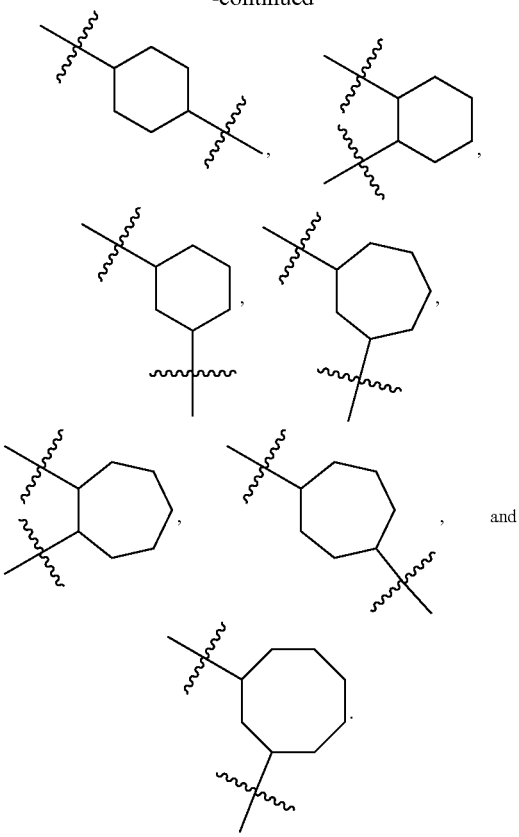

Most preferably, the Z is

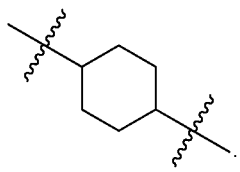 [SMILES: *C1CCC(*)CC1]

$R_7$ and $R_8$ are independently selected from: H, halogen, hydroxy, cyano, substituted or unsubstituted alkyl, substituted or unsubstituted alkenyl, substituted or unsubstituted alkynyl, substituted or unsubstituted haloalkyl, substituted or unsubstituted alkoxy, substituted or unsubstituted hydroxyalkyl, substituted or unsubstituted cycloalkyl, substituted or unsubstituted non-heterocycloaryl, substituted or unsubstituted heterocycloaryl, substituted or unsubstituted heterocycloalkyl, substituted or unsubstituted amino, substituted or unsubstituted sulfo, and substituted or unsubstituted sulfonyl.

Preferably, the $R_7$ and $R_8$ are independently selected from: H, $C_{1-3}$ alkyl, and —O$C_{0-2}$ alkyl.

More preferably, the $R_7$ and $R_8$ are independently selected from: H, and —CH$_3$.

The compound of the present invention has the following structure:

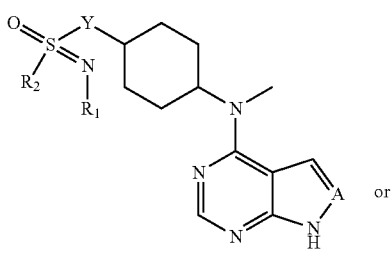

(II)

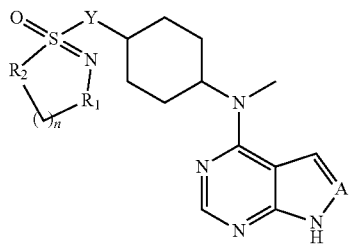

(III)

or wherein, n is a positive integer of 1-4; preferably, the n is 1 or 2; at this time, the compound represented by general formula III has the following structural formula:

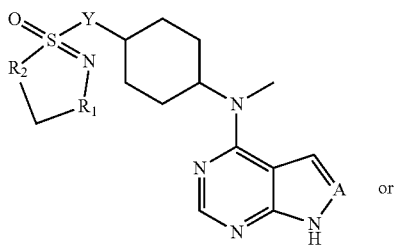

(IV)

or

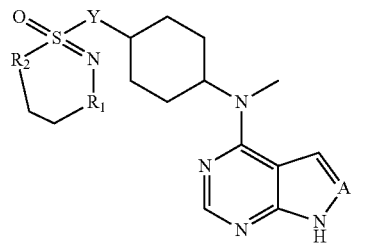

(V)

$R_1$ are $R_2$ are independently selected from: H, halogen, —CN, —OCH$_2$F, —OCHF$_2$, —OCF$_3$, C$_{1-10}$ linear or branched alkyl, C$_{3-10}$ cycloalkyl, —OC$_{0-10}$ alkyl, —N(C$_{0-10}$ alkyl)(C$_{0-10}$ alkyl), —O heterocycloalkyl, —N heterocycloalkyl —S heterocycloalkyl, C$_{6-18}$ aryl, —N heterocycloaryl, —S heterocycloaryl or —O heterocycloaryl, wherein, H attached to carbon or nitrogen atoms may be substituted by the following groups: deutero, hydroxy, halogen, —CN, —OCH$_2$F, —OCHF$_2$, —OCF$_3$, C$_{1-6}$ linear alkyl, —N(C$_{0-10}$ alkyl)(C$_{0-10}$ alkyl), —OC$_{0-10}$ alkyl, C$_{3-10}$ cycloalkyl, —O heterocycloalkyl, —N heterocycloalkyl, —S heterocycloalkyl, C$_{6-18}$ aryl (e.g., phenyl), —N heterocycloaryl, —O heterocycloaryl or —S heterocycloaryl; wherein H on the C$_{6-18}$ aryl (e.g., phenyl) or heterocycloaryl may be substituted by any one or more of the following groups: halogen, C$_{1-4}$ linear alkyl, —N(C$_{0-10}$ alkyl) SO$_2$(C$_{0-10}$ alkyl), —CON(C$_{0-10}$ alkyl)(C$_{0-10}$ alkyl), N(C$_{0-10}$ alkyl)CO(C$_{0-10}$ alkyl), —N(C$_{0-10}$ alkyl)COO(C$_{0-10}$ alkyl), —OCON(C$_{0-10}$ alkyl)(C$_{0-10}$ alkyl), —CN, —OCH$_2$F, —OCHF$_2$, —OCF$_3$, —N(C$_{0-10}$ alkyl)(C$_{0-10}$ alkyl), —OC$_{0-10}$ alkyl, —N heterocycloaryl, —O heterocycloaryl or —S heterocycloaryl, or wherein adjacent carbon atoms on the C$_{6-18}$ aryl (e.g., phenyl) and heterocycloaryl form C$_{3-8}$ cycloalkyl, —O heterocycloalkyl, —N heterocycloalkyl, —S heterocycloalkyl, or —N heterocycloaryl, —O heterocycloaryl, —S heterocycloaryl; or $R_1$, $R_2$, S and N atoms therebetween form a heterocyclic ring; and preferably, the heterocyclic ring is a five-membered heterocyclic ring or six-memebered heterocyclic ring.

Preferably, $R_1$ is selected from: H, C$_{1-6}$ linear alkyl, C$_{3-6}$ cycloalkyl; and H attached to carbon atoms may be substituted by the following groups: deutero, hydroxy, halogen, —CN, —OCF$_3$, —N(C$_{0-10}$ alkyl)(C$_{0-10}$ alkyl), —OC$_{0-4}$ alkyl, C$_{3-10}$ cycloalkyl, —O heterocycloalkyl, —N heterocycloalkyl, and C$_{6-18}$ aryl (e.g., phenyl).

More preferably, $R_1$ is selected from: H, —CH$_2$—, —CH$_3$, —CH$_2$CH$_3$, —CH$_2$CH$_2$CH$_3$, —CH$_2$CH$_2$OCH$_3$,

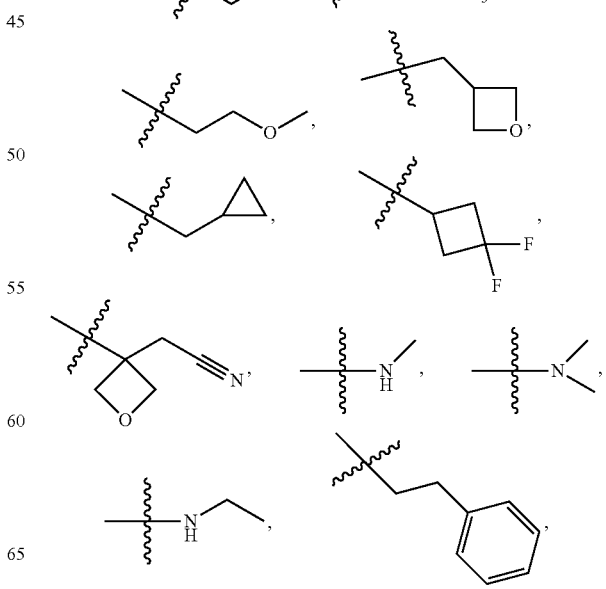

Preferably, $R_2$ is selected from: C$_{1-6}$ linear alkyl, C$_{3-6}$ cycloalkyl, C$_{3-8}$ cycloalkoxy, —N(C$_{0-10}$ alkyl)(C$_{0-10}$ alkyl), C$_{6-18}$ aryl (e.g., phenyl), —N heterocycloaryl; H attached to carbon or nitrogen atoms may be substituted by one or more of the following groups: deutero, hydroxy, halogen, —CN, OCH$_2$F, —OCHF$_2$, —OCF$_3$, C$_{1-3}$ linear alkyl, —N(C$_{0-10}$ alkyl)(C$_{0-10}$ alkyl), —OC$_{0-10}$ alkyl, C$_{3-10}$ cycloalkyl, —O heterocycloalkyl, —N heterocycloalkyl, C$_{6-18}$ aryl (e.g., phenyl), —N heterocycloaryl, —O heterocycloaryl or —S heterocycloaryl; adjacent carbon atoms on the phenyl or heterocycloaryl form C$_{3-8}$ cycloalkyl, —O heterocycloalkyl, —N heterocycloalkyl, —S heterocycloalkyl, or —N heterocycloaryl, —O heterocycloaryl.

More preferably, $R_2$ is selected from: —CH$_2$—,

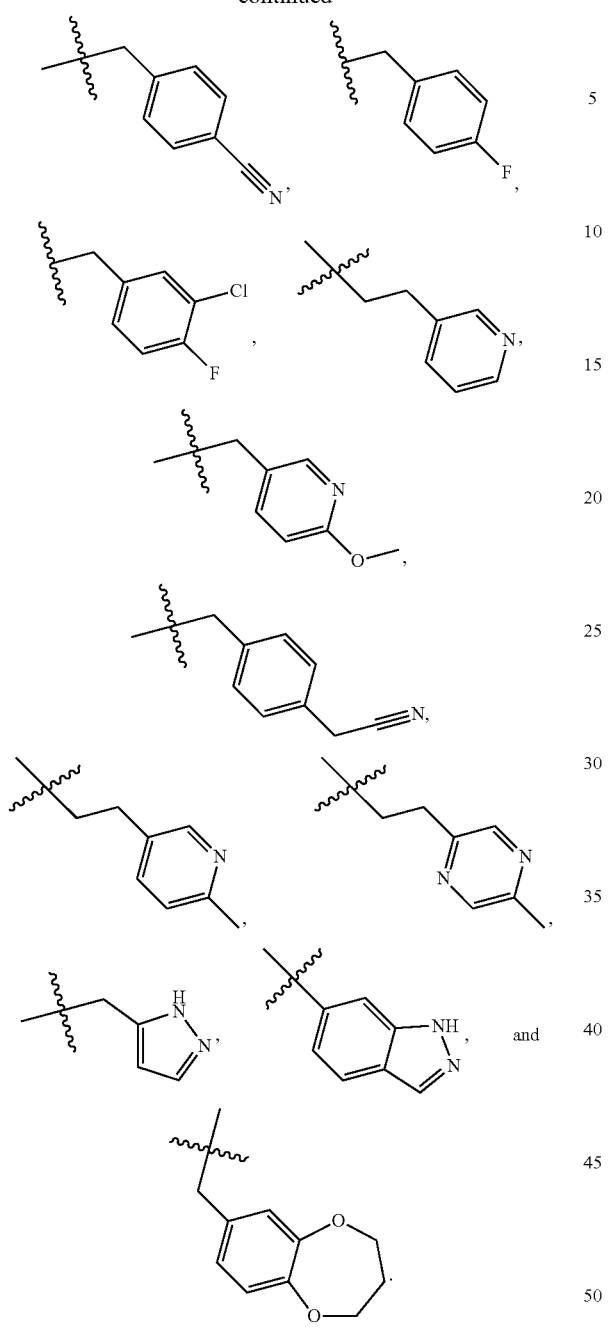
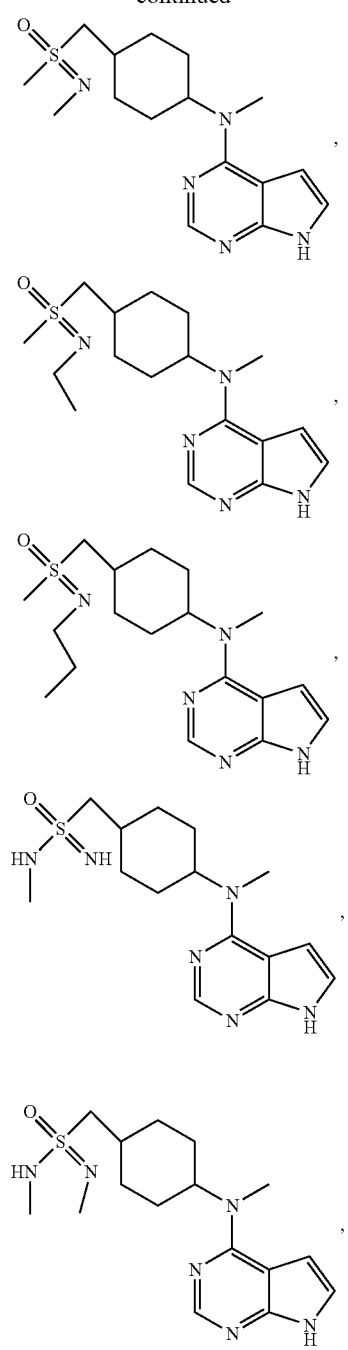
In embodiments of the present invention, provided are the following specific compounds:
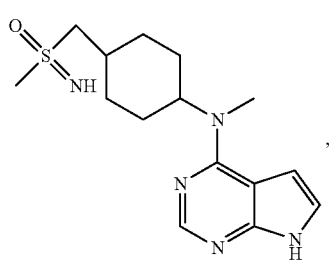
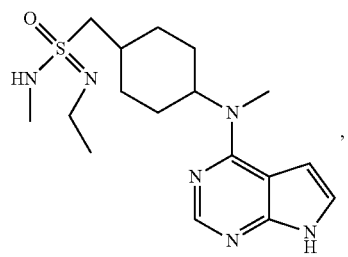

11
-continued
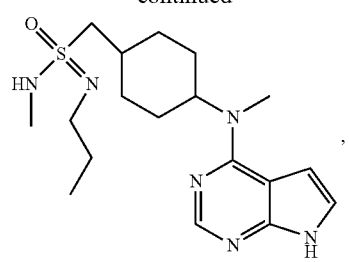
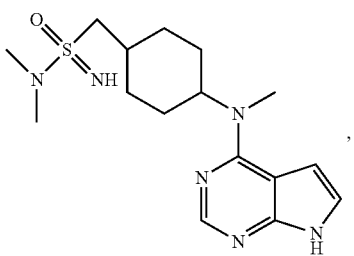
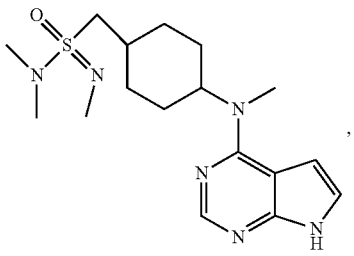
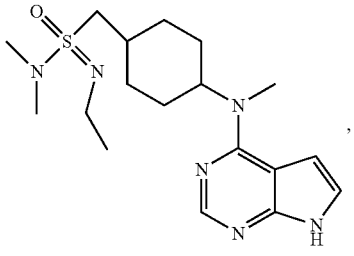
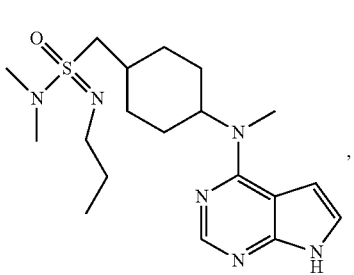
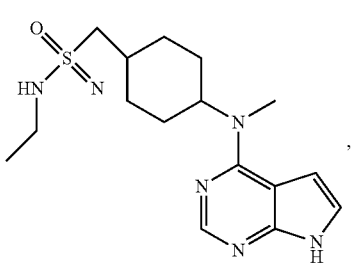
12
-continued
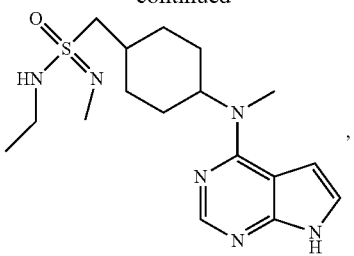
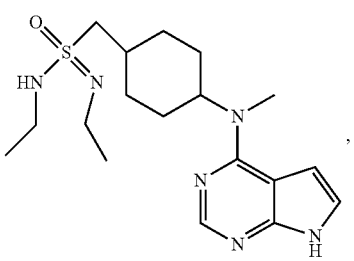
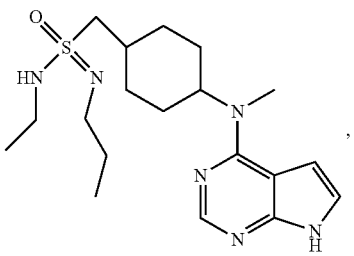
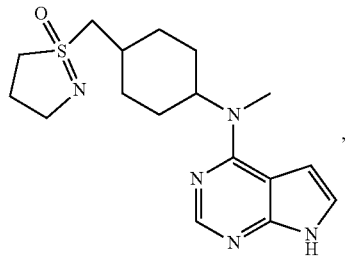
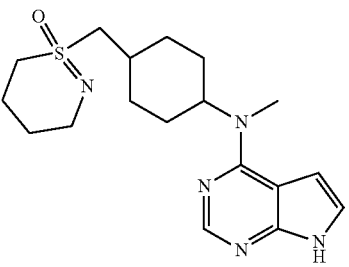
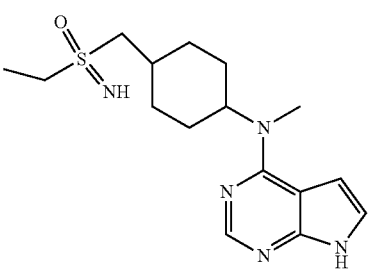

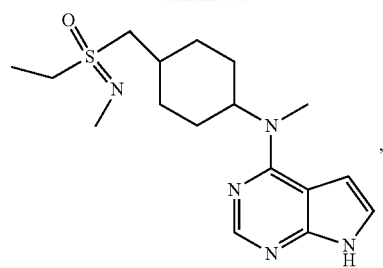,
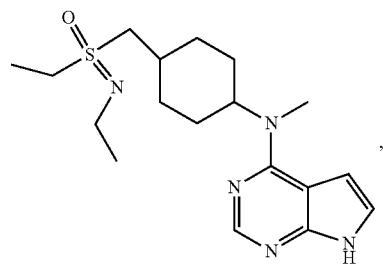,
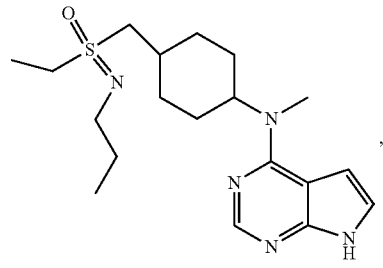,
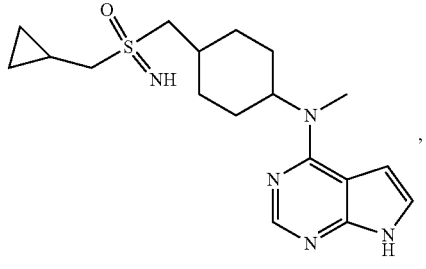,
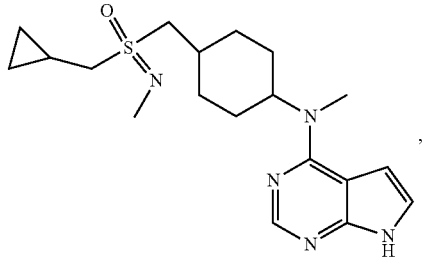,
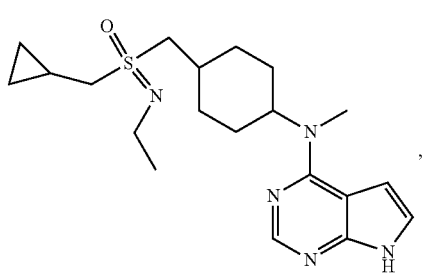,
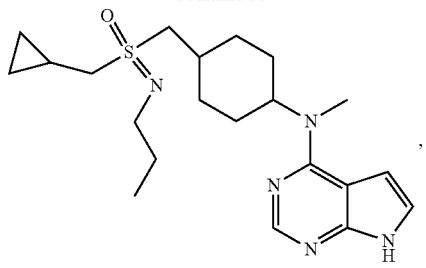,
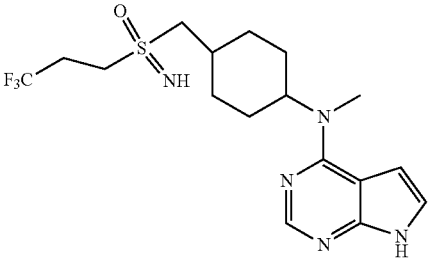,
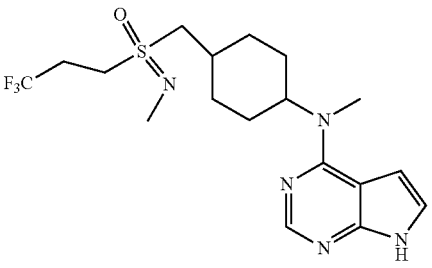,
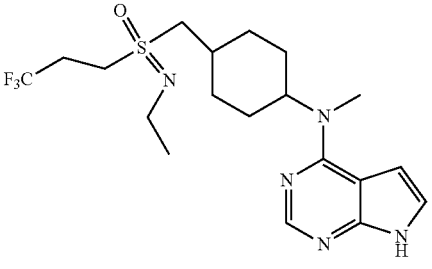,
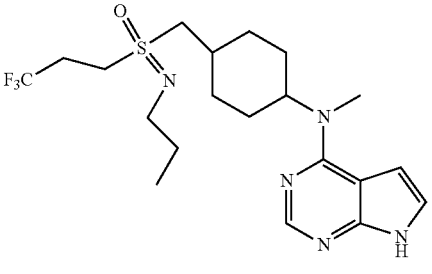,
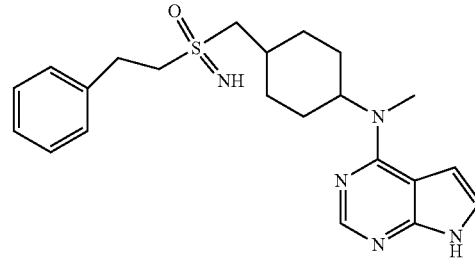, -continued
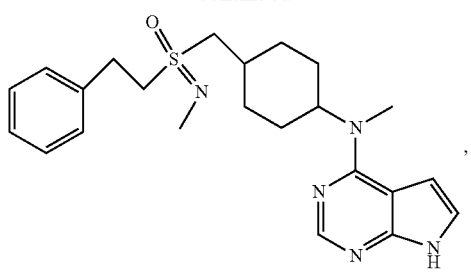
,
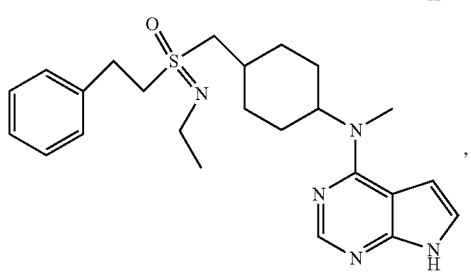
,
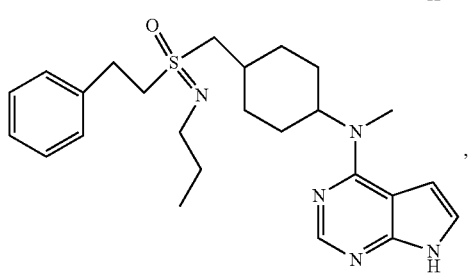
,
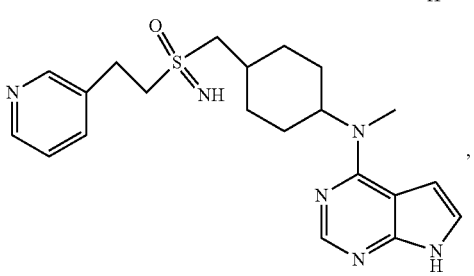
,
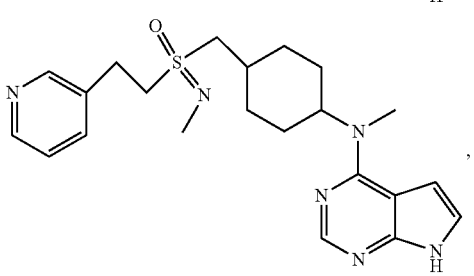
,
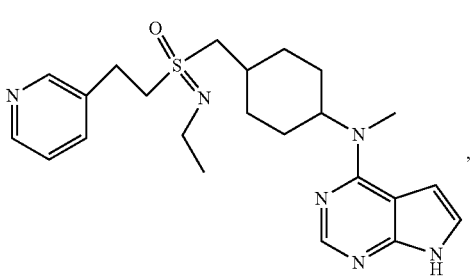
,
-continued
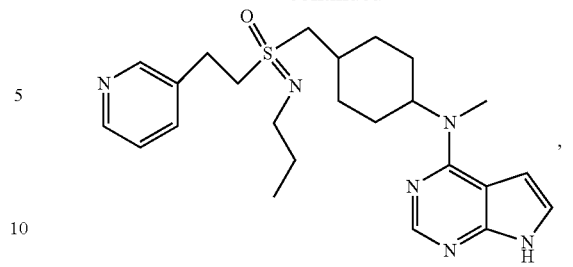
,
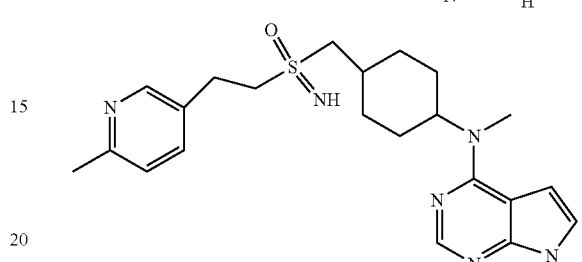
,
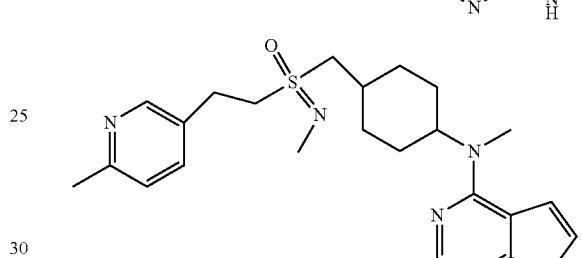
,
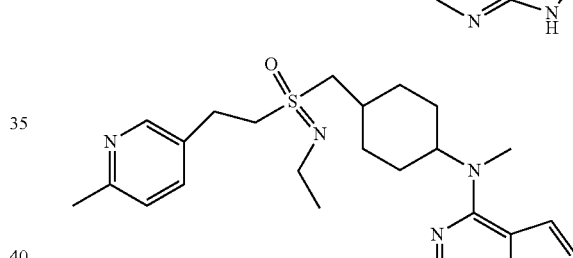
,
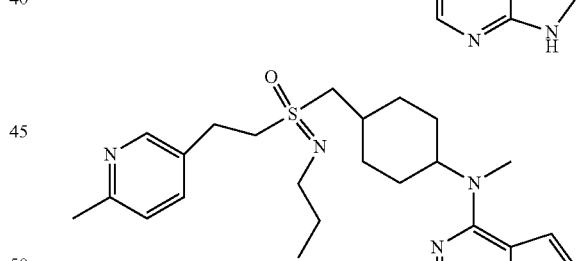
,
,

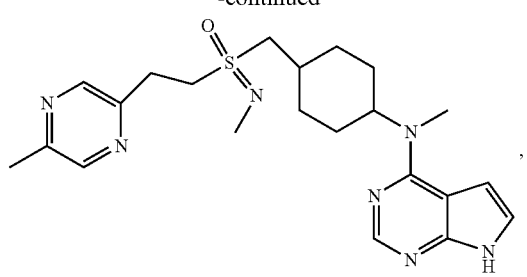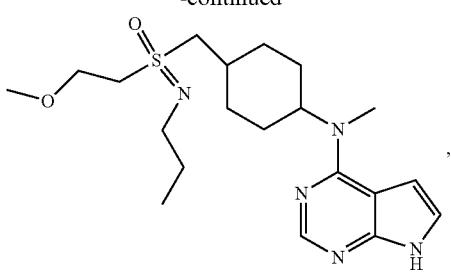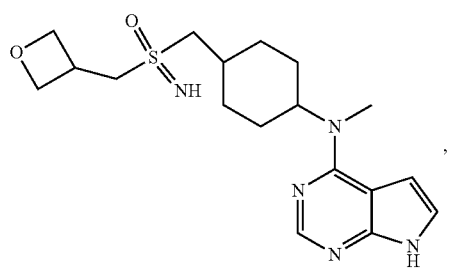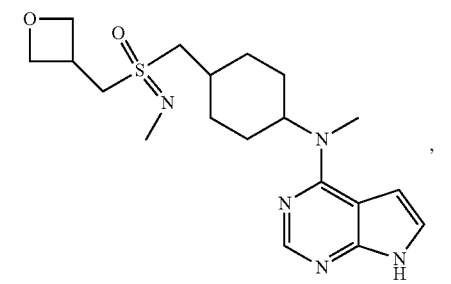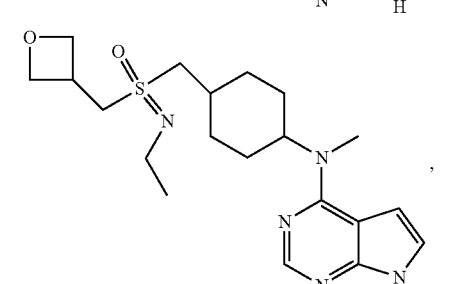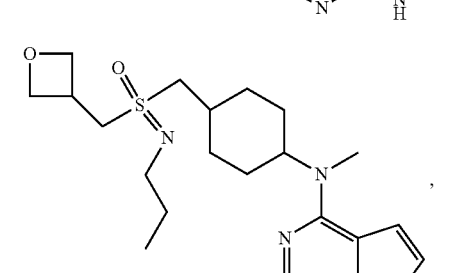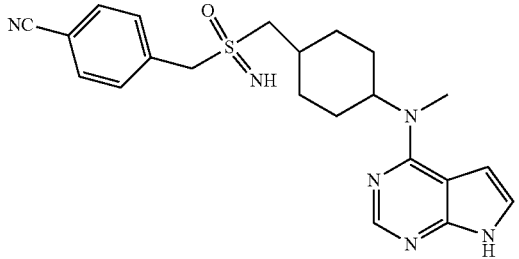

-continued
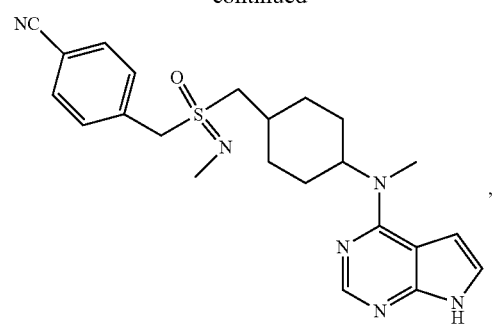
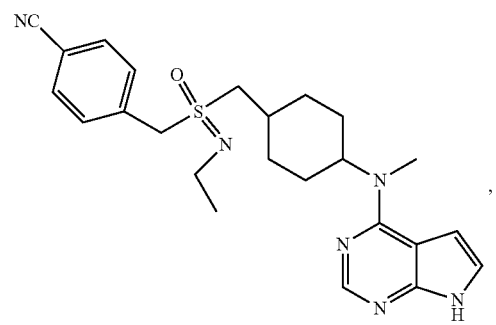
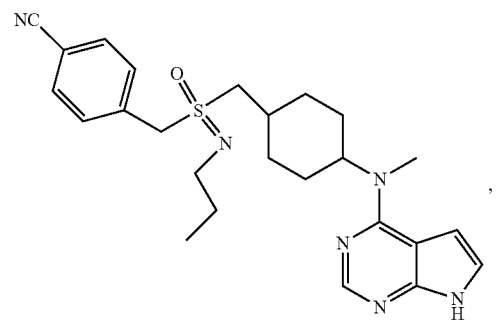
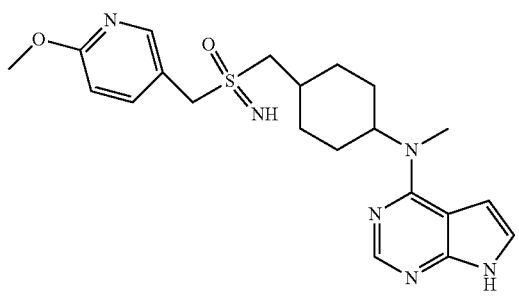
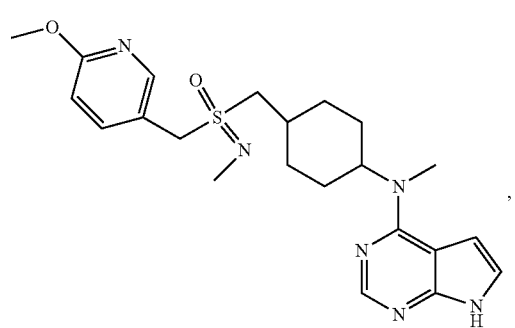
-continued
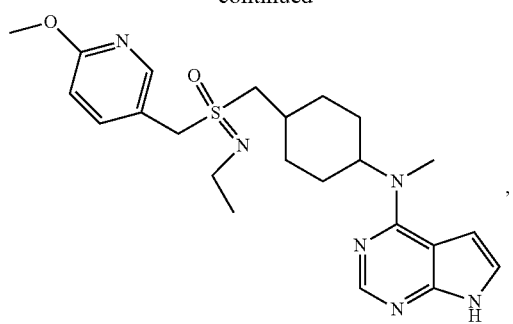
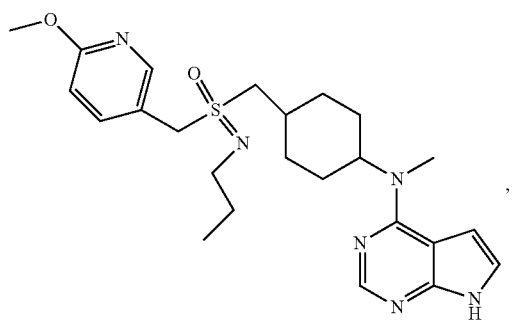
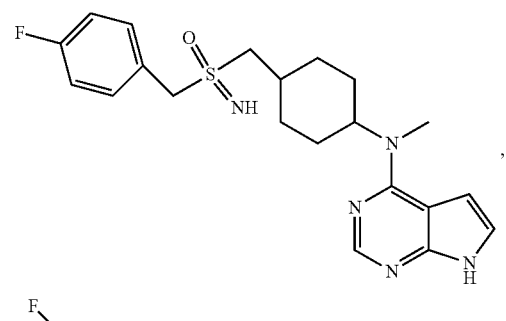
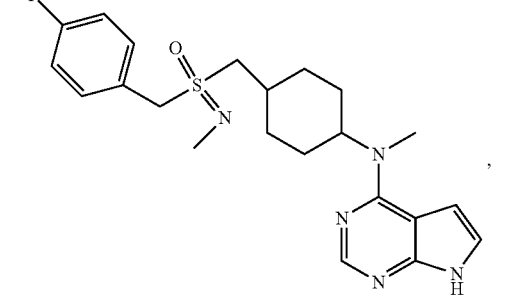
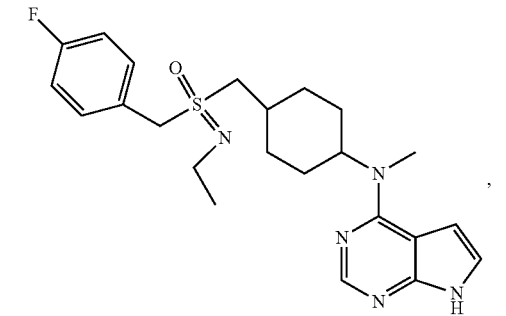

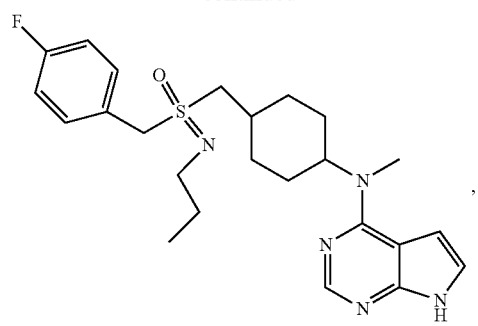
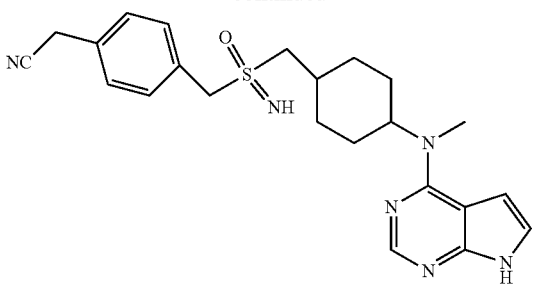
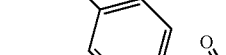
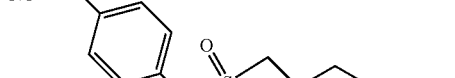
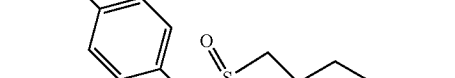

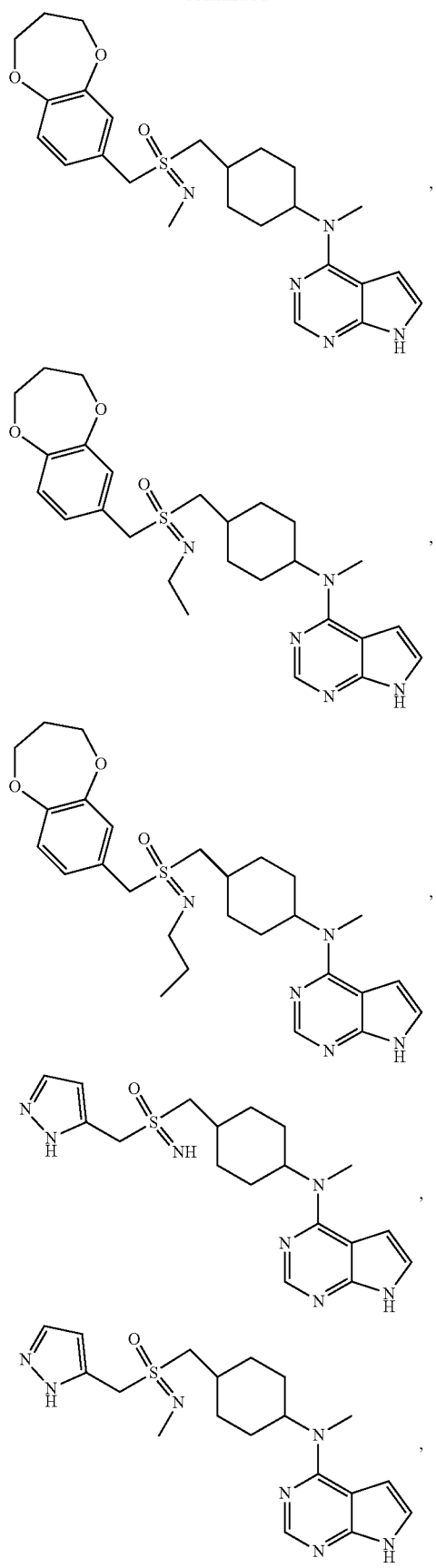
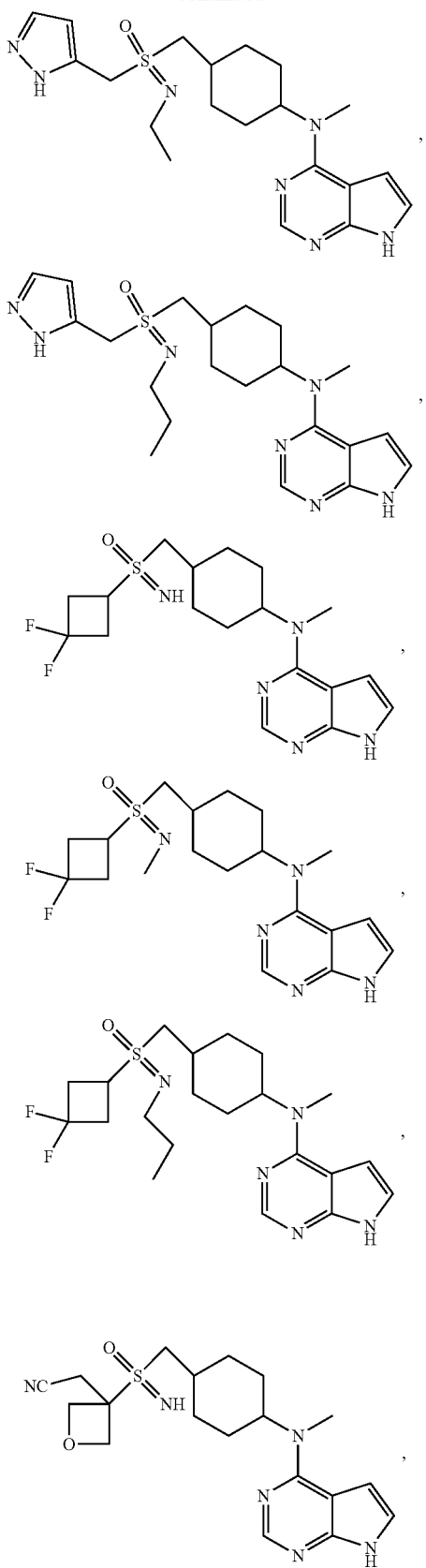

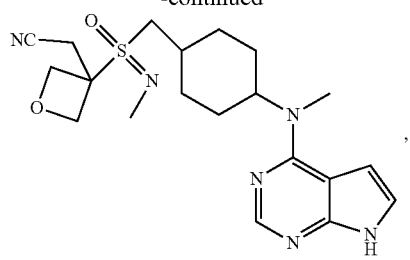

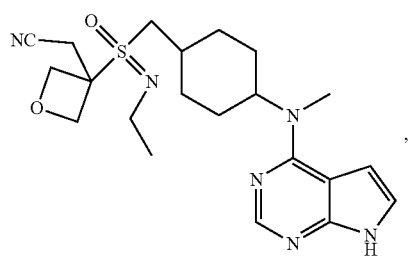

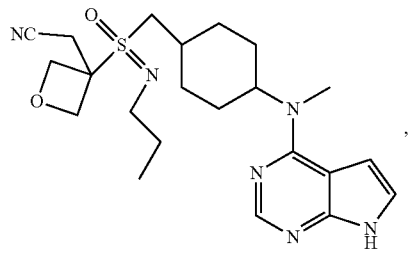

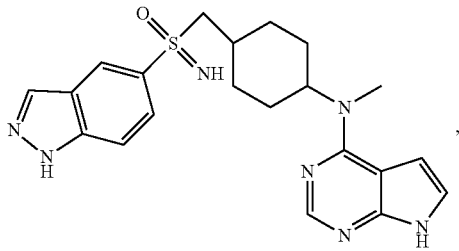

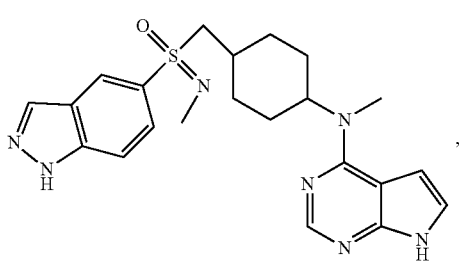

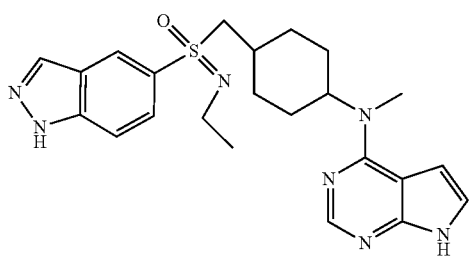

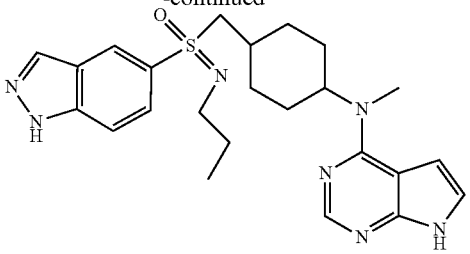

and

The compound represented by the general formula I further includes a pharmaceutically acceptable salt, stereisomer, ester, prodrug, metabolite, solvate, or deuterated compound thereof.

In an embodiment of the present invention, the stereisomer of the compound represented by the general formula I has the following structure:

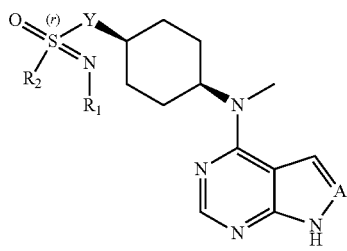
(II-A)

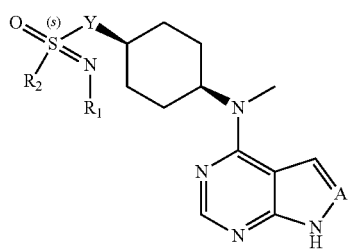
(II-B)

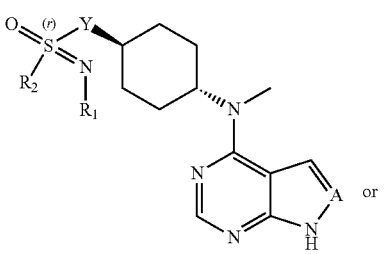
(II-C) or

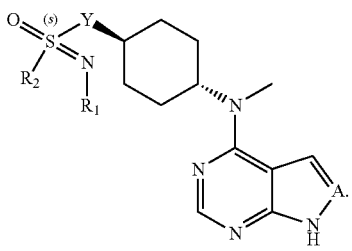
(II-D)

In another embodiment of the present invention, the stereisomer of the compound represented by the general formula I has the following structure:

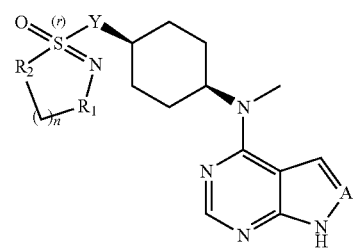
(III-A)
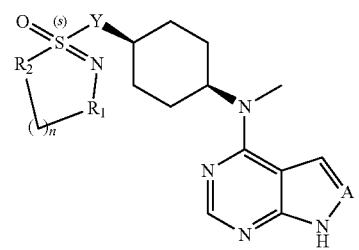
(III-B)
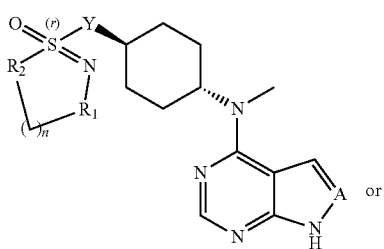
(III-C) or
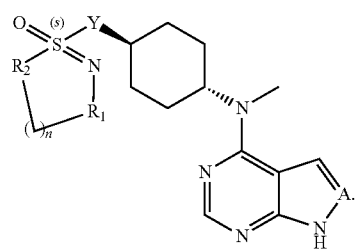
(III-D)
In embodiments of the present invention, the following stereisomers are provided:
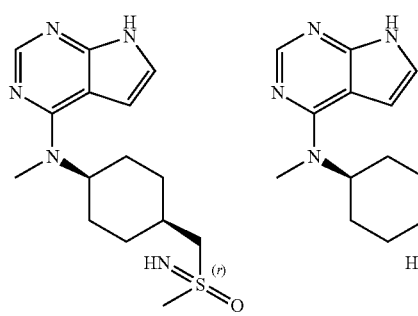
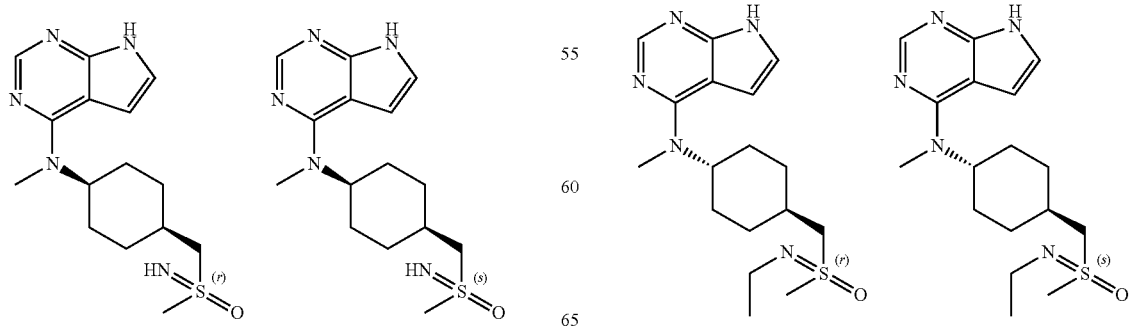
-continued

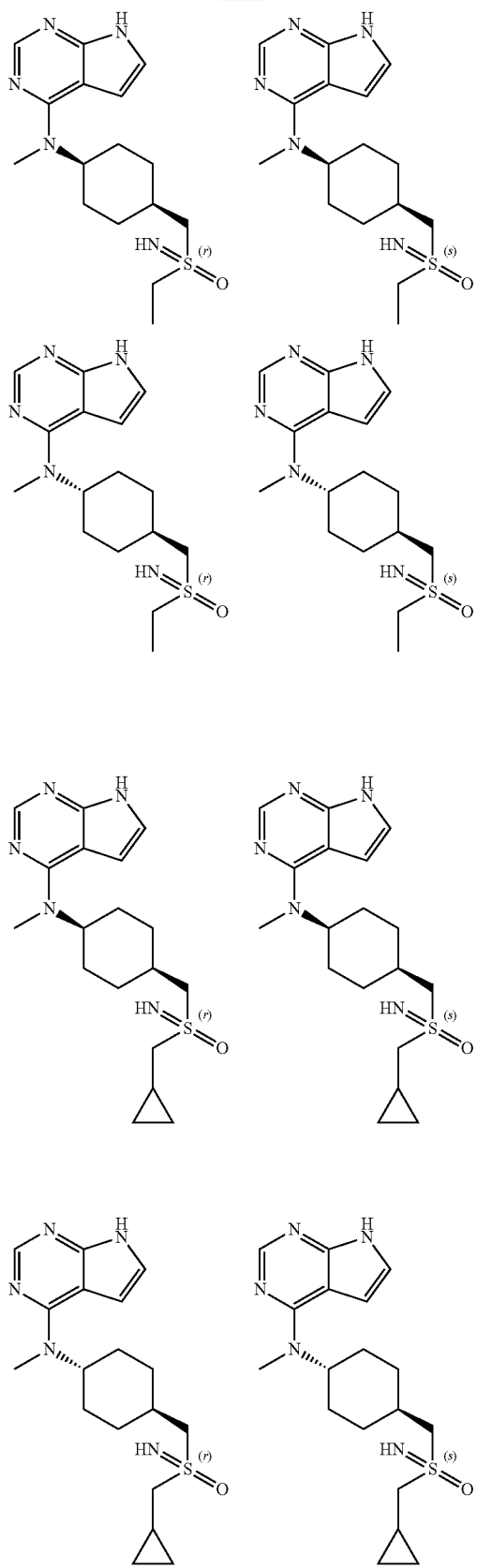
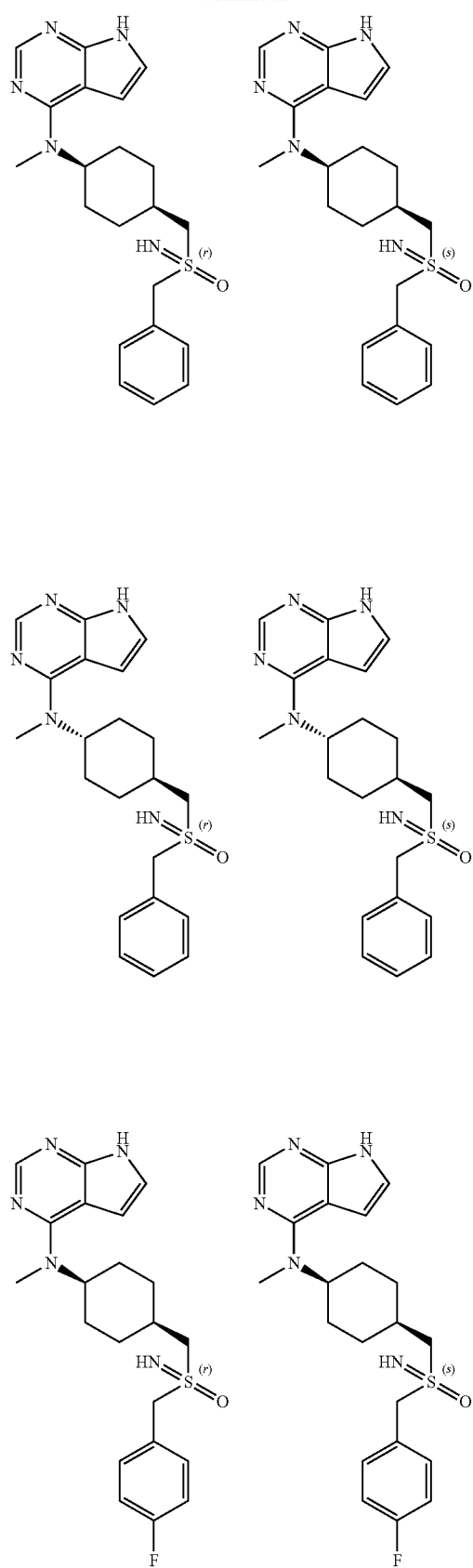

31
-continued
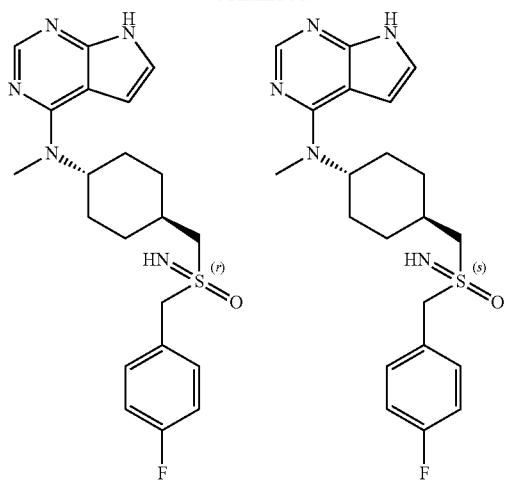
32
-continued
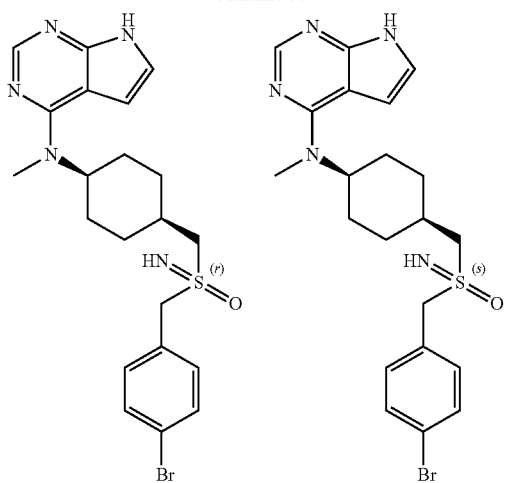
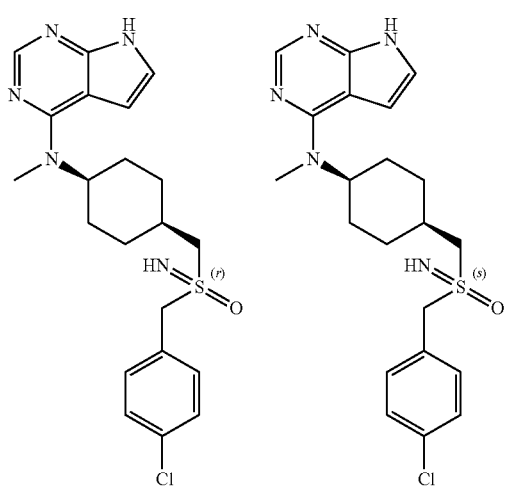
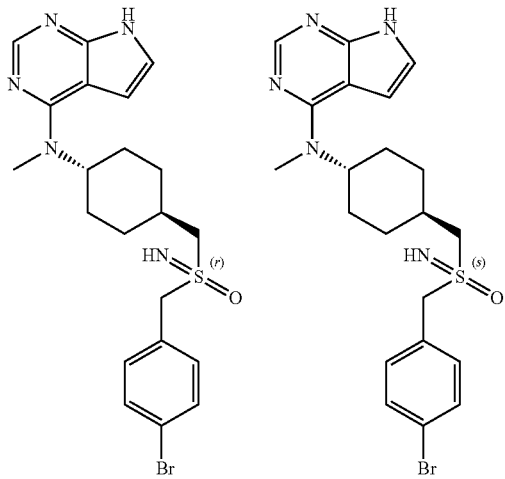
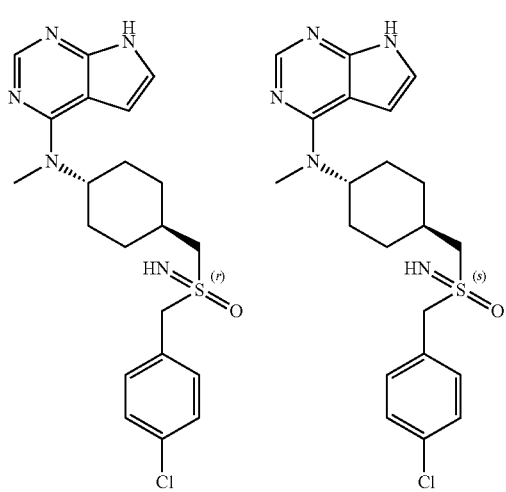
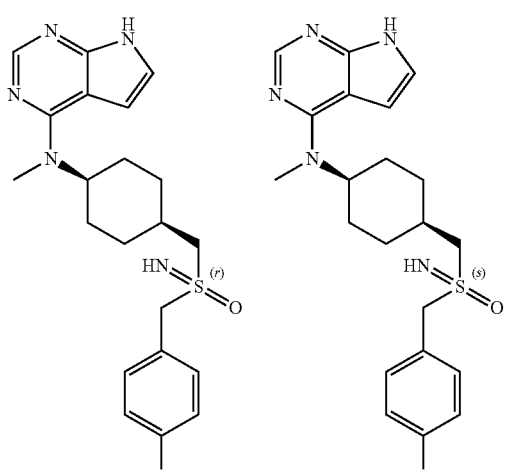

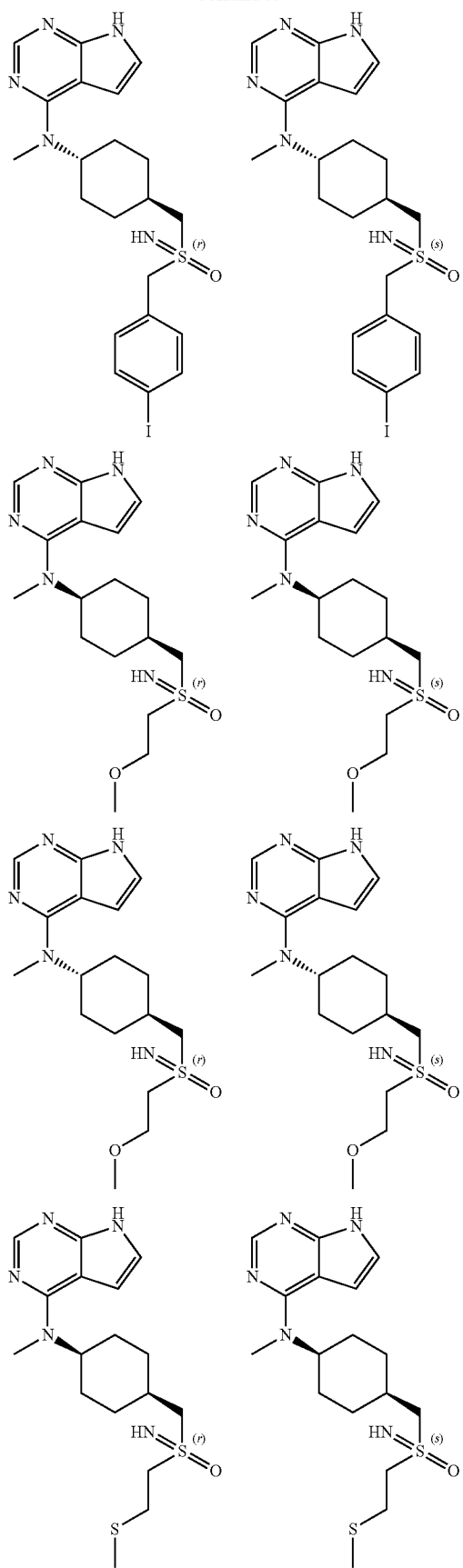
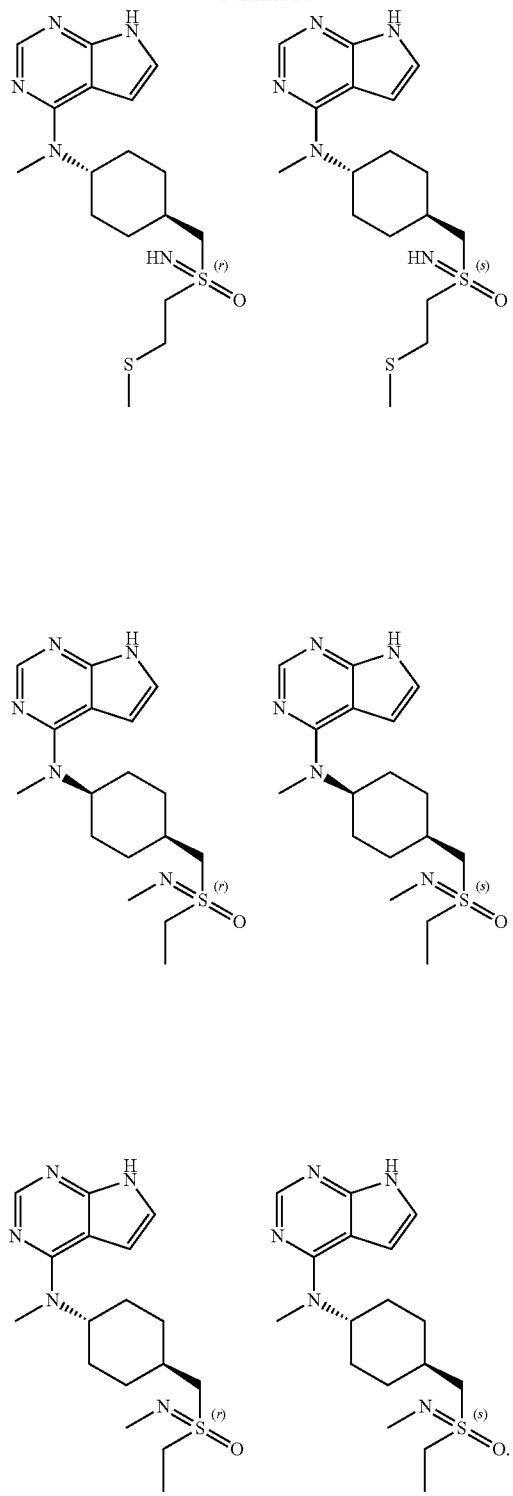
The compound represented by the general formula I in the present invention may be prepared by the following reaction route:

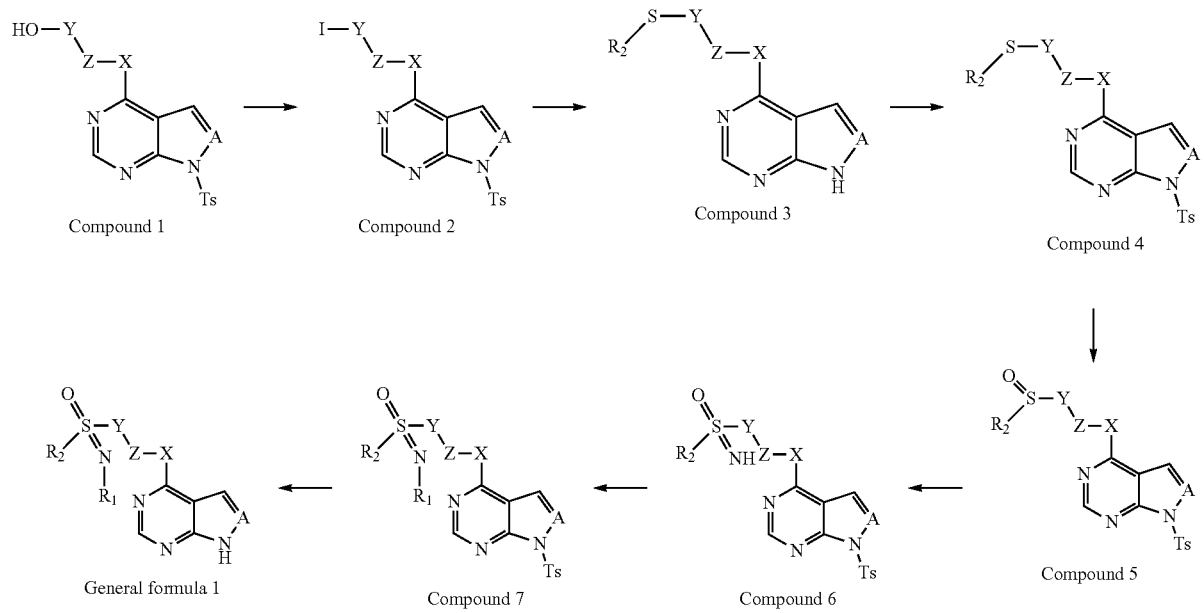

Compound 1
Compound 2
Compound 3
Compound 4
Compound 5
Compound 6
Compound 7
General formula 1

(1) dissolving a compound 1 into a solvent 1, adding triethylamine and paratoluensulfonyl chloride, stirring for 20-24 h at room temperature, concentrating, adding an iodinating agent, heating up to 60-70° C., and stirring for 8-9 h to obtain a compound 2;
(2) dissolving the compound 2 to a solvent 2, adding sodium alkylthiolate, carrying out a reaction for 20-24 h, filtering and concentrating to obtain a compound 3;
(3) dissolving the compound 3 into a solvent 3, adding triethylamine and paratoluensulfonyl chloride, stirring for 20-24 h at room temperature, and separating to obtain a compound 4;
(4) dissolving the compound 4 into a solvent 4, adding metachloroperbenzoic acid (m-CPBA), carrying out a reaction for 1-2 h, extracting, collecting an organic phase, water-washing and drying the organic phase, filtering and concentrating to obtain a compound 5;
(5) dissolving the compound 5 into a solvent 5, adding iodobenzene diacetate (PhI(OAc)$_2$) and ammonium carbamate, carrying out a reaction for 30-35 min, and concentrating under reduced pressure to obtain a compound 6;
(6) dissolving the compound 6 and polyaldehyde into a solvent 6, heating up to 90-95° C., carrying out a reaction for 20-24 h, concentrating, extracting, collecting an organic phase, water-washing and drying the organic phase, filtering and concentrating to obtain a compound 7; and
(7) dissolving the compound 7 and cesium carbonate (Cs$_2$CO$_3$) into a solvent 7, carrying out a reaction for 3-4 h at 40-50° C., filtering and concentrating to obtain the compound represented by the general formula I.

The solvents 1-7 in the above preparation steps are independently selected from one or a combination of two or more of: dichloromethane (DCM), acetone, tetrahydrofuran (THF), methanol and formic acid; preferably, the solvent 1 is DCM; solvent 2 is THF; solvent 3 is DCM; solvent 4 is THF; solvent 5 is methanol; solvent 6 is formic acid; and solvent 7 is a mixed solution of THF and methanol.

Preferably, the time for stirring at room temperature in step (1) is 24 h, and the iodinating agent is sodium iodide.

The reaction time in the step (2) is 24 h.

The separation in the step (3) is performed by column chromatography separation.

After adding m-CPBA in the step (4), the mixed material is subjected to reaction for 1 h in an ice bath at 0° C.; then the reaction liquid is quenched with a saturated NaHCO$_3$ solution, and extracted with DCM, and organic layers are combined, and then washed with saturated salt solution, and dried with anhydrous Na$_2$SO$_4$, and filtered.

The poly aldehyde in the step (6) is preferably paraformaldehyde; the reaction liquid is concentrated, and then regulated to pH=7-8 with saturated NaHCO$_3$, and extracted with ethyl acetate; and organic layers are combined, and then washed with saturated salt solution, and dried with anhydrous Na$_2$SO$_4$, and filtered.

The reaction temperature in the step (7) is 40° C., and the reaction time is 3 h.

The present invention provides a pharmaceutical composition; and the pharmaceutical composition comprises a compound represented by general formula I, and further comprises a pharmaceutically acceptable adjuvant; and the adjuvant is selected from: a carrier, a diluent, an adhesive, a lubricant, and a wetting agent. Preferably, the pharmaceutical composition comprises a therapeutically effective amount of the compound represented by general formula I. In certain embodiments, the pharmaceutical composition may be used alone or used in combination with other JAK inhibitors.

Preferably, the pharmaceutical composition may be administered to humans and/or animals.

The pharmaceutical composition is suitable for gastrointestinal or non-gastrointestinal administration, such as, intravenous, intramuscular, intracutaneous and subcutaneous administration. Therefore, preferably, the pharmaceutical composition further includes an antioxidant, a buffer agent, a bacteriostatic agent, and a solute for making preparations isotonic with blood of a subject, as well as aqueous and nonaqueous sterile suspension which may comprise a suspending agent, a solubilizer, a thickener, a stabilizer and a preservative.

The compound of the present invention may be prepared into the following forms of pharmaceutical formulations: syrups, elixirs, suspensions, powders, granules, tablets, capsules, lozenges, aqueous solutions, creams, ointments, lotions, gels, emulsions, and the like.

The pharmaceutical preparation is preferably a unit dosage form. In such form, the preparation is subdivided into unit doses comprising proper amounts of active ingredients. The unit dosage form may be a capsule, tablet or any dosage form; moreover, the unit dosage form may be also a packaged preparation, such as, tablets, capsules and powders packaged in a vial or an ampoule.

The amount of the active ingredients in the unit dose of preparation may be changed or adjusted between 0.1 mg to 1000 mg; depending on the specific application and efficacy of the active ingredients. If necessary, the composition may further include other suitable therapeutic agents.

The present invention provides a use of the compound represented by the general formula I or a pharmaceutically acceptable salt, stereisomer, ester, prodrug, metabolite, solvate, or deuterated compound thereof in the preparation of a medicament for treating a disease associated with Janus-activated kinase signal transducers and activators of transcription (JAK-STAT).

The present invention provides a use of the compound represented by the general formula I or a pharmaceutically acceptable salt, stereisomer, ester, prodrug, metabolite, solvate, or deuterated compound thereof in the preparation of a medicament for preventing and/or treating an inflammatory disease or cancer in humans and/or animals.

The present invention provides a use of the compound represented by the general formula I or a pharmaceutically acceptable salt, stereisomer, ester, prodrug, solvate, or deuterated compound thereof in the prevention and/or treatment of an inflammatory disease and cancer in humans and/or animals.

Preferably, the inflammatory disease includes rheumatoid arthritis, canine dermatitis, psoriasis, ulcerative colitis or Crohn's disease; and the cancer includes myelofibrosis, polycythemia vera, essential thrombocythemia, chronic granulocytic leukemia, breast cancer, lung cancer, and pancreatic cancer.

For the term $C_{0-10}$ alkyl in the present invention, $C_0$ alkyl refers to H. Therefore, $C_{0-10}$ alkyl includes H, $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, and $C_{10}$ alkyl.

The term $C_{3-10}$ cycloalkyl in the present invention includes $C_3$ cycloalkyl, $C_4$ cycloalkyl, $C_5$ cycloalkyl, $C_6$ cycloalkyl, $C_7$ cycloalkyl, $C_8$ cycloalkyl, $C_9$ cycloalkyl, and $C_{10}$ cycloalkyl.

The term halogen in the present invention includes fluorine, chlorine, bromine, and iodine.

The pharmaceutically acceptable salt in the present invention includes an acid addition salt and an alkali addition salt.

The acid addition salt includes but not limited to salts derived from inorganic acids, such as, hydrochloric acid, nitric acid, phosphoric acid, sulfuric acid, hydrobromic acid, hydroiodic acid and phosphonic acid; and salts derived from organic acids, such as, aliphatic monocarboxylic acid and dicarboxylic acid, phenyl-substituted paraffinic acid, hydroxy paraffinic acid, alkanedioic acid, aromatic acid, and aliphatic and aromatic sulphonic acids. Therefore, these salts include but not limited to sulfates, pyrosulfates, disulfates, sulfites, hydrosulphites, nitrates, phosphoric acid, monohydric phosphates, dihydric phosphates, metaphosphates, pyrophosphates, hydrochlorides, hydrobromides, iodates, acetates, propionates, caprylates, isobutyrates, oxalates, malonates, succinates, octanedioic acid, sebacates, fumarates, maleates, mendelates, benzoates, chlorinated benzoates, methylbenzoates, binitrobenzoates, phthalates, benzene sulfonates, tosylates, phenyl acetates, citrates, lactates, maleates, tartrates and mesylates, and further include salts of amino acids, such as, arginine salts, gluconates, galacturonates, and the like. The acid addition salt may be prepared by a conventional way, namely, a way of contacting a free alkali form with enough amount of acid required to form a salt. The salt form can be allowed to contact alkali to regenerate a free alkali form, and the free alkali can be isolated by a conventional way.

The alkali addition salt may be formed with metals or amines such as hydroxides of alkali metals or alkaline-earth metals, or organic amines. Examples of metals used as cations include but not limited to sodium, potassium, magnesium, and calcium. Examples suitable amines include but not limited to N,N'-dibenzylethylenediamine, chloroprocaine, choline, diethanol amine, ethylenediamine (ethane-1, 2-diamine), N-methylglucosamine and procaine. The alkali addition salt may be prepared by a conventional way, namely, a way of contacting a free acid form with enough amount of alkali required to form a salt. The salt form may be allowed to contact acid to regenerate a free acid form, and the free acid may be isolated by a conventional way.

The stereisomer of the present invention exists in the form of enantiomers, diastereomers and geometrical isomers. Some compounds of the present invention have cycloalkyl which may be substituted on more than one carbon atoms. In this case, all the geometric forms thereof, including cis-forms and trans-forms, and mixtures thereof, fall within the scope of the present invention.

The solvate of the present invention refers to a physical bonding of the compound of the present invention to one or more solvents. The physical bonding includes various degrees of ionic and covalent bonding, including hydrogen bonding. In some cases, the solvate may be separated, for example, when one or more solvent molecules are incorporated into lattice of a crystalline solid. The "solvate" includes solution-phase or separable solvates. Representative solvates include ethanolates, methanolates, and the like. The "hydrate" is a solvate where one or more solvent molecules are $H_2O$.

The prodrug of the present invention refers to a form of the compound represented by the general formula I which is suitable for administering to a patient with no undue toxicity, irritation and allergic reaction, and is effective to its application purposes, including acetal, ester and zwitterionic forms. The prodrug is transformed in vivo (for example, hydrolyzed in blood) to obtain the parent compound of above formula.

DETAILED DESCRIPTION OF THE INVENTION

The technical solution in the examples of the present invention will be described clearly and integrally; obviously, the examples described herein are merely partial, but not all examples of the present invention. Based on the examples of the present invention, all the other examples obtained by a person skilled in the art without inventive effort shall fall within the protection scope of the present invention.

Example 1: T1 Synthesis

Step 1

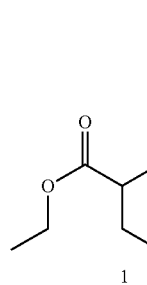

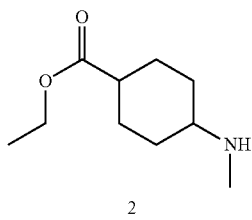

1 (220 g, 1.29 mol), and MeOH (40 ml) were added to a 5 L single-necked flask, and methylamine in tetrahydrofuran (0.78 L, 1.55 mol, 2 M in THF), tetraisopropyl titanate (733 g, 2.58 mol) and NaBH$_3$CN (162 g, 2.58 mol) were added successively, the mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]$^+$

Step 2

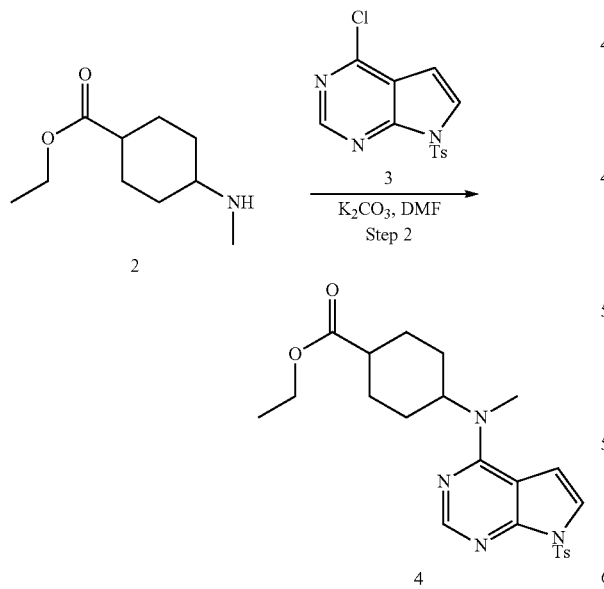

2 (70 g, 378 mmol) (prepared by step 1), 3 (96.7 g, 315 mmol), potassium carbonate (86.9 g, 630 mmol) and DMF (300 mL) were added to a 1 L single-necked round bottom flask, and a reaction was performed for 18 h at 100° C. After adding ice water, the resulting mixture was subjected to suction filtration, and the filter cake was dried to obtain the target product as a yellow solid (136 g, yield: 94.6%). LC-MS: 457[M+H]$^+$

Step 3

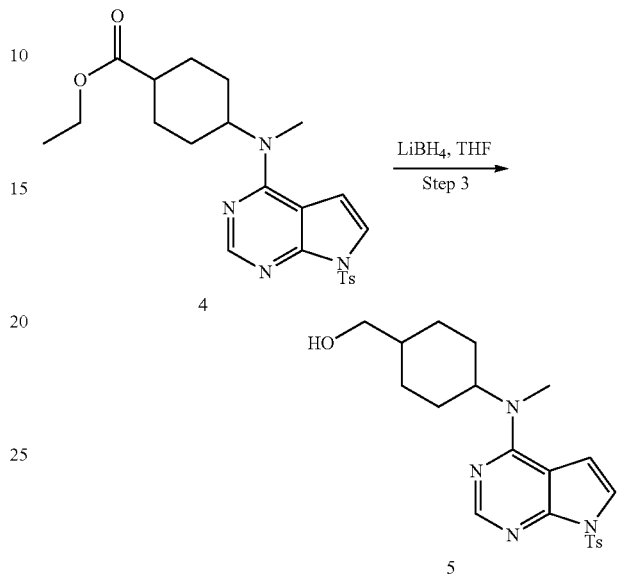

4 (136 g, 298 mmol) (prepared in step 2) and tetrahydrofuran (1.0 L) were added to a 2 L single-necked flask, then lithium borohydride (13.0 g, 596 mmol) was added in batches, and a reaction was performed for 5 h at 50° C. Methanol (20 mL) was added for quenching, and the mixture was poured to water, and extracted with dichloromethane (1.0 L×3), washed with saturated salt solution (500 mL×3), and dried with anhydrous sodium sulfate, and spin-dried to obtain the target product as a white solid (75 g, yield: 60.8%). LC-MS: 415 [M+H]+

Step 4

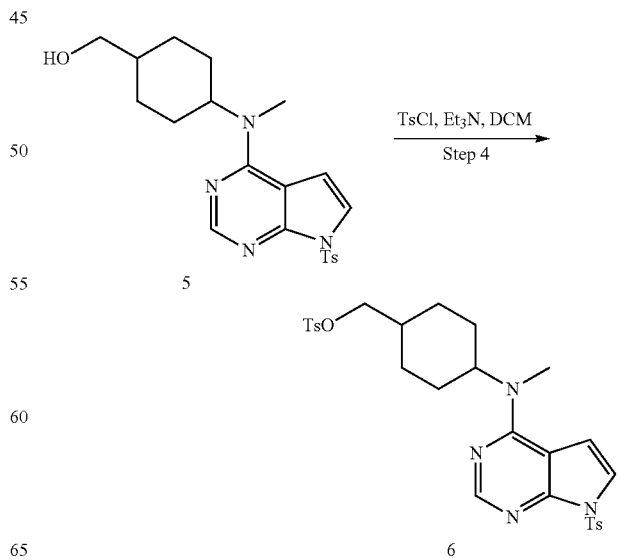

5 (75 g, 181 mmol) (prepared in step 3) and dichloromethane (750 mL) were added to a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

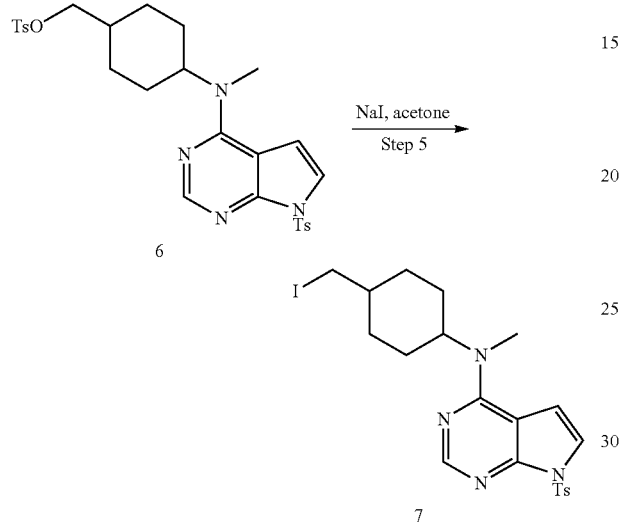

6 (80 g, 141 mmol) (prepared in step 4), acetone (500 mL) and sodium iodide (42.2 g, 282 mmol) were added to a 1 L single-necked flask, refluxed for 16 h, and then spin-dried, and subjected to column chromatography (petroleum ether:ethyl acetate=1:2) to obtain the target product as a yellow solid (70 g, yield: 94.7%). LC-MS: 525 [M+H]+

Step 6

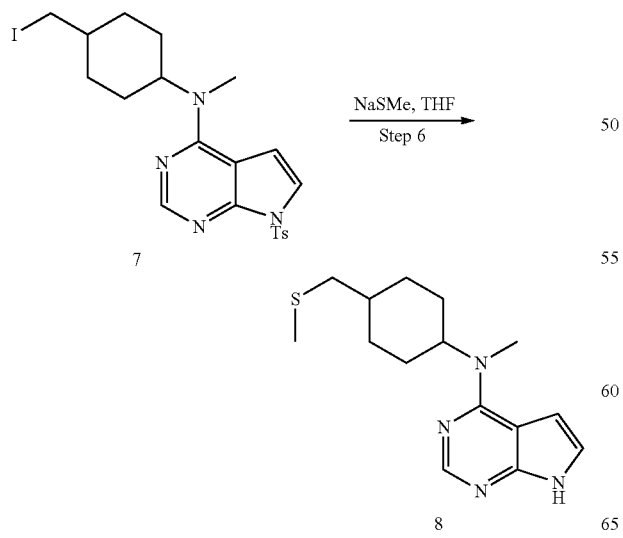

7 (25 g, 47.7 mmol) (prepared in step 5), tetrahydrofuran (200 mL) and sodium methyl mercaptide (6.69 g, 95.4 mmol) were added to a 1 L single-necked flask, refluxed for 12 h, and then spin-dried, and subjected to column chromatography (petroleum ether:ethyl acetate=1:1) to obtain the target product as a yellow solid (11.5 g, yield: 83.1%). LC-MS: 291 [M+H]+

Step 7

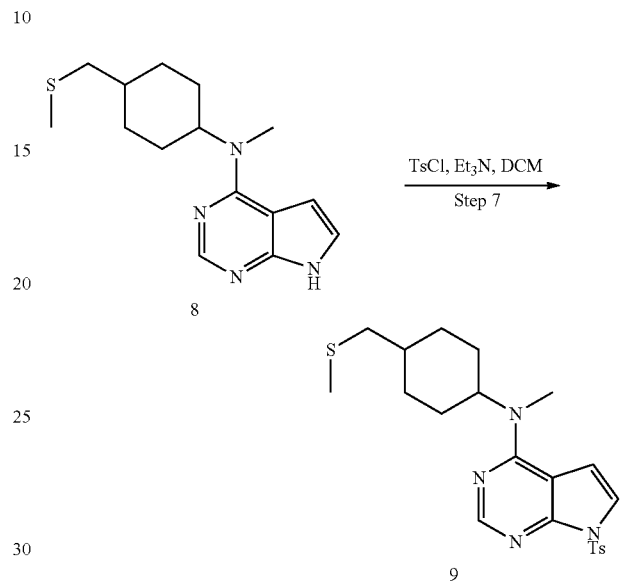

8 (11.5 g, 39.6 mmol) (prepared in step 6) and dichloromethane (110 mL) were added to a 500 L single-necked flask at 0° C., then TsCl (11.3 g, 59.4 mmol) and triethylamine (8.0 g, 79.2 mmol) were added successively, and a reaction was performed for 3 h at room temperature. The reaction liquid was washed with saturated salt solution, dried with anhydrous sodium sulfate, and spin-dried to obtain a crude product (14.5 g). LC-MS: 445 [M+H]+

Step 8

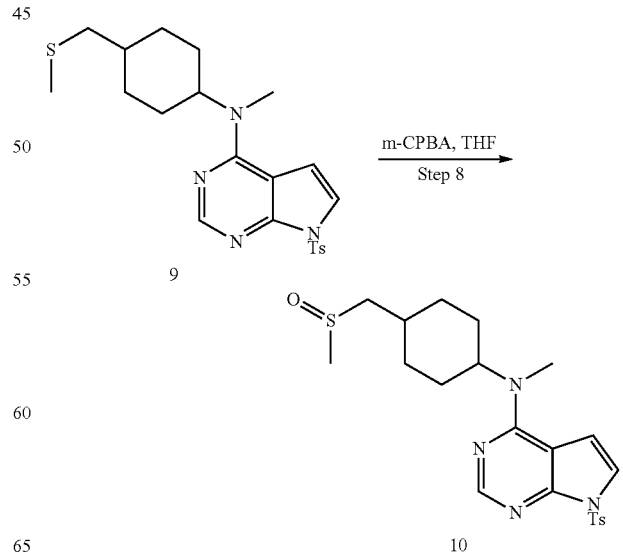

9 (14.5 g, 32.65 mmol) (prepared in step 7), and tetrahydrofuran (120 mL) were added to a 250 mL single-necked flask at 0° C.; metachloroperbenzoic acid (5.63 g, 32.65 mmol) in tetrahydrofuran was added dropwisely, and a reaction was performed for 30 min, the resulting mixture was concentrated, then poured to ethyl acetate (100 mL), then washed successively with saturated sodium sulfite (50 mL×3), sodium bicarbonate (50 mL×3) and saline solution (50 mL×3), dried with anhydrous sodium sulfate, and spin-dried, and then subjected to column chromatography (petroleum ether:ethyl acetate=1:2) to obtain the target product as a yellow solid (7.0 g, yield: 46.6%). LC-MS: 461 [M+H]+

Step 9

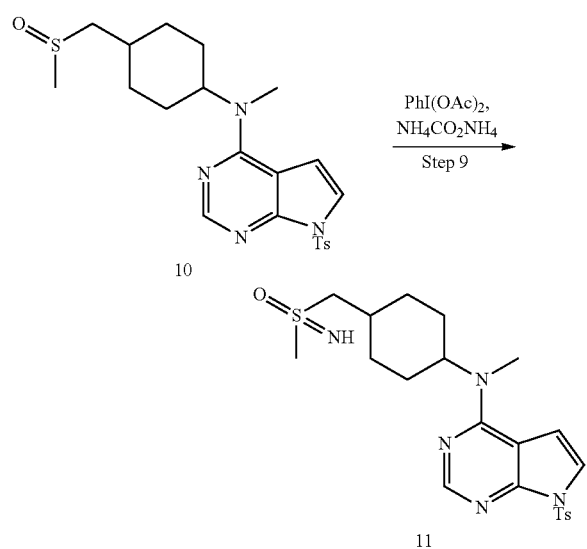

10 (7.0 g, 15.21 mmol) (prepared in step 8), dichloromethane (70 mL), PhI(OAc)$_2$ (7.35 g, 22.82 mmol) and ammonium carbonate (2.92 g, 30.42 mmol) were added to a 250 mL single-necked flask, and a reaction was performed for 6 h at room temperature. The resulting mixture was filtered, concentrated, and poured into methanol, potassium carbonate was added, and the resulting mixture was stirred for 30 min, concentrated and then subjected to column chromatography (ethyl acetate:methanol=4:1) to obtain the target compound as a white solid (3.0 g, yield: 41.5%). LC-MS: 474 [M−H]+

Step 10

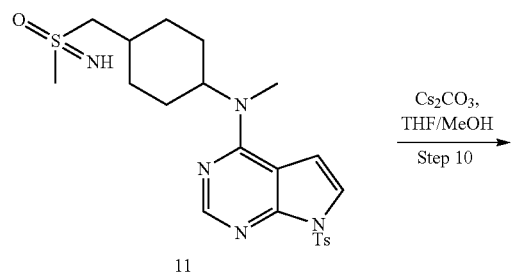

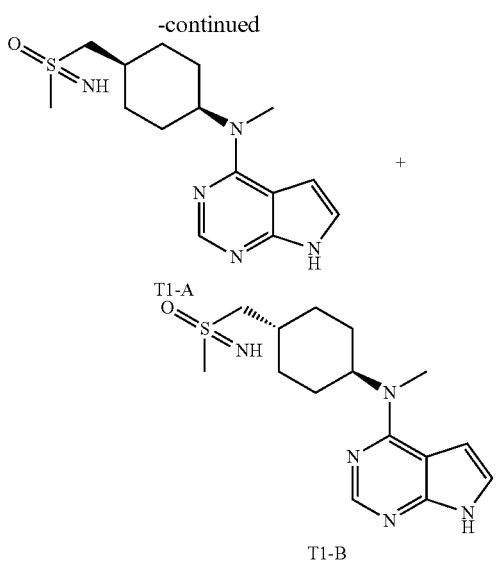

11 (485 mg, 1.02 mmol), tetrahydrofuran/methanol (5.0 mL), and cesium carbonate (665 mg, 2.04 mmol) were added to a 25 mL single-necked flask, refluxed for 12 h, concentrated, and poured into dichloromethane and saturated salt solution, the organic phase was dried with anhydrous sodium sulfate, and concentrated, and subjected to a conventional preparation method and a chiral preparation method to obtain product A as a white solid (95 mg, yield: 29.0%), LC-MS: 322 [M+H]+, H$^1$-NMR: $^1$H NMR (400 MHz, DMSO) δ 11.83 (s, 1H), 8.15 (s, 1H), 7.20 (t, J=25.5 Hz, 2H), 6.60 (d, J=2.4 Hz, 1H), 4.64 (s, 1H), 3.38-3.28 (m, 2H), 3.23 (s, 3H), 3.19 (s, 3H), 2.13-1.98 (m, 3H), 1.73 (s, 4H), 1.42-1.29 (m, 2H) and product B as a white solid (85 mg, yield: 25.9%), LC-MS: 322 [M+H]+, H$^1$—NMR: $^1$H NMR (400 MHz, DMSO) δ 11.79 (s, 1H), 8.14 (s, 1H), 7.28-7.00 (m, 2H), 6.59 (d, J=2.3 Hz, 1H), 4.64 (s, 1H), 3.28 (d, J=3.4 Hz, 2H), 3.19 (s, 6H), 2.14-1.96 (m, 3H), 1.72 (d, J=7.4 Hz, 4H), 1.34 (dd, J=10.7, 5.7 Hz, 2H).

Example 2: T2 Synthesis

Step 1

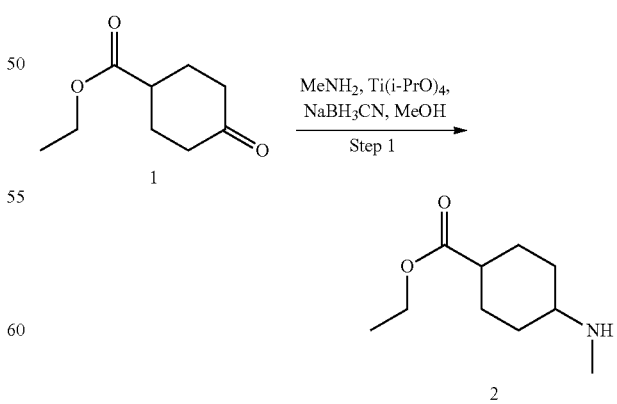

1 (220 g, 1.29 mol), and MeOH (40 mL) were added to a 5 L single-necked flask, and methylamine in tetrahydrofuran (0.78 L, 1.55 mol, 2 M in THF), tetraisopropyl titanate (733 g, 2.58 mol) and NaBH₃CN (162 g, 2.58 mol) were added successively, the resulting mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]⁺

Step 2

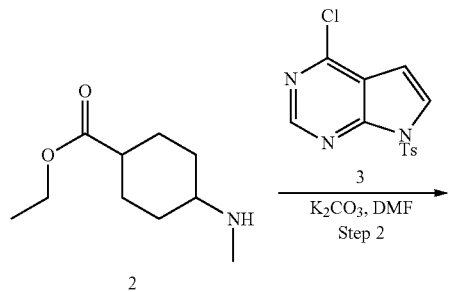

2 (70 g, 378 mmol) (prepared by step 1), 3 (96.7 g, 315 mmol), potassium carbonate (86.9 g, 630 mmol) and DMF (300 mL) were added to a 1 L single-necked round bottom flask, and a reaction was performed for 18 h at 100° C. After adding ice water, the resulting mixture was subjected to suction filtration, and the resulting filter cake was dried to obtain the target product as a yellow solid (136 g, yield: 94.6%). LC-MS: 457[M+H]⁺

Step 3

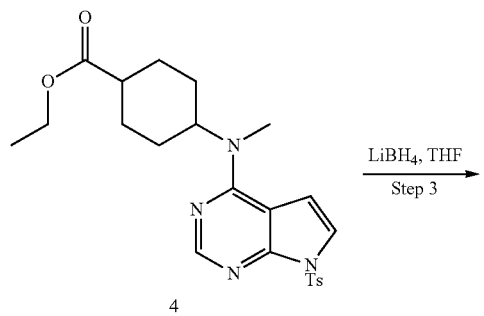

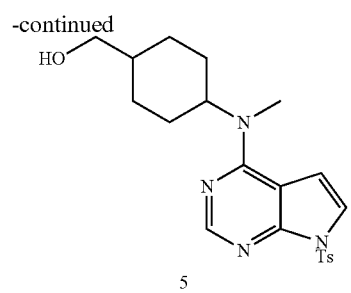

4 (136 g, 298 mmol) (prepared in step 2) and tetrahydrofuran (1.0 L) were added to a 2 L single-necked flask, then lithium borohydride (13.0 g, 596 mmol) was added in batches, and a reaction was performed for 5 h at 50° C. Methanol (20 mL) was added for quenching, and the resulting mixture was poured into water, extracted with dichloromethane (1.0 L×3), washed with saturated salt solution (500 mL×3), dried with anhydrous sodium sulfate, and spin-dried to obtain the target product as a white solid (75 g, yield: 60.8%). LC-MS: 415 [M+H]+

Step 4

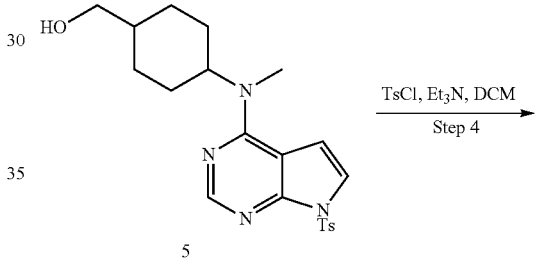

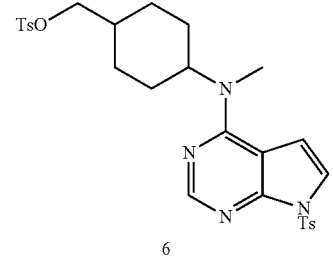

5 (75 g, 181 mmol) (prepared in step 3) and dichloromethane (750 mL) were added to a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

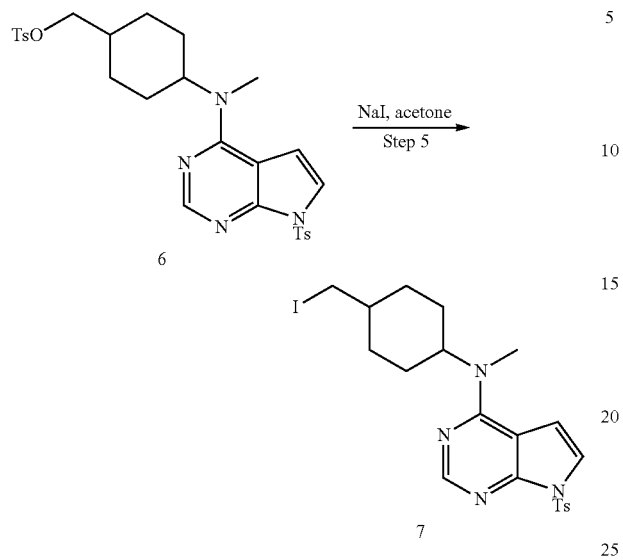

6 (80 g, 141 mmol) (prepared in step 4), acetone (500 mL) and sodium iodide (42.2 g, 282 mmol) were added to a 1 L single-necked flask, refluxed for 16 h, then spin-dried, and subjected to column chromatography (petroleum ether:ethyl acetate=1:2) to obtain the target product as a yellow solid (70 g, yield: 94.7%). LC-MS: 525 [M+H]$^+$ Step 6

7 (25 g, 47.7 mmol) (prepared in step 5), tetrahydrofuran (200 mL) and sodium methyl mercaptide (6.69 g, 95.4 mmol) were added to a 1 L single-necked flask, refluxed for 12 h, then spin-dried, and subjected to column chromatography (petroleum ether:ethyl acetate=1:1) to obtain the target product as a yellow solid (11.5 g, yield: 83.1%). LC-MS: 291 [M+H]$^+$ Step 7

8 (11.5 g, 39.6 mmol) (prepared in step 6) and dichloromethane (110 mL) were added to a 500 mL single-necked flask at 0° C., then TsCl (11.3 g, 59.4 mmol) and triethylamine (8.0 g, 79.2 mmol) were added successively, and a reaction was performed for 3 h at room temperature. The reaction liquid was washed with saturated salt solution, dried with anhydrous sodium sulfate, and spin-dried to obtain a crude product (14.5 g). LC-MS: 445 [M+H]+

Step 8

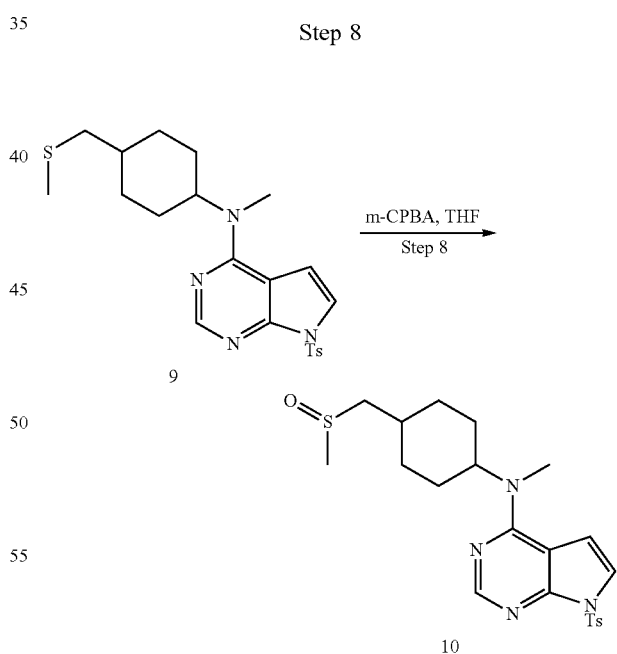

9 (14.5 g, 32.65 mmol) (prepared in step 7), and tetrahydrofuran (120 mL) were added to a 250 mL single-necked flask at 0° C.; metachloroperbenzoic acid (5.63 g, 32.65 mmol) in tetrahydrofuran was added dropwisely, and a reaction was performed for 30 min. The reaction liquid was concentrated, poured into ethyl acetate (100 mL), washed successively with saturated sodium sulfite (50 mL×3), sodium bicarbonate (50 mL×3) and saline solution (50 mL×3), dried with anhydrous sodium sulfate, spin-dried, and subjected to column chromatography (petroleum ether: ethyl acetate=1:2) to obtain the target product as a yellow solid (7.0 g, yield: 46.6%). LC-MS: 461 [M+H]+

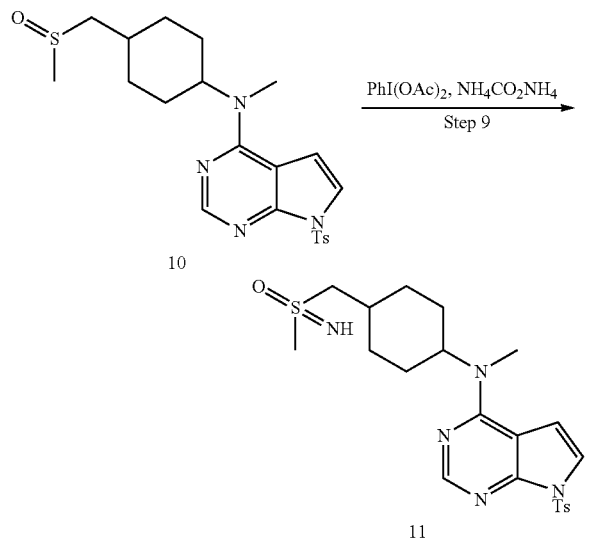

10 (7.0 g, 15.21 mmol) (prepared in step 8), dichloromethane (70 mL), PhI(OAc)$_2$ (7.35 g, 22.82 mmol) and ammonium carbonate (2.92 g, 30.42 mmol) were added to a 250 mL single-necked flask, and a reaction was performed for 6 h at room temperature. The reaction liquid was filtered, concentrated, and poured into methanol, and potassium carbonate was added, the resulting mixture was stirred for 30 min, concentrated, and then subjected to column chromatography (ethyl acetate:methanol=4:1) to obtain the target compound as a white solid (3.0 g, yield: 41.5%). LC-MS: 474 [M−H]+

Step 10

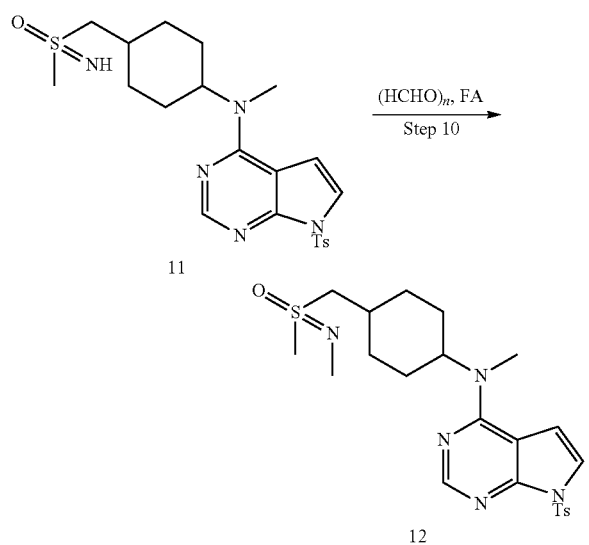

11 (1.0 g, 2.10 mmol) (prepared in step 9), paraformaldehyde (379 mL, 4.20 mmol), and formic acid (8 mL) were added to a 25 mL single-necked flask, and a reaction was performed for 48 h at 100° C. The reaction liquid was concentrated, poured into dichloromethane and 2 N sulfuric acid; the aqueous phase was neutralized with sodium bicarbonate, and extracted with dichloromethane (10 mL×3), and the organic phase was dried with anhydrous sodium sulfate, and concentrated to obtain the target product as a white solid (500 mg, yield: 48.7%). LC-MS: 490 [M+H]+

Step 11

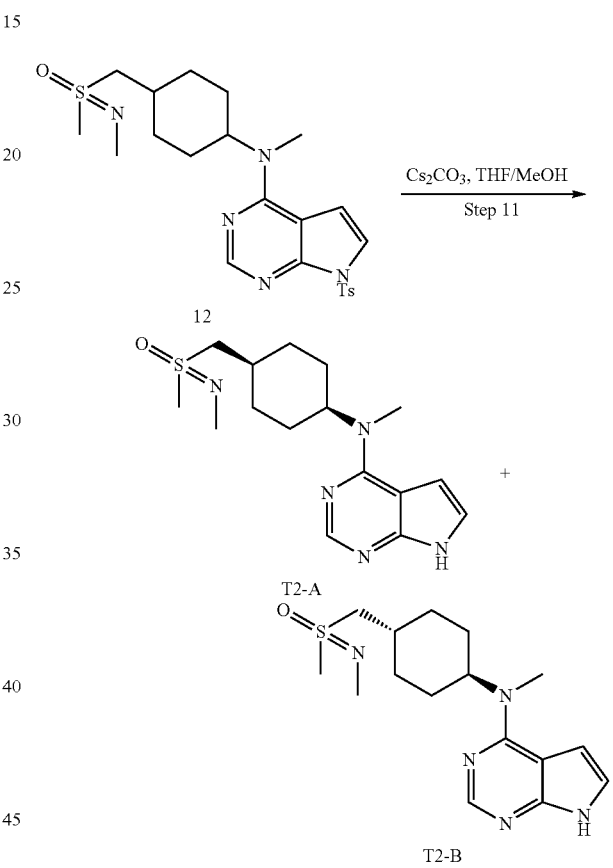

12 (500 mg, 1.02 mmol) (prepared in step 10), tetrahydrofuran/methanol (5.0 mL), and cesium carbonate (665 mg, 2.04 mmol) were added to a 25 mL single-necked flask, refluxed for 12 h, concentrated, and poured into dichloromethane and saturated salt solution, the organic phase was dried with anhydrous sodium sulfate, and concentrated, and subjected to a conventional preparation method and a chiral preparation method to obtain product A as a white solid (100 mg, yield: 29.8%), LC-MS: 336 [M+H]+, H$^1$-NMR: $^1$H NMR (400 MHz, DMSO) δ 11.60 (s, 1H), 8.09 (s, 1H), 7.20-7.04 (m, 1H), 6.53 (s, 1H), 4.67 (s, 1H), 3.23-2.99 (m, 5H), 2.94 (m, 3H), 2.64 (m, 3H), 2.16-1.89 (m, 3H), 1.69 (m, 4H), 1.35-1.14 (m, 2H) and product B as a white solid (80 mg, yield: 23.4%), LC-MS: 336 [M+H]+, H$^1$-NMR: $^1$H NMR (400 MHz, DMSO) δ 11.60 (s, 1H), 8.09 (s, 1H), 7.12 (dd, J=3.3, 2.5 Hz, 1H), 6.54 (s, 1H), 4.67 (s, 1H), 3.21-2.99 (m, 5H), 2.93 (s, 3H), 2.63 (s, 3H), 2.14-1.89 (m, 3H), 1.70 (m, 4H), 1.36-1.20 (m, 2H).

Example 3: T3 Synthesis

Step 1

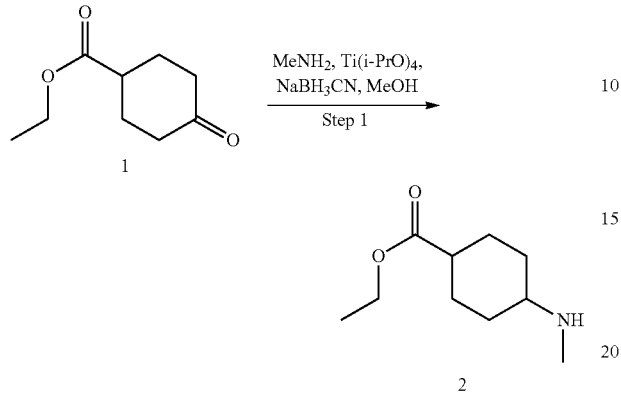

1 (220 g, 1.29 mol), and MeOH (40 mL) were added to a 5 L single-necked flask, and methylamine in tetrahydrofuran (0.78 L, 1.55 mol, 2 M in THF), tetraisopropyl titanate (733 g, 2.58 mol) and NaBH$_3$CN (162 g, 2.58 mol) were added successively, and the resulting mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]$^+$

Step 2

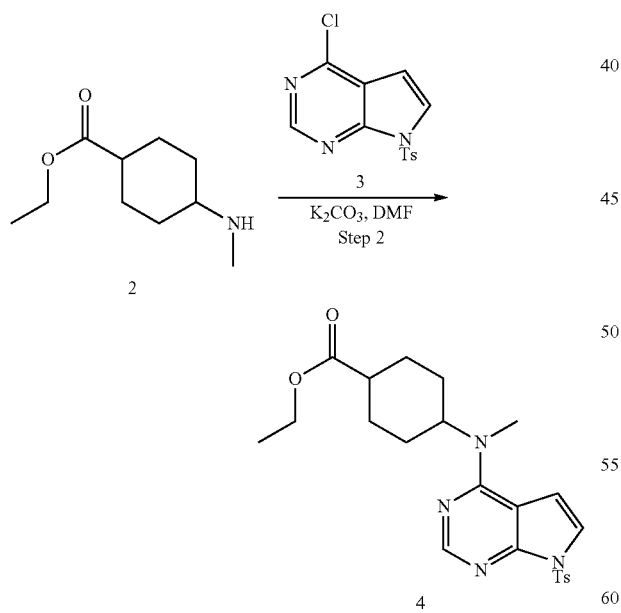

2 (70 g, 378 mmol) (prepared by step 1), 3 (96.7 g, 315 mmol), potassium carbonate (86.9 g, 630 mmol) and DMF (300 mL) were added to a 1 L single-necked round bottom flask, and a reaction was performed for 18 h at 100° C. After adding ice water, the resulting mixture was subjected to suction filtration, and the resulting filter cake was dried to obtain the target product as a yellow solid (136 g, yield: 94.6%). LC-MS: 457[M+H]$^+$

Step 3

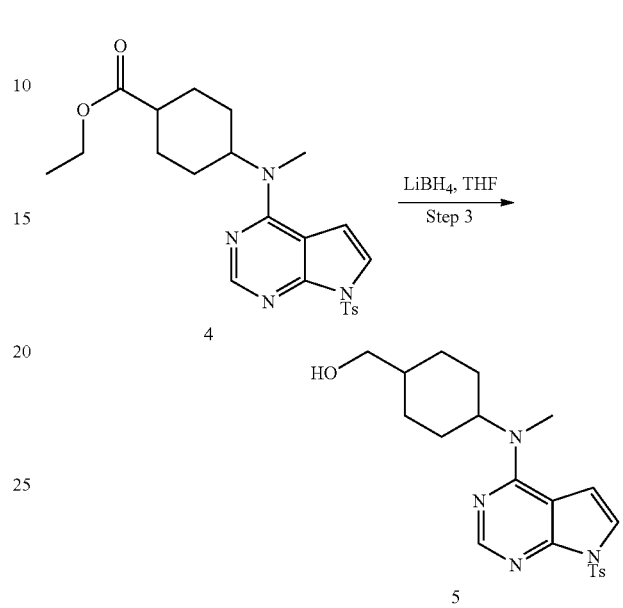

4 (136 g, 298 mmol) (prepared in step 2) and tetrahydrofuran (1.0 L) were added to a 2 L single-necked flask, then lithium borohydride (13.0 g, 596 mmol) was added in batches, and a reaction was performed for 5 h at 50° C. Methanol (20 mL) was added for quenching, and the mixture was poured into water, extracted with dichloromethane (1.0 L×3), washed with saturated salt solution (500 mL×3), dried with anhydrous sodium sulfate, and spin-dried to obtain the target product as a white solid (75 g, yield: 60.8%). LC-MS: 415 [M+H]+

Step 4

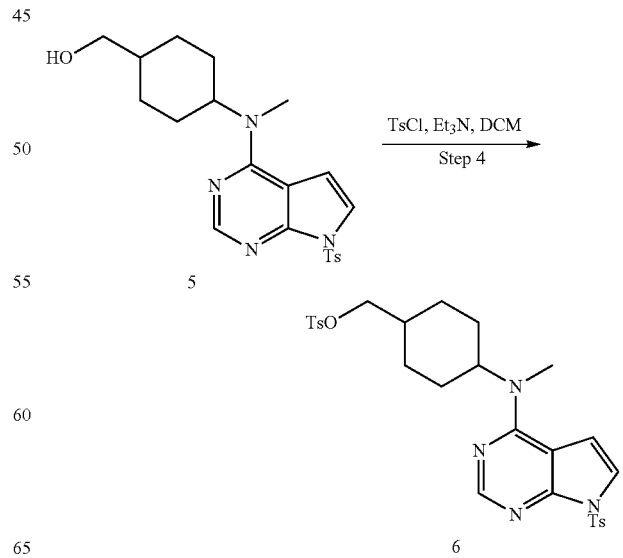

5 (75 g, 181 mmol) (prepared in step 3) and dichloromethane (750 mL) were added to a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

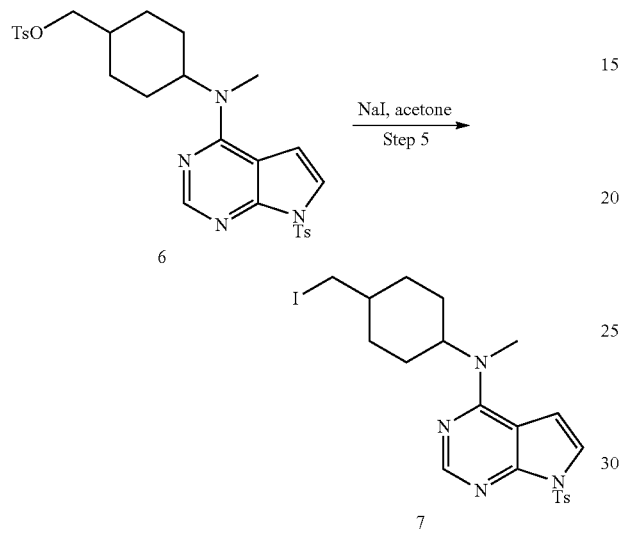

6 (80 g, 141 mmol) (prepared in step 4), acetone (500 mL) and sodium iodide (42.2 g, 282 mmol) were added to a 1 L single-necked flask, refluxed for 16 h, then spin-dried, and subjected to column chromatography (petroleum ether:ethyl acetate=1:2) to obtain the target product as a yellow solid phase (70 g, yield: 94.7%). LC-MS: 525 [M+H]+

Step 6

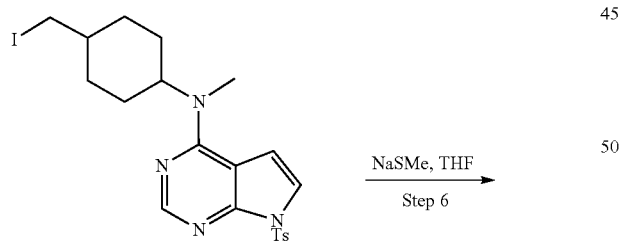

7 (25 g, 47.7 mmol) (prepared in step 5), tetrahydrofuran (200 mL) and sodium methyl mercaptide (6.69 g, 95.4 mmol) were added to a 1 L single-necked flask, refluxed for 12 h, then spin-dried, and subjected to column chromatography (petroleum ether:ethyl acetate=1:1) to obtain the target product as a yellow solid (11.5 g, yield: 83.1%). LC-MS: 291 [M+H]+

Step 7

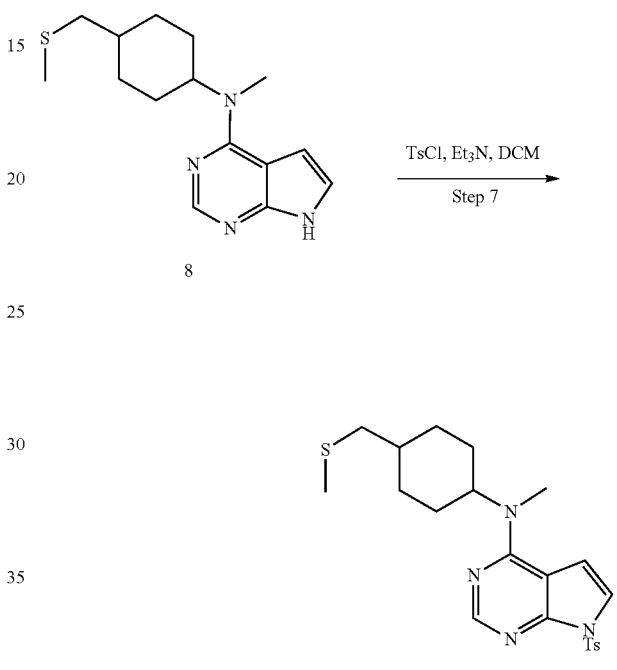

8 (11.5 g, 39.6 mmol) (prepared in step 6) and dichloromethane (110 mL) were added to a 500 mL single-necked flask at 0° C., then TsCl (11.3 g, 59.4 mmol) and triethylamine (8.0 g, 79.2 mmol) were added successively, and a reaction was performed for 3 h at room temperature. The reaction liquid was washed with saturated salt solution, dried with anhydrous sodium sulfate, and spin-dried to obtain a crude product (14.5 g). LC-MS: 445 [M+H]+

Step 8

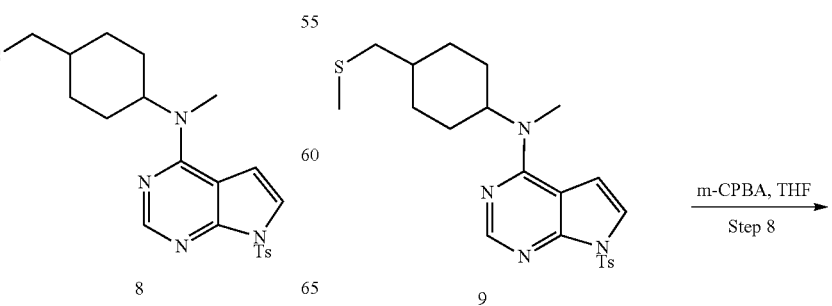

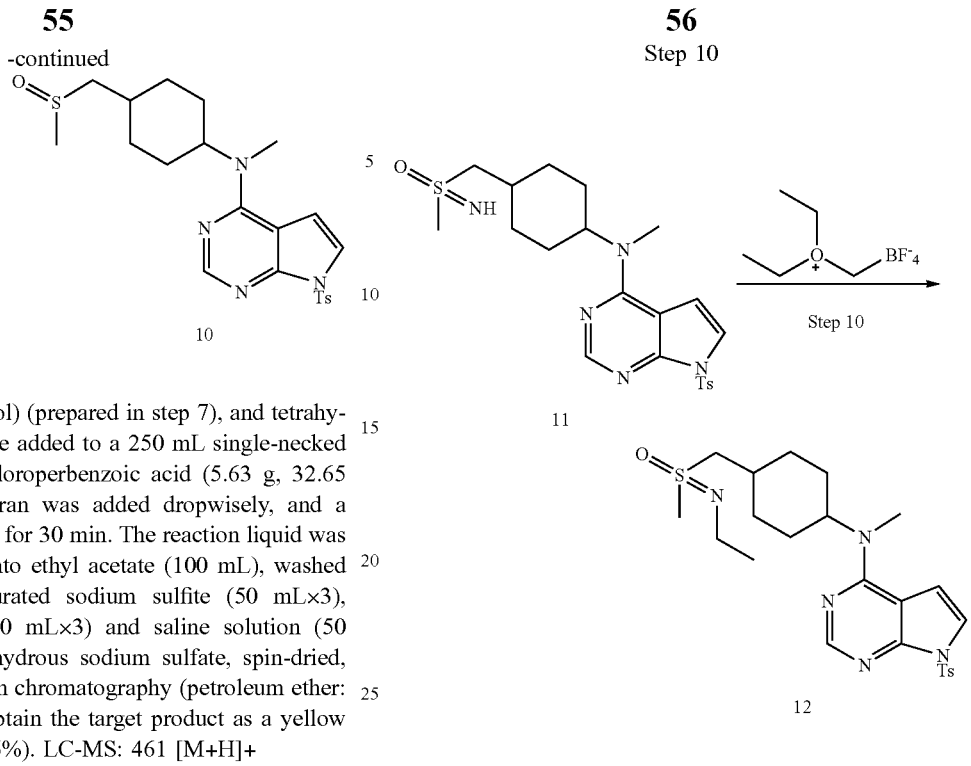

9 (14.5 g, 32.65 mmol) (prepared in step 7), and tetrahydrofuran (120 mL) were added to a 250 mL single-necked flask at 0° C.; metachloroperbenzoic acid (5.63 g, 32.65 mmol) in tetrahydrofuran was added dropwisely, and a reaction was performed for 30 min. The reaction liquid was concentrated, poured into ethyl acetate (100 mL), washed successively with saturated sodium sulfite (50 mL×3), sodium bicarbonate (50 mL×3) and saline solution (50 mL×3), dried with anhydrous sodium sulfate, spin-dried, and subjected to column chromatography (petroleum ether: ethyl acetate=1:2) to obtain the target product as a yellow solid (7.0 g, yield: 46.6%). LC-MS: 461 [M+H]+

Step 9

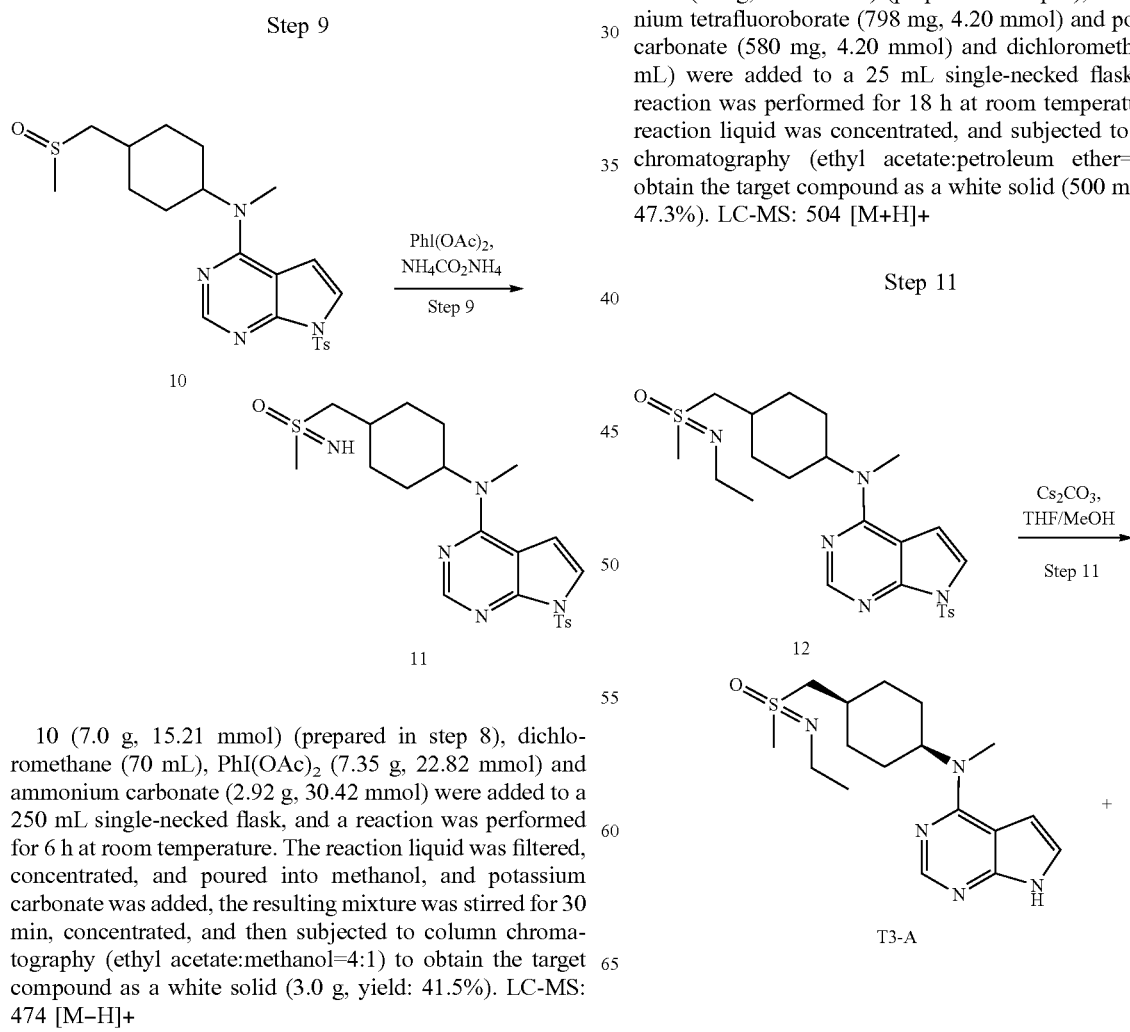

10 (7.0 g, 15.21 mmol) (prepared in step 8), dichloromethane (70 mL), PhI(OAc)$_2$ (7.35 g, 22.82 mmol) and ammonium carbonate (2.92 g, 30.42 mmol) were added to a 250 mL single-necked flask, and a reaction was performed for 6 h at room temperature. The reaction liquid was filtered, concentrated, and poured into methanol, and potassium carbonate was added, the resulting mixture was stirred for 30 min, concentrated, and then subjected to column chromatography (ethyl acetate:methanol=4:1) to obtain the target compound as a white solid (3.0 g, yield: 41.5%). LC-MS: 474 [M−H]+

Step 10

11 (1.0 g, 2.10 mmol) (prepared in step 9), triethyloxonium tetrafluoroborate (798 mg, 4.20 mmol) and potassium carbonate (580 mg, 4.20 mmol) and dichloromethane (10 mL) were added to a 25 mL single-necked flask, and a reaction was performed for 18 h at room temperature. The reaction liquid was concentrated, and subjected to column chromatography (ethyl acetate:petroleum ether=1:1) to obtain the target compound as a white solid (500 mg, yield: 47.3%). LC-MS: 504 [M+H]+

Step 11

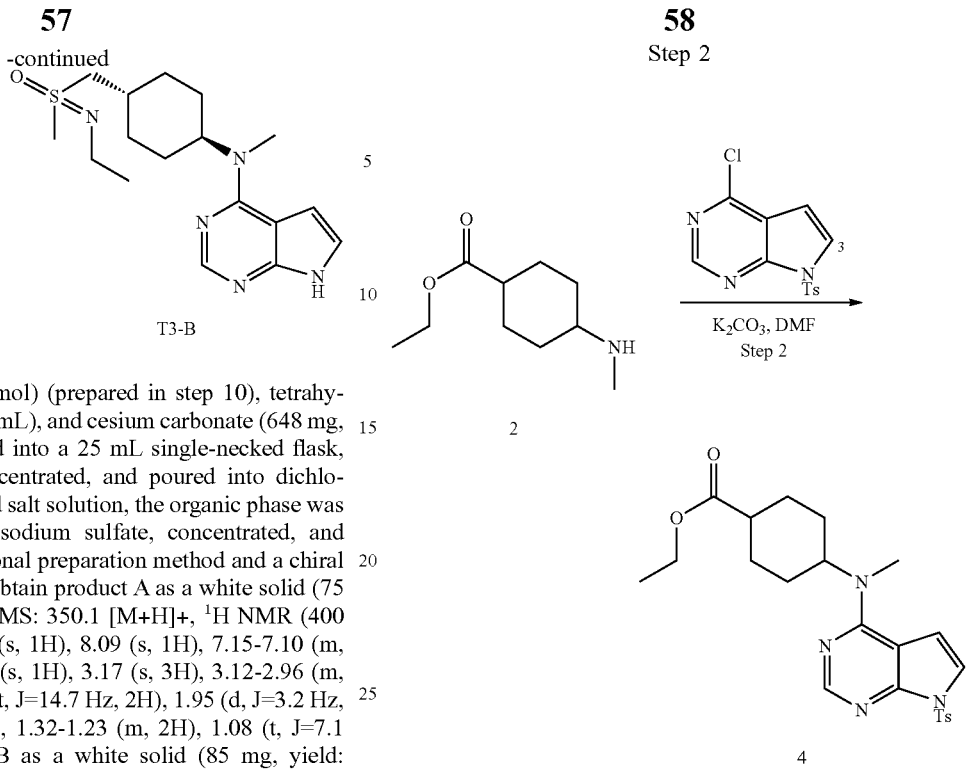

T3-B 12 (500 mg, 0.99 mmol) (prepared in step 10), tetrahydrofuran/methanol (5.0 mL), and cesium carbonate (648 mg, 1.98 mmol) were added into a 25 mL single-necked flask, refluxed for 12 h, concentrated, and poured into dichloromethane and saturated salt solution, the organic phase was dried with anhydrous sodium sulfate, concentrated, and subjected to a conventional preparation method and a chiral preparation method to obtain product A as a white solid (75 mg, yield: 21.7%), LC-MS: 350.1 [M+H]+, $^1$H NMR (400 MHz, DMSO) δ 11.60 (s, 1H), 8.09 (s, 1H), 7.15-7.10 (m, 1H), 6.53 (s, 1H), 4.66 (s, 1H), 3.17 (s, 3H), 3.12-2.96 (m, 4H), 2.93 (s, 3H), 2.07 (t, J=14.7 Hz, 2H), 1.95 (d, J=3.2 Hz, 1H), 1.76-1.68 (m, 4H), 1.32-1.23 (m, 2H), 1.08 (t, J=7.1 Hz, 3H) and product B as a white solid (85 mg, yield: 24.6%), LC-MS: 350.1 [M+H]+, $^1$H NMR (400 MHz, DMSO) δ 11.60 (s, 1H), 8.09 (s, 1H), 7.12 (d, J=1.2 Hz, 1H), 6.53 (d, J=2.6 Hz, 1H), 4.67 (s, 1H), 3.19 (d, J=19.5 Hz, 3H), 3.12-2.96 (m, 4H), 2.94 (d, J=5.2 Hz, 3H), 2.07 (t, J=14.9 Hz, 2H), 1.93 (d, J=17.4 Hz, 1H), 1.76-1.68 (m, 4H), 1.27 (dd, J=14.6, 6.9 Hz, 2H), 1.09 (dd, J=7.2, 3.9 Hz, 3H).

Example 4: T4 Synthesis

Step 1

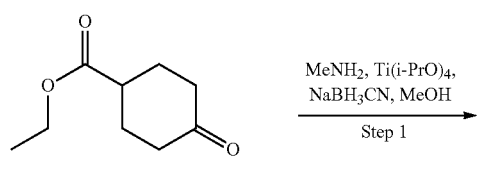

1 (220 g, 1.29 mol), and MeOH (40 mL) were added to a 5 L single-necked flask, and methylamine in tetrahydrofuran (0.78 L, 1.55 mol, 2 M in THF), tetraisopropyl titanate (733 g, 2.58 mol) and NaBH$_3$CN (162 g, 2158 mol) were added successively, the resulting mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]$^+$

Step 2

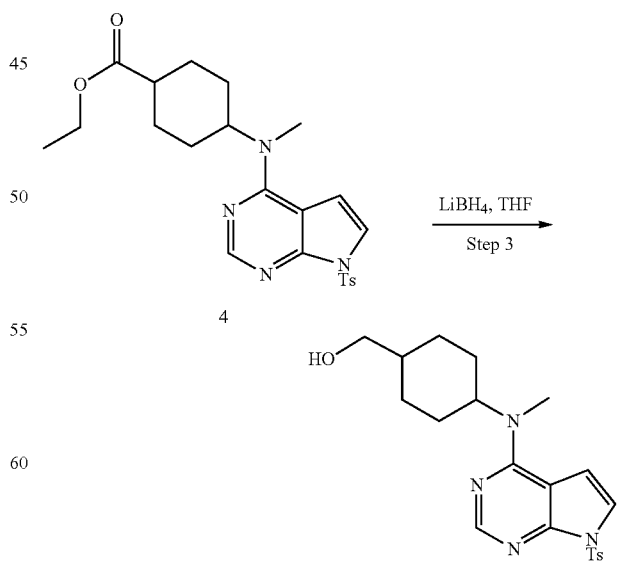

2 (70 g, 378 mmol) (prepared by step 1), 3 (96.7 g, 315 mmol), potassium carbonate (86.9 g, 630 mmol) and DMF (300 mL) were added to a 1 L single-necked round bottom flask, and a reaction was performed for 18 h at 100° C. After adding ice water, the resulting mixture was subjected to suction filtration, and the resulting filter cake was dried to obtain the target product as a yellow solid (136 g, yield: 94.6%). LC-MS: 457[M+H]$^+$

Step 3

4 (136 g, 298 mmol) (prepared in step 2) and tetrahydrofuran (1.0 L) were added to a 2 L single-necked flask, then lithium borohydride (13.0 g, 596 mmol) was added in batches, and a reaction was performed for 5 h at 50° C. Methanol (20 mL) was added for quenching, and the mixture was poured into water, extracted with dichloromethane (1.0 L×3), washed with saturated salt solution (500 mL×3), dried with anhydrous sodium sulfate, and spin-dried to obtain the target product as a white solid (75 g, yield: 60.8%). LC-MS: 415 [M+H]+

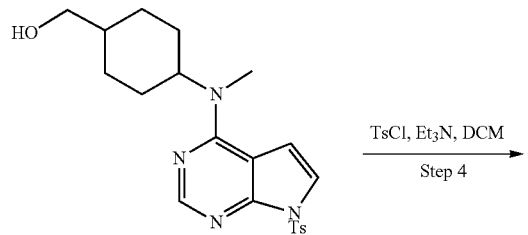

5 (75 g, 181 mmol) (prepared in step 3) and dichloromethane (750 mL) were added to a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

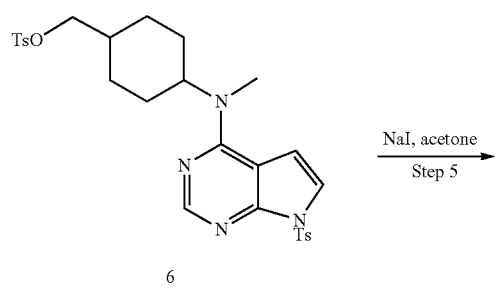

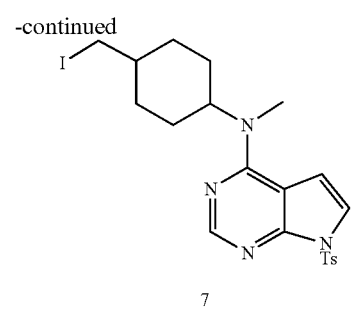

6 (80 g, 141 mmol) (prepared in step 4), acetone (500 mL) and sodium iodide (42.2 g, 282 mmol) were added to a 1 L single-necked flask, refluxed for 16 h, spin-dried, and subjected to column chromatography (petroleum ether:ethyl acetate=1:2) to obtain the target product as a yellow solid (70 g, yield: 94.7%). LC-MS: 525 [M+H]+

Step 6

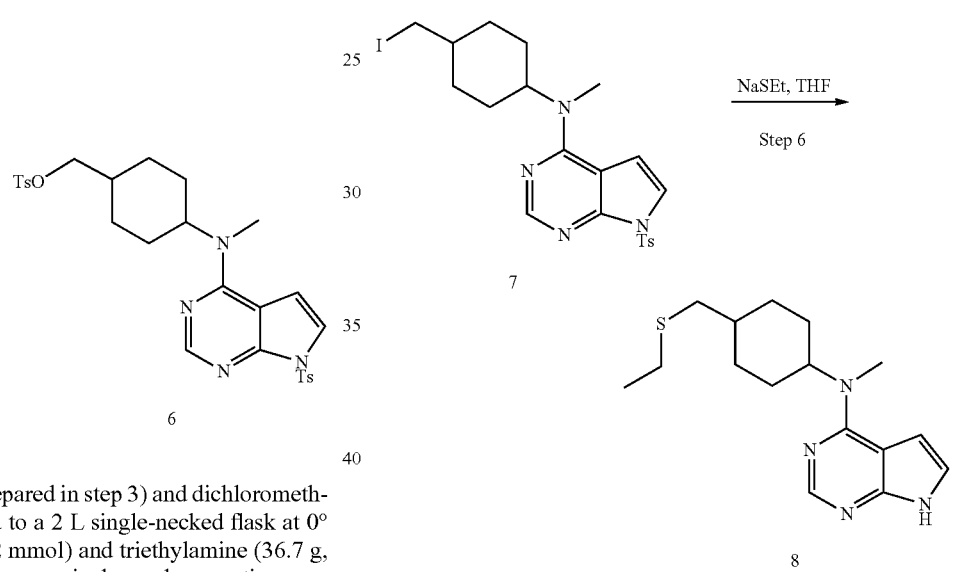

7 (15 g, 28.62 mmol) (prepared in step 5), tetrahydrofuran (120 mL) and sodium ethanethiolate (4.82 g, 57.24 mmol) were added to a 1 L single-necked flask, refluxed for 12 h, spin-dried, and subjected to column chromatography (petroleum ether:ethyl acetate=1:1) to obtain the target product as a yellow solid (7.5 g, yield: 86.2%). LC-MS: 305 [M+H]+

Step 7

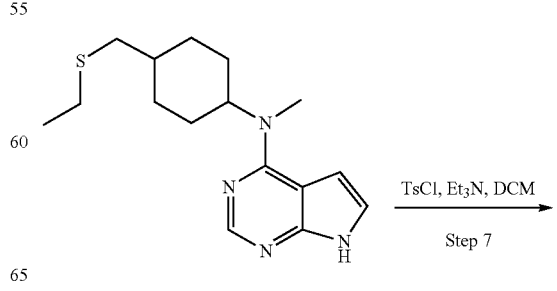

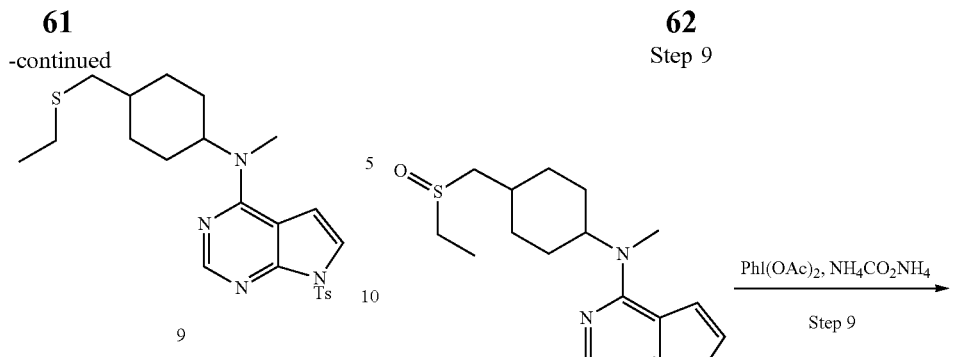

8 (7.5 g, 39.6 mmol) (prepared in step 6) and dichloromethane (80 mL) were added to a 500 mL single-necked flask at 0° C., then TsCl (7.06 g, 37.01 mmol) and triethylamine (5.0 g, 49.34 mmol) were added successively, and a reaction was performed for 3 h at room temperature. The reaction liquid was washed with saturated salt solution (50 mL×3), dried with anhydrous sodium sulfate, and spin-dried to obtain a crude product (5.5 g). LC-MS: 459 [M+H]+

Step 8

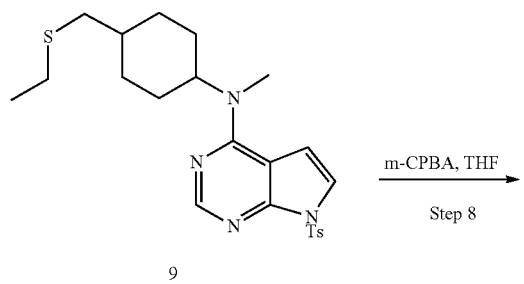

9 (2.6 g, 5.68 mmol) (prepared in step 7), and tetrahydrofuran (30 mL) were added to a 250 mL single-necked flask at 0° C.; metachloroperbenzoic acid (980 mg, 5.68 mmol) in tetrahydrofuran was added dropwise, and a reaction was performed for 30 min. The reaction liquid was concentrated, poured into ethyl acetate (30 mL), washed successively with saturated sodium sulfite (20 mL×3), sodium bicarbonate (20 mL×3) and saline solution (20 mL×3), dried with anhydrous sodium sulfate, spin-dried, and subjected to column chromatography (petroleum ether:ethyl acetate=1:2) to obtain the target product as a yellow solid (2.0 g, yield: 74.3%). LC-MS: 475 [M+H]+

Step 9

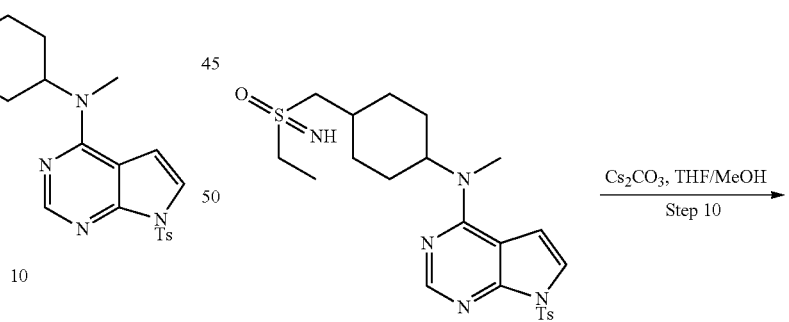

10 (2.0 g, 4.22 mmol) (prepared in step 8), dichloromethane (20 mL), PhI(OAc)$_2$ (2.04 g, 6.33 mmol), and ammonium carbonate (811 mg, 8.44 mmol) were added into a 250 mL single-necked flask, and a reaction was performed for 6 h at room temperature. The reaction liquid was filtered, concentrated, and poured into methanol, and potassium carbonate was added, the resulting mixture was stirred for 30 min, concentrated, and then subjected to column chromatography (ethyl acetate:methanol=4:1) to obtain the target compound as a white solid (1.2 g, yield: 58.1%). LC-MS: 488 [M−H]+

Step 10

-continued

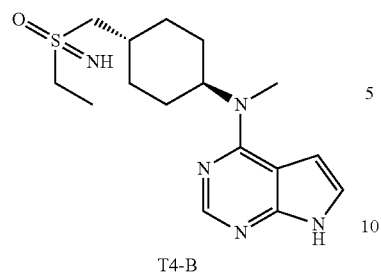

T4-B 11 (1.0 g, 2.04 mmol) (prepared in step 9), tetrahydrofuran/methanol (10 mL), and cesium carbonate (1.33 g, 4.08 mmol) were added into a 25 mL single-necked flask, refluxed for 12 h, concentrated, and poured into dichloromethane and saturated salt solution, the organic phase was dried with anhydrous sodium sulfate, concentrated, and subjected to a conventional preparation method and a chiral preparation method to obtain product A as a white solid (20 mg, yield: 2.9%), LC-MS: 336 [M+H]+, $H^1$-NMR: $^1$H NMR (400 MHz, DMSO) δ 11.61 (s, 1H), 8.09 (s, 1H), 7.13 (s, 1H), 6.54 (s, 1H), 4.67 (s, 1H), 3.90-3.83 (m, 1H), 3.17 (s, 3H), 3.06-2.93 (m, 4H), 2.12-2.01 (m, 3H), 1.73-1.70 (m, 4H), 1.31-1.22 (m, 5H) and product B as a white solid (25 mg, yield: 3.7%), LC-MS: 336 [M+H]+, $H^1$—NMR: $^1$H NMR (400 MHz, DMSO) δ 11.59 (s, 1H), 8.09 (s, 1H), 7.12 (dd, J=3.3, 2.6 Hz, 1H), 6.54 (s, 1H), 4.67 (s, 1H), 3.58 (s, 1H), 3.17 (s, 3H), 3.06-2.89 (m, 4H), 2.16-1.93 (m, 3H), 1.74-1.69 (m, 4H), 1.25-1.23 (m, 5H).

Example 5: T5 Synthesis

Step 1

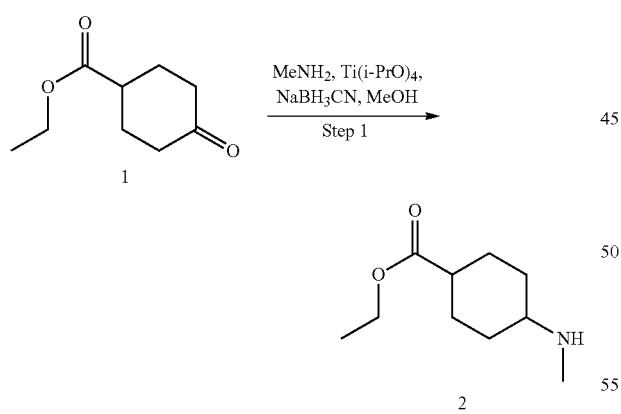

1 (220 g, 1.29 mol), and MeOH (40 mL) were added into a 5 L single-necked flask, and methylamine in tetrahydrofuran (0.78 L, 1.55 mol, 2 M in THF), tetraisopropyl titanate (733 g, 2.58 mol) and NaBH$_3$CN (162 g, 2.58 mol) were added successively, the resulting mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]+

Step 2

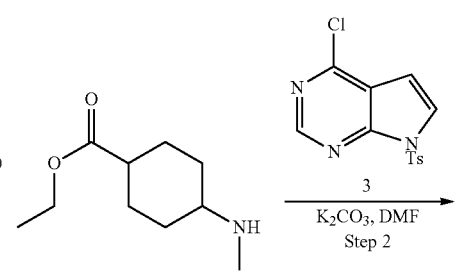

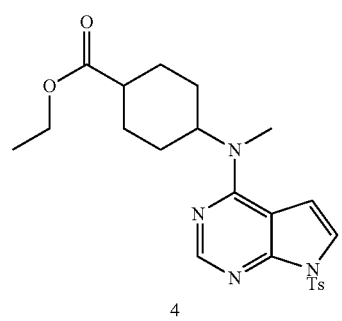

2 (70 g, 378 mmol) (prepared by step 1), 3 (96.7 g, 315 mmol), potassium carbonate (86.9 g, 630 mmol) and DMF (300 mL) were added into a 1 L single-necked round bottom flask, and a reaction was performed for 18 h at 100° C. After adding ice water, the resulting mixture was subjected to suction filtration, and the resulting filter cake was dried to obtain the target product as a yellow solid (136 g, yield: 94.6%). LC-MS: 457[M+H]+

Step 3

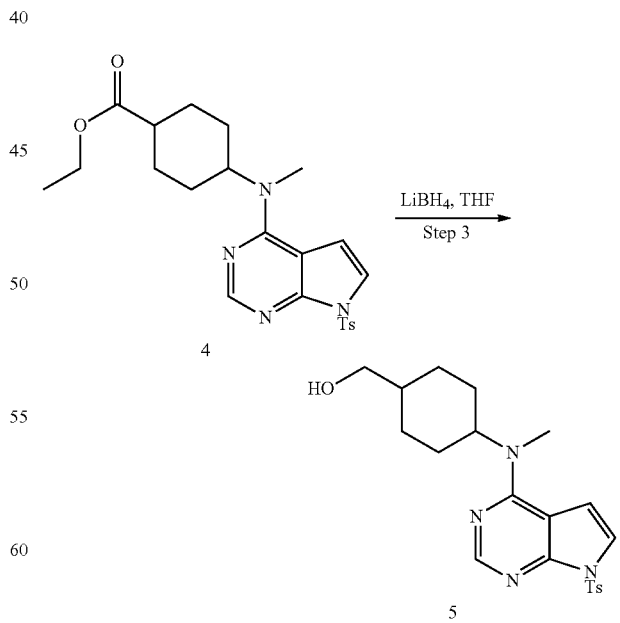

4 (136 g, 298 mmol) (prepared in step 2) and tetrahydrofuran (1.0 L) were added into a 2 L single-necked flask, then lithium borohydride (13.0 g, 596 mmol) was added in batches, and a reaction was performed for 5 h at 50° C. Methanol (20 mL) was added for quenching, and the mixture was poured into water, extracted with dichloromethane (1.0 L×3), washed with saturated salt solution (500 mL×3), dried with anhydrous sodium sulfate, and spin-dried to obtain the target product as a white solid (75 g, yield: 60.8%). LC-MS: 415 [M+H]+

Step 4

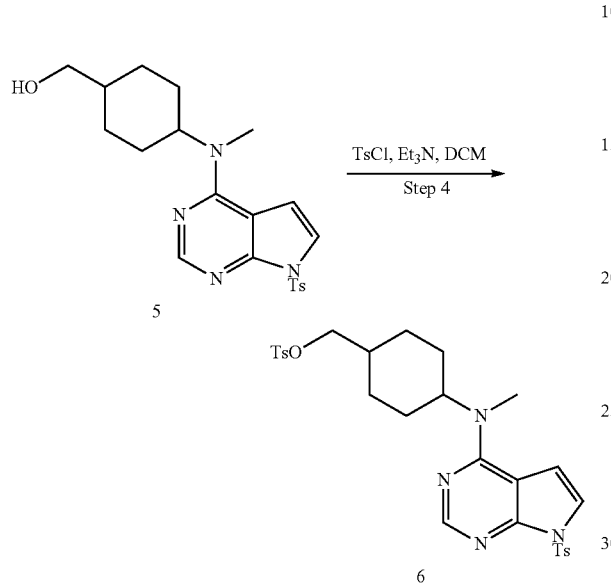

5 (75 g, 181 mmol) (prepared in step 3) and dichloromethane (750 mL) were added into a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

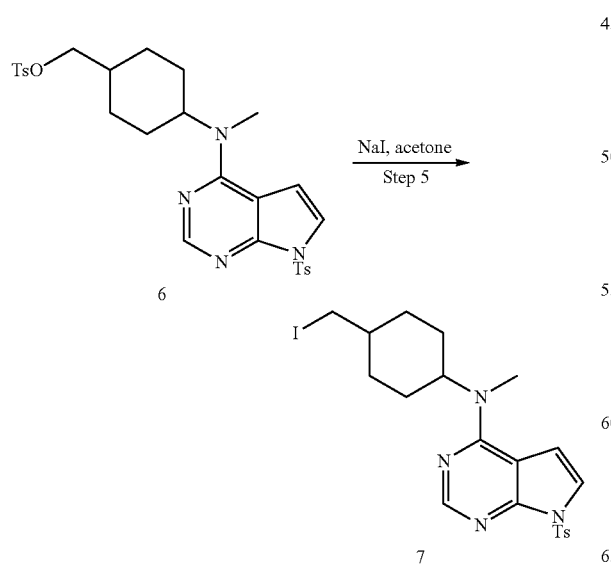

6 (80 g, 141 mmol) (prepared in step 4), acetone (500 mL) and sodium iodide (42.2 g, 282 mmol) were added into a 1 L single-necked flask, refluxed for 16 h, spin-dried, and subjected to column chromatography (petroleum ether:ethyl acetate=1:2) to obtain the target product as a yellow solid (70 g, yield: 94.7%). LC-MS: 525 [M+H]+

Step 6

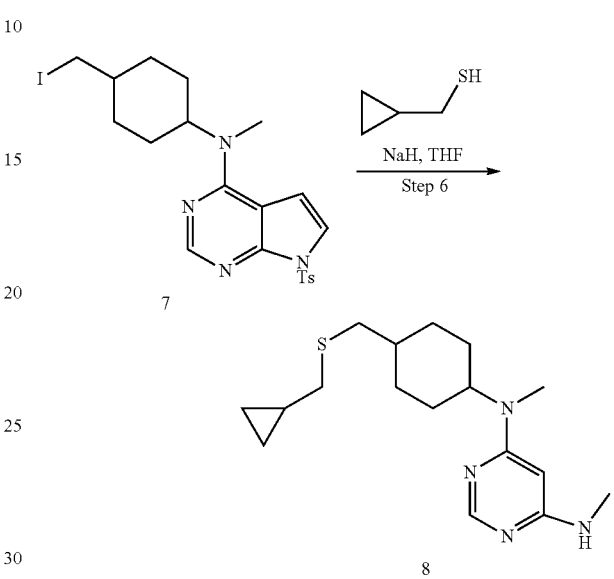

7 (1.1 g, 2.10 mmol) (prepared in step 5), cyclopropyl methanthiol (154 mg, 1.75 mmol), tetrahydrofuran (12 mL) and sodium hydride (140 mg, 3.50 mmol) were added into a 50 mL single-necked flask, and a reaction was performed for 30 min at room temperature. The reaction liquid was refluxed for 12 h, and spin-dried to obtain a yellow solid (1.2 g, a crude product). LC-MS: 331 [M+H]+

Step 7

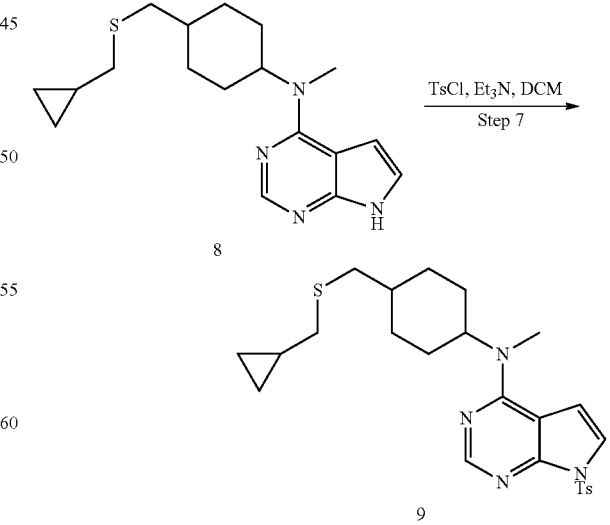

8 (1.2 g, 3.63 mmol) (prepared in step 6) and dichloromethane (12 mL) were added into a 50 mL single-necked flask at 0° C., then TsCl (831 mg, 4.36 mmol) and triethylamine (735 mg, 7.26 mmol) were added successively, and a reaction was performed for 3 h at room temperature. The reaction liquid was washed with saturated salt solution, dried with anhydrous sodium sulfate, and spin-dried to obtain a crude product (1.0 g). LC-MS: 485 [M+H]+

Step 8

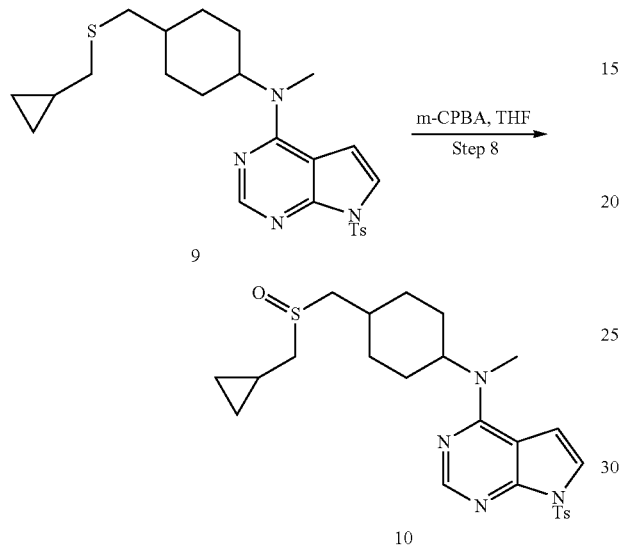

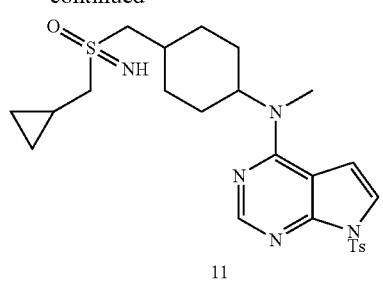

10 (320 mg, 0.64 mmol) (prepared in step 8), dichloromethane (5 mL), PhI(OAc)₂ (309 mg, 0.96 mmol) and ammonium carbonate (123 mg, 1.28 mmol) were added into a 250 mL single-necked flask, and a reaction was performed for 6 h at room temperature. The reaction liquid was filtered, concentrated, and poured into methanol, and potassium carbonate was added, the resulting mixture was stirred for 30 min, concentrated, and then subjected to column chromatography (ethyl acetate:methanol=4:1) to obtain the target compound as a white solid (300 mg, yield: 91.0%). LC-MS: 514 [M−H]+

Step 10

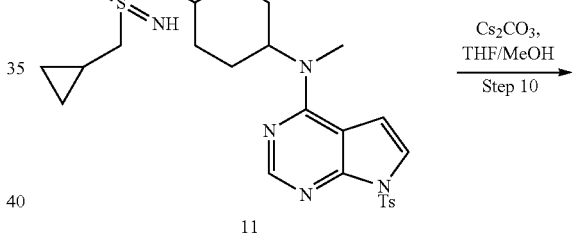

9 (1.0 g, 2.07 mmol) (prepared in step 7), and tetrahydrofuran (10 mL) were added into a 50 mL single-necked flask at 0° C.; metachloroperbenzoic acid (713 mg, 4.13 mmol) in tetrahydrofuran was added dropwisely, and a reaction was performed for 30 min. The reaction liquid was concentrated, poured into ethyl acetate (20 mL), washed successively with saturated sodium sulfite (10 mL×3), sodium bicarbonate (10 mL×3) and saline solution (10 mL×3), dried with anhydrous sodium sulfate, spin-dried, and then subjected to column chromatography (petroleum ether:ethyl acetate=1:2) to obtain the target product as a yellow solid (320 mg, yield: 30.9%). LC-MS: 501 [M+H]+

Step 9

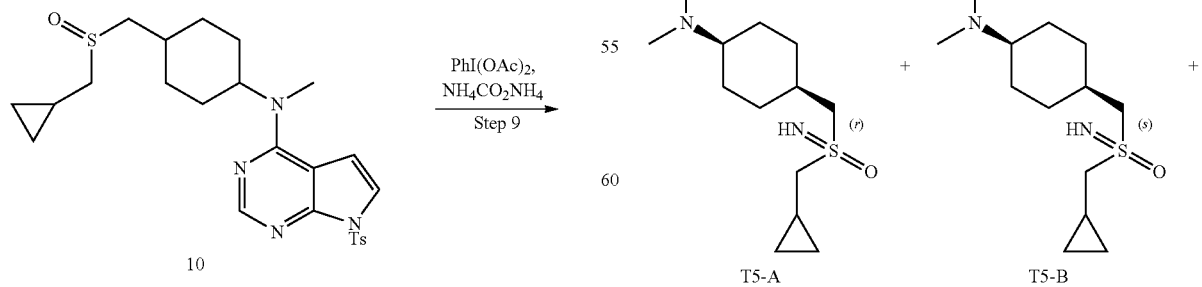

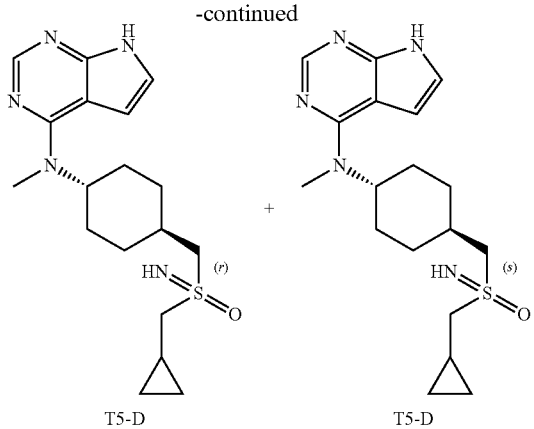

T5-D        T5-D 11 (300 mg, 0.58 mmol), tetrahydrofuran/methanol (5.0 mL), and cesium carbonate (380 mg, 1.16 mmol) were added into a 25 mL single-necked flask, refluxed for 12 h, concentrated, and poured into dichloromethane and saturated salt solution; the organic phase was dried with anhydrous sodium sulfate, concentrated, and subjected to a conventional preparation method and a chiral preparation method to obtain product A as a white solid (4 mg, yield: 1.9%), LC-MS: 362.2 [M+H]+, $^1$H NMR (400 MHz, MeOD) δ 8.12 (s, 1H), 7.14 (d, J=3.6 Hz, 1H), 6.68 (d, J=3.6 Hz, 1H), 4.72 (s, 1H), 3.34 (s, 3H), 3.16 (d, J=7.1 Hz, 2H), 2.08 (dd, J=28.6, 9.0 Hz, 3H), 1.90 (t, J=8.4 Hz, 4H), 1.72 (d, J=8.7 Hz, 2H), 1.35-1.21 (m, 5H), 0.80-0.74 (m, 2H), 0.52-0.45 (m, 2H); product B as a white solid (5 mg, yield: 2.4%), LC-MS: 362.2 [M+H]+, $^1$H NMR (400 MHz, MeOD) δ 8.11 (s, 1H), 7.11 (d, J=3.6 Hz, 1H), 6.65 (d, J=3.6 Hz, 1H), 4.73 (s, 1H), 3.30 (d, J=6.8 Hz, 3H), 3.15 (d, J=7.1 Hz, 2H), 2.08 (dd, J=28.8, 9.0 Hz, 3H), 1.90 (t, J=8.6 Hz, 4H), 1.72 (s, 2H), 1.41-1.15 (m, 3H), 0.81-0.71 (m, 2H), 0.49 (dd, J=7.6, 4.6 Hz, 2H); product C as a white solid (12 mg, yield: 5.7%), LC-MS: 362.2 [M+H]+, $^1$H NMR (400 MHz, MeOD) δ 8.10 (s, 1H), 7.11 (d, J=3.6 Hz, 1H), 6.65 (d, J=3.6 Hz, 1H), 4.73 (s, 1H), 3.28 (s, 3H), 3.22-3.09 (m, 4H), 2.30-2.12 (m, 3H), 1.84 (ddd, J=15.7, 9.8, 3.2 Hz, 4H), 1.46 (qd, J=13.0, 6.3 Hz, 2H), 1.21 (tdd, J=7.2, 6.4, 2.3 Hz, 1H), 0.79-0.72 (m, 2H), 0.50-0.42 (m, 2H); product D as a white solid (15 mg, yield: 7.2%), LC-MS: 362.2 [M+H]+, $^1$H NMR (400 MHz, MeOD) δ 8.10 (s, 1H), 7.11 (d, J=3.6 Hz, 1H), 6.65 (d, J=3.6 Hz, 1H), 4.73 (s, 1H), 3.28 (s, 3H), 3.22-3.09 (m, 4H), 2.30-2.23 (m, 1H), 2.16 (dd, J=13.1, 3.1 Hz, 2H), 1.92-1.78 (m, 4H), 1.46 (qd, J=13.0, 6.3 Hz, 2H), 1.25-1.17 (m, 1H), 0.79-0.71 (m, 2H), 0.47 (td, J=4.7, 2.1 Hz, 2H).

Example 6: T6 Synthesis

Step 1

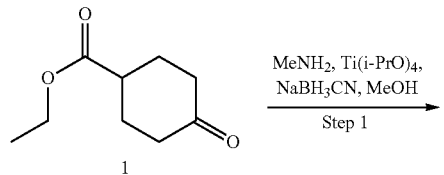

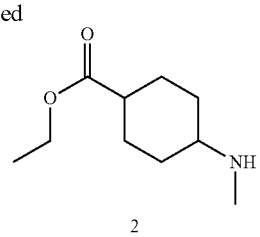

1 (220 g, 1.29 mol), and MeOH (40 mL) were added into a 5 L single-necked flask, and methylamine in tetrahydrofuran (0.78 L, 1.55 mol, 2 M in THF), tetraisopropyl titanate (733 g, 2.58 mol) and NaBH$_3$CN (162 g, 2.58 mol) were added successively, the resulting mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]+

Step 2

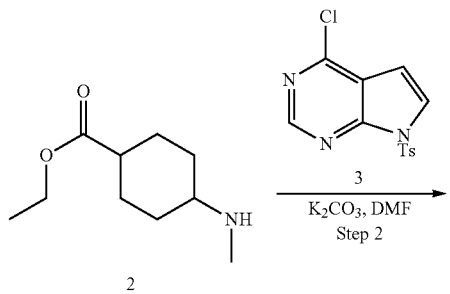

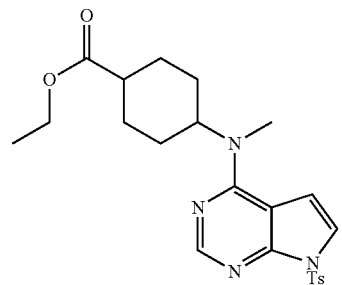

2 (70 g, 378 mmol) (prepared by step 1), 3 (96.7 g, 315 mmol), potassium carbonate (86.9 g, 630 mmol) and DMF (300 mL) were added into a 1 L single-necked round bottom flask, and a reaction was performed for 18 h at 100° C. After adding ice water, the resulting mixture was subjected to suction filtration, and the resulting filter cake was dried to obtain the target product as a yellow solid (136 g, yield: 94.6%). LC-MS: 457[M+H]+

Step 3

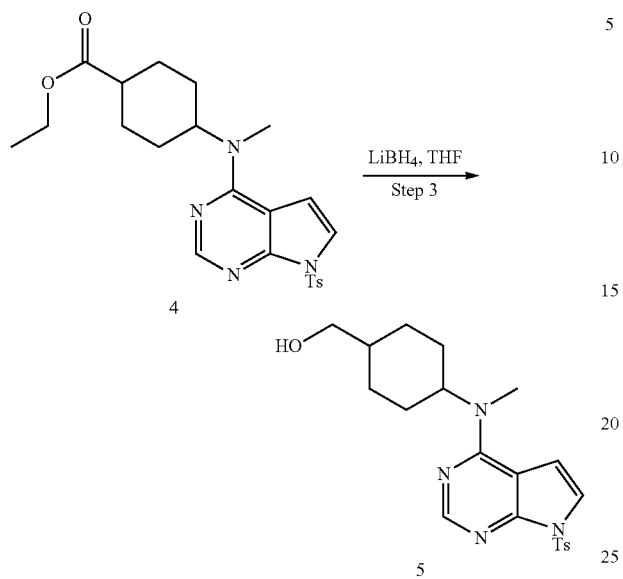

4 (136 g, 298 mmol) (prepared in step 2) and tetrahydrofuran (1.0 L) were added into a 2 L single-necked flask, then lithium borohydride (13.0 g, 596 mmol) was added in batches, and a reaction was performed for 5 h at 50° C. Methanol (20 mL) was added for quenching, and the mixture was poured to water, extracted with dichloromethane (1.0 L×3), washed with saturated salt solution (500 mL×3), dried with anhydrous sodium sulfate, and spin-dried to obtain the target product as a white solid (75 g, yield: 60.8%). LC-MS: 415 [M+H]+

Step 4

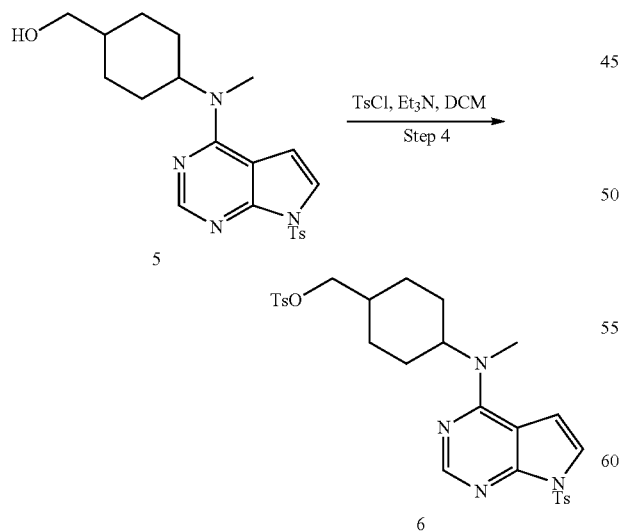

5 (75 g, 181 mmol) (prepared in step 3) and dichloromethane (750 mL) were added into a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

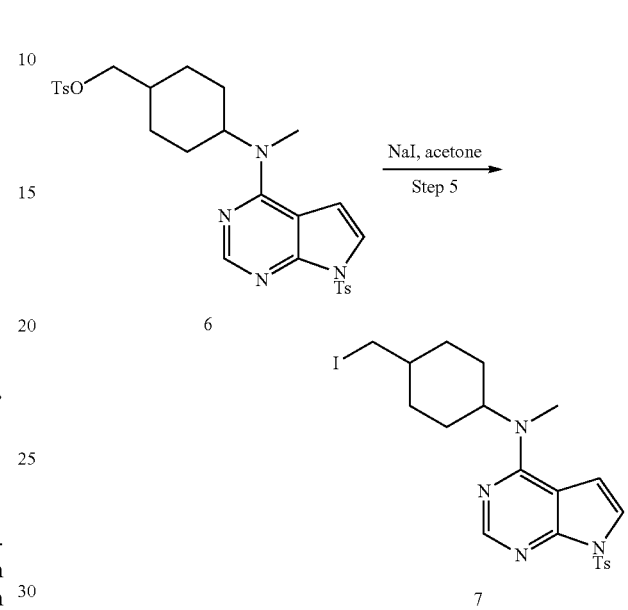

6 (80 g, 141 mmol) (prepared in step 4), acetone (500 mL) and sodium iodide (42.2 g, 282 mmol) were added into a 1 L single-necked flask, refluxed for 16 h, spin-dried, and subjected to column chromatography (petroleum ether:ethyl acetate=1:2) to obtain the target product as a yellow solid (70 g, yield: 94.7%). LC-MS: 525 [M+H]$^+$ Step 6

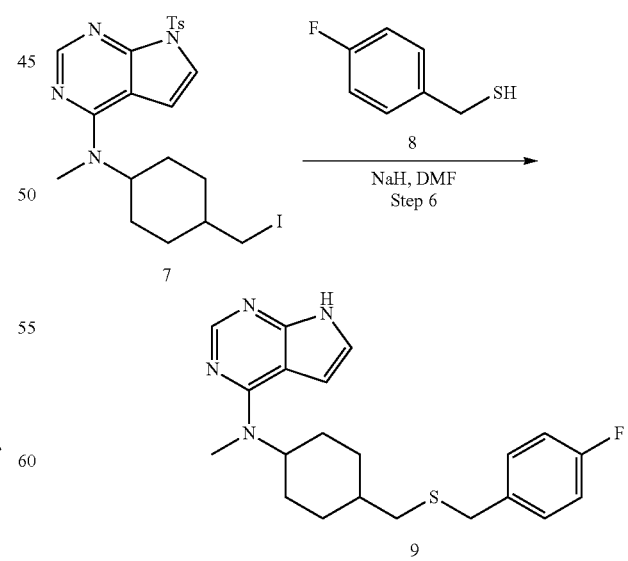

8 (473 mg, 3.33 mmol) and DMF (5 mL) were added into a 50 mL single-necked flask, and sodium hydride (266 mg, 6.66 mmol) was added at 0° C., stirred for 30 min at room temperature, 7 (2.1 g, 4.0 mmol) (prepared in step 5) was added, and a reaction was performed for 12 h at room temperature. Water was added, and the mixture was extracted with ethyl acetate (30 mL×3), washed with saturated salt solution (30 mL×3), dried with anhydrous sodium sulfate, spin-dried, and then subjected to column chromatography (dichloromethane:methanol)=30:1 to obtain the target product as a white solid (1.2 g, yield: 93.8%). LC-MS: 385 [M+H]+

Step 7

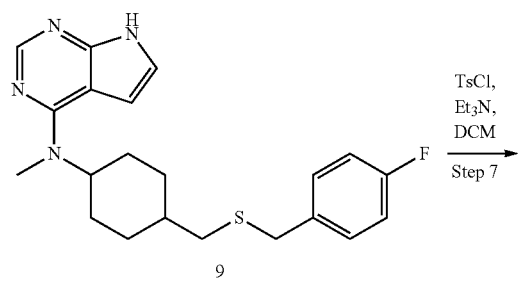

9 (1.2 g, 3.12 mmol) (prepared in step 6) and dichloromethane (15 mL) were added to a 50 mL single-necked flask at 0° C., then TsCl (893 mg, 4.69 mmol) and triethylamine (948 mg, 9.36 mmol) were added successively, and a reaction was performed for 3 h at room temperature. The reaction liquid was washed with saturated salt solution, dried with anhydrous sodium sulfate, spin-dried, and then subjected to column chromatography (petroleum ether:ethyl acetate)=2:1 to obtain the target product as a white solid (400 mg, yield: 23.8%). LC-MS: 539 [M+H]+

Step 8

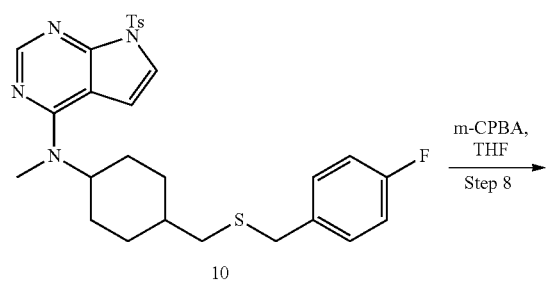

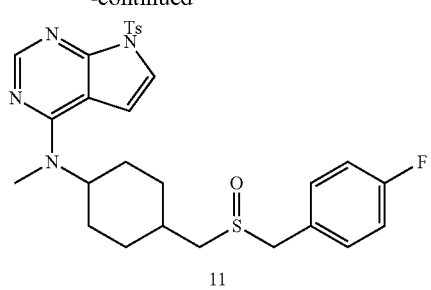

10 (400 mg, 0.74 mmol) (prepared in step 7), and tetrahydrofuran (4 mL) were added into a 25 mL single-necked flask at 0° C.; metachloroperbenzoic acid (257 mg, 1.49 mmol) in tetrahydrofuran was added dropwisely, and a reaction was performed for 30 min. The reaction liquid was concentrated, poured into ethyl acetate (10 mL), washed successively with saturated sodium sulfite (10 mL×3), sodium bicarbonate (10 mL×3) and saline solution (10 mL×3), dried with anhydrous sodium sulfate, spin-dried, and then subjected to column chromatography (petroleum ether:ethyl acetate=1:1) to obtain the target product as a yellow solid (300 mg, yield: 73.2%). LC-MS: 555 [M+H]+

Step 9

11 (300 mg, 0.54 mmol) (prepared in step 8), methanol (5 mL), PhI(OAc)$_2$ (261 mg, 0.81 mmol) and ammonium carbonate (104 mg, 1.08 mmol) were added into a 25 mL single-necked flask, and a reaction was performed for 48 h at 60° C. The reaction liquid was filtered, concentrated, and poured into methanol, and potassium carbonate was added, the resulting mixture was stirred for 30 min, concentrated, and then subjected to column chromatography (ethyl acetate:methanol=4:1) to obtain the target compound as a white solid (276 mg, yield: 89.8%). LC-MS: 570 [M+H]+

Step 10

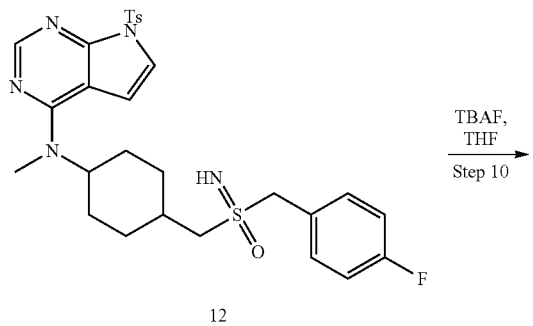

12 (276 mg, 0.48 mmol) (prepared in step 9), tetrahydrofuran (3.0 mL), cesium carbonate (251 mg, 0.96 mmol), and tetrabutylammonium fluoride (251 mg, 0.96 mmol) were added into a 25 mL single-necked flask, refluxed for 12 h, concentrated, and poured into dichloromethane and saturated salt solution, the organic phase was dried with anhydrous sodium sulfate, concentrated, and subjected to a conventional preparation method and chiral resolution (column: DAICEL CHRAL OD (250 mm×30 mm, 10 μm); Gradient Time: 20 min; Condition: 0.2% DEA EtOH & Hexane; Flow Rate: 18 mL/min; 75% EtOH) to obtain product-T6-A as a white solid (8 mg, yield: 4.0%). LC-MS: 416.2 [M+H]+, $^1$H NMR (400 MHz, MeOD) δ 8.10 (s, 1H), 7.59-7.50 (m, 2H), 7.24-7.15 (m, 2H), 7.10 (d, J=3.6 Hz, 1H), 6.64 (d, J=3.6 Hz, 1H), 4.71 (s, 1H), 4.48 (dd, J=29.1, 13.5 Hz, 2H), 3.41-3.34 (m, 1H), 3.27 (d, J=10.9 Hz, 3H), 3.22-3.17 (m, 1H), 2.60 (s, 1H), 2.09-1.98 (m, 2H), 1.91-1.83 (m, 4H), 1.68 (d, J=8.4 Hz, 2H), 1.31 (s, 1H); product T6-B as a white solid (27 mg, yield: 13.5%), LC-MS: 416.1 [M+H]+, $^1$H NMR (400 MHz, MeOD) δ 8.09 (s, 1H), 7.52 (dd, J=8.7, 5.3 Hz, 2H), 7.21-7.15 (m, 2H), 7.10 (d, J=3.6 Hz, 1H), 6.63 (d, J=3.6 Hz, 1H), 4.71 (s, 1H), 4.45 (q, J=13.6 Hz, 2H), 3.26 (s, 3H), 3.06-2.98 (m, 2H), 2.23-2.19 (m, 1H), 2.16-2.08 (m, 2H), 1.88-1.77 (m, 4H), 1.42-1.31 (m, 3H); product T6-C as a white solid (28 mg, yield: 14.1%), LC-MS: 416.1 [M+H]+, $^1$H NMR (400 MHz, MeOD) δ 8.09 (s, 1H), 7.55-7.47 (m, 2H), 7.22-7.15 (m, 2H), 7.10 (d, J=3.6 Hz, 1H), 6.63 (d, J=3.6 Hz, 1H), 4.71 (s, 1H), 4.45 (q, J=13.6 Hz, 2H), 3.26 (s, 3H), 3.07-2.97 (m, 2H), 2.21 (d, J=13.0 Hz, 1H), 2.16-2.07 (m, 2H), 1.89-1.76 (m, 4H), 1.49-1.26 (m, 3H).

Example 7: T7 Synthesis

Step 1

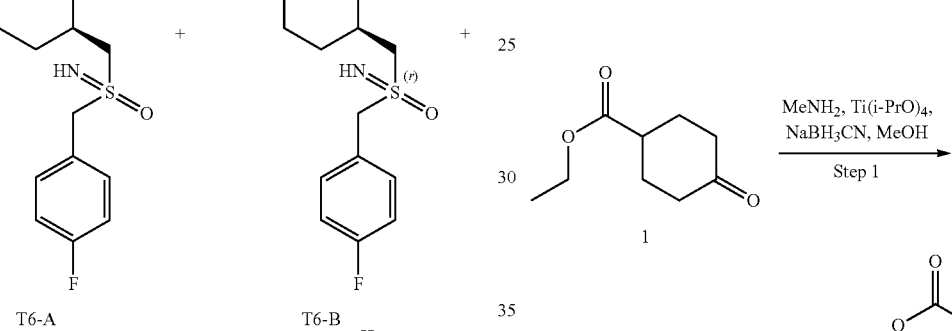

1 (220 g, 1.29 mol), and MeOH (40 mL) were added into a 5 L single-necked flask, and methylamine in tetrahydrofuran (0.78 L, 1.55 mol, 2 M in THF), tetraisopropyl titanate (733 g, 2.58 mol) and NaBH$_3$CN (162 g, 2.58 mol) were added successively, the resulting mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]$^+$ Step 2

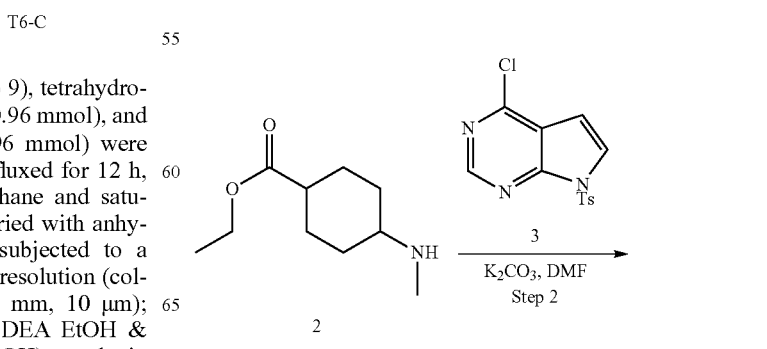

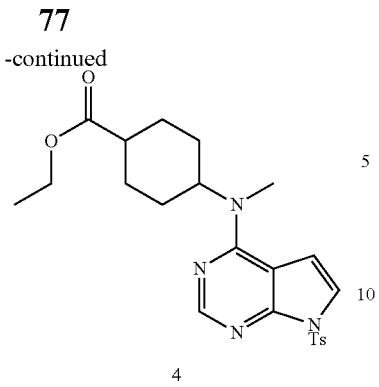

2 (70 g, 378 mmol) (prepared by step 1), 3 (96.7 g, 315 mmol), potassium carbonate (86.9 g, 630 mmol) and DMF (300 mL) were added into a 1 L single-necked round bottom flask, and a reaction was performed for 18 h at 100° C. After adding ice water, the resulting mixture was subjected to suction filtration, and the resulting filter cake was dried to obtain the target product as a yellow solid (136 g, yield: 94.6%). LC-MS: 457[M+H]$^+$ Step 3

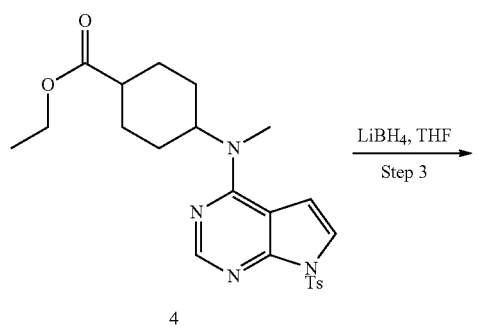

4 (136 g, 298 mmol) (prepared in step 2) and tetrahydrofuran (1.0 L) were added into a 2 L single-necked flask, then lithium borohydride (13.0 g, 596 mmol) was added in batches, and a reaction was performed for 5 h at 50° C. Methanol (20 mL) was added for quenching, and the mixture was poured into water, extracted with dichloromethane (1.0 L×3), washed with saturated salt solution (500 mL×3), dried with anhydrous sodium sulfate, and spin-dried to obtain the target product as a white solid (75 g, yield: 60.8%). LC-MS: 415 [M+H]+

Step 4

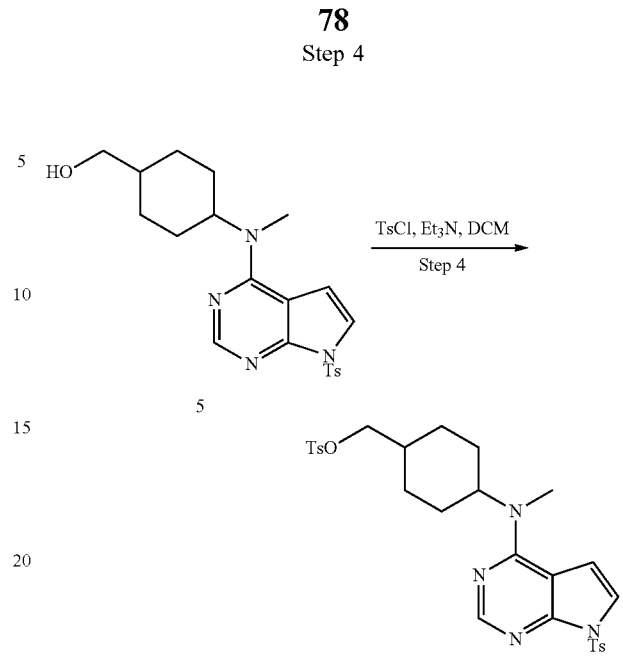

5 (75 g, 181 mmol) (prepared in step 3) and dichloromethane (750 mL) were added into a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

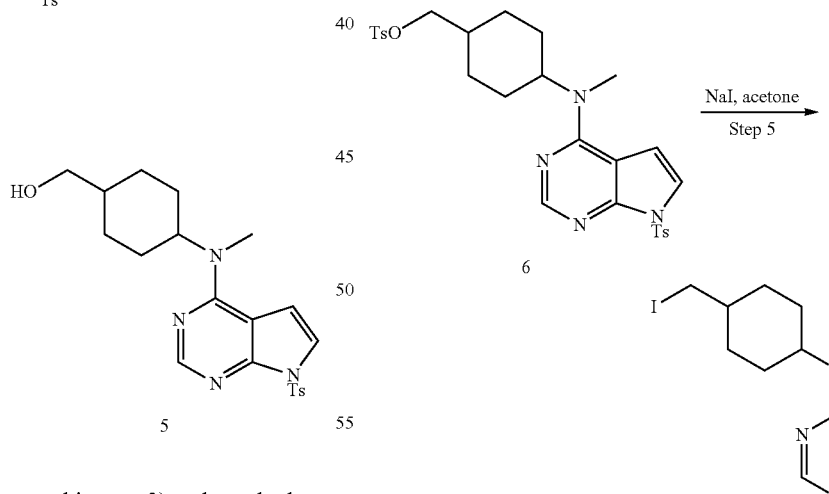

6 (80 g, 141 mmol) (prepared in step 4), acetone (500 mL) and sodium iodide (42.2 g, 282 mmol) were added into a 1 L single-necked flask, refluxed for 16 h, spin-dried, and subjected to column chromatography (petroleum ether:ethyl acetate=1:2) to obtain the target product as a yellow solid (70 g, yield: 94.7%). LC-MS: 525 [M+H]$^+$

Step 6

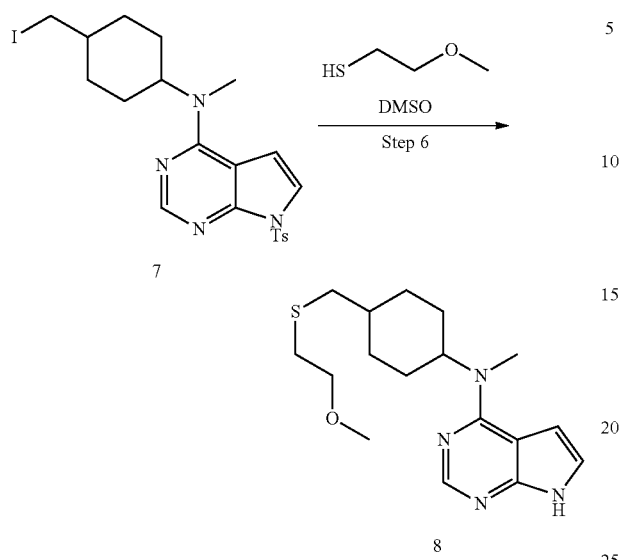

7 (1 g, 1.908 mmol) (prepared in step 5), 2-methyloxy-ethane thiol (263 mg, 2.862 mmol), dimethyl sulfoxide (15 mL) and potassium carbonate (395 mg, 2.862 mmol) were added into a 100 mL single-necked flask, and a reaction was performed over night at 130° C. The reaction liquid was spin-dried, and subjected to column chromatography (petroleum ether:ethyl acetate=1:1) to obtain the target product as a yellow solid (438 mg, yield: 47%). LC-MS: 335 [M+H]⁺

Step 7

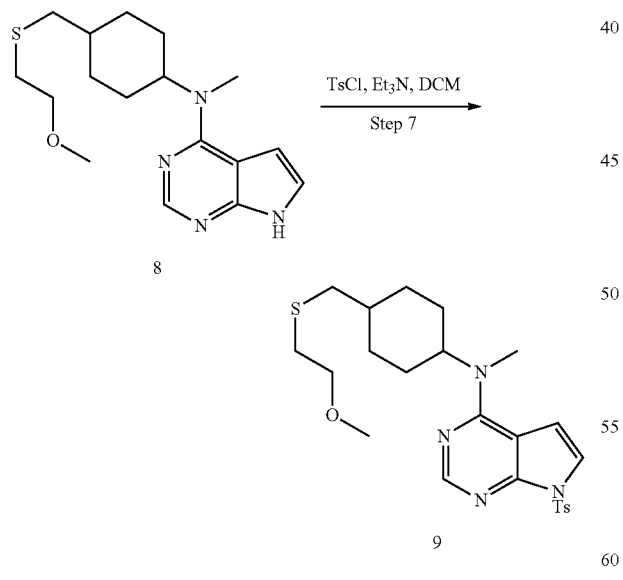

8 (410 mg, 1.2289 mmol) (prepared in step 6) and dichloromethane (10 mL) were added into a 100 mL single-necked flask at 0° C., then TsCl (468 mg, 2.4478 mmol) and triethylamine (371 mg, 79.2 mmol) were added successively, and a reaction was performed for 3 h at room temperature. The reaction liquid was washed with saturated salt solution, dried with anhydrous sodium sulfate, spin-dried, then separated by TLC (petroleum ether:ethyl acetate=1:1) to obtain the target product as a white solid (300 mg, yield: 50%). LC-MS: 489 [M+H]+

Step 8

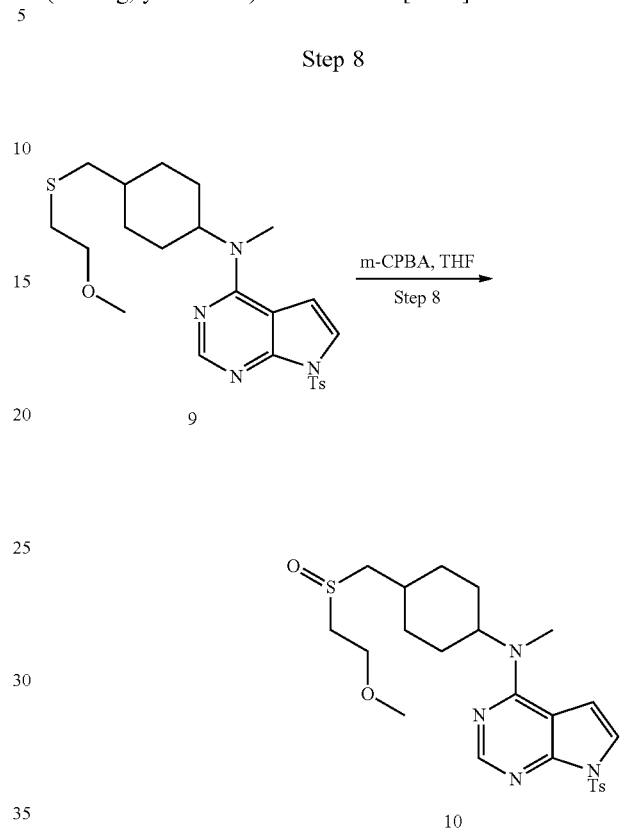

9 (300 mg, 0.6135 mmol) (prepared in step 7), and tetrahydrofuran (10 mL) were added into a 100 mL single-necked flask at 0° C.; metachloroperbenzoic acid (106 mg, 0.6135 mmol) in tetrahydrofuran was added dropwisely, and a reaction was performed for 30 min. The reaction liquid was concentrated, poured into ethyl acetate (20 mL), washed successively with saturated sodium sulfite (50 mL×3), sodium bicarbonate (50 mL×3) and saline solution (50 mL×3), dried with anhydrous sodium sulfate, spin-dried, and then subjected to TLC (dichloromethane:methanol=30:1) to obtain the target product as a yellow solid (200 mg, yield: 64.5%). LC-MS: 505 [M+H]+

Step 9

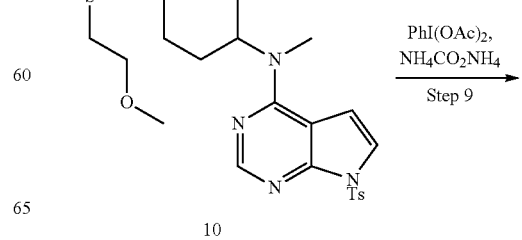

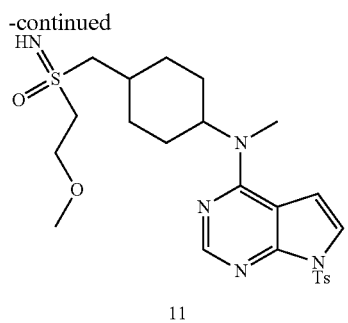

10 (200 mg, 0.3963 mmol) (prepared in step 8), methanol (10 mL), PhI(OAc)₂ (382.6 mg, 0.7926 mmol) and ammonium carbamate (139 mg, 1.1889 mmol) were added into a 100 mL single-necked flask, and a reaction was performed for 6 h at room temperature. The reaction liquid was concentrated, and subjected to TCL (dichloromethane: methanol=15:1) to obtain the target compound as a white solid (145 mg, yield: 70.4%). LC-MS: 520 [M–H]+

Step 10

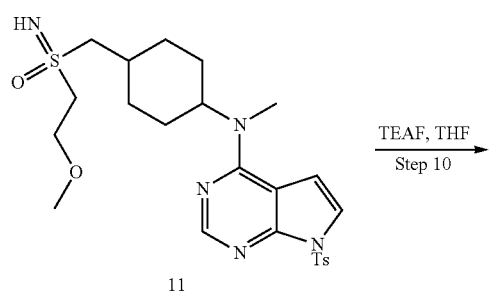

11 (145 mg, 0.2788 mmol) (prepared in step 9), tetrahydrofuran (5.0 mL), TBAF in tetrahydrofuran (2.23 mL, 2.23 mmol, 1 mmol/mL) were added into a 25 mL single-necked flask, and a reaction was performed for 12 h at 60° C. The reaction liquid was concentrated, and then subjected to a conventional method to obtain a white solid (25 mg, 31%). ¹H NMR (400 MHz, DMSO) δ 12.67 (s, 1H), 8.32 (s, 1H), 7.44 (s, 1H), 6.85 (s, 1H), 4.02 (s, 2H), 3.90-3.82 (m, 2H), 3.65 (d, J=5.8 Hz, 2H), 3.34 (s, 3H), 3.30 (s, 3H), 2.20 (s, 1H), 2.03 (dd, J=18.1, 10.7 Hz, 2H), 1.82 (s, 4H), 1.46 (s, 2H), 1.33-1.23 (m, 2H).

Example 8: T8 Synthesis

Step 1

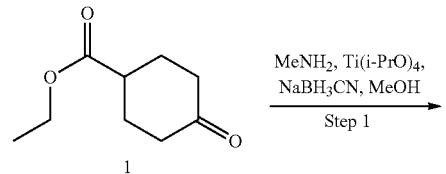

1 (220 g, 1.29 mol), and MeOH (40 mL) were added into a 5 L single-necked flask, and methylamine in tetrahydrofuran (0.78 L, 1.55 mol, 2 M in THF), tetraisopropyl titanate (733 g, 2.58 mol) and NaBH₃CN (162 g, 2.58 mol) were added successively, the resulting mixture was stirred for 18 h at room temperature, spin-dried, and then subjected to column chromatography (petroleum ether:ethyl acetate=1:1) to obtain the target product as a white oil (135 g, yield: 56.5%). LC-MS: 186[M+H]⁺

Step 2

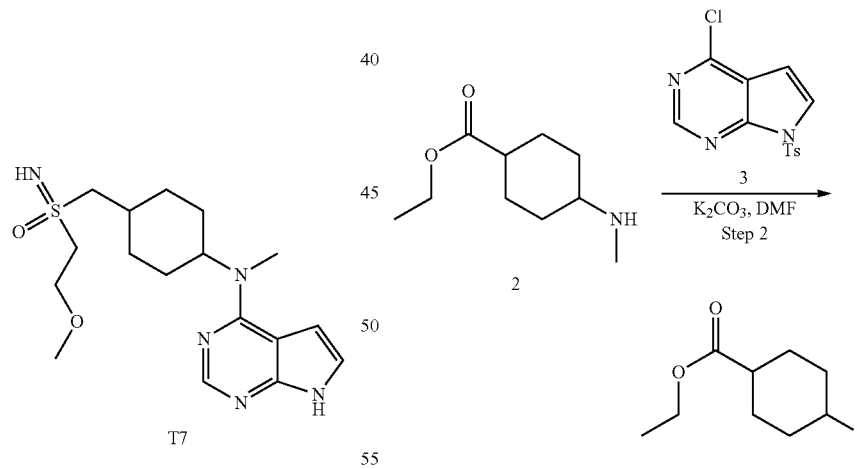

2 (70 g, 378 mmol) (prepared by step 1), 3 (96.7 g, 315 mmol), potassium carbonate (86.9 g, 630 mmol) and DMF (300 mL) were added into a 1 L single-necked round bottom flask, and a reaction was performed for 18 h at 100° C. After adding ice water, the resulting mixture was subjected to suction filtration, and the resulting filter cake was dried to obtain the target product as a yellow solid (136 g, yield: 94.6%). LC-MS: 457[M+H]⁺

Step 3

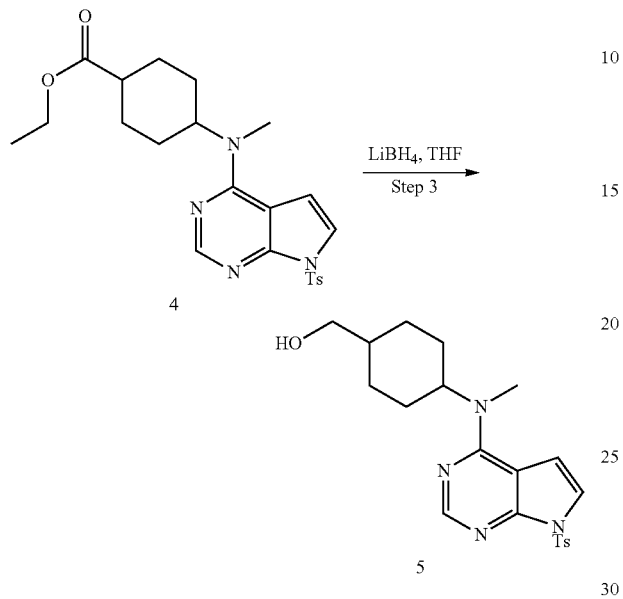

4 (136 g, 298 mmol) (prepared in step 5) and tetrahydrofuran (1.0 L) were added into a 2 L single-necked flask, then lithium borohydride (13.0 g, 596 mmol) was added in batches, and a reaction was performed for 5 h at 50° C. Methanol (20 mL) was added for quenching, and the mixture was poured into water, extracted with dichloromethane (1.0 L×3), washed with saturated salt solution (500 mL×3), dried with anhydrous sodium sulfate, and spin-dried to obtain the target product as a white solid (75 g, yield: 60.8%). LC-MS: 415 [M+H]+

Step 4

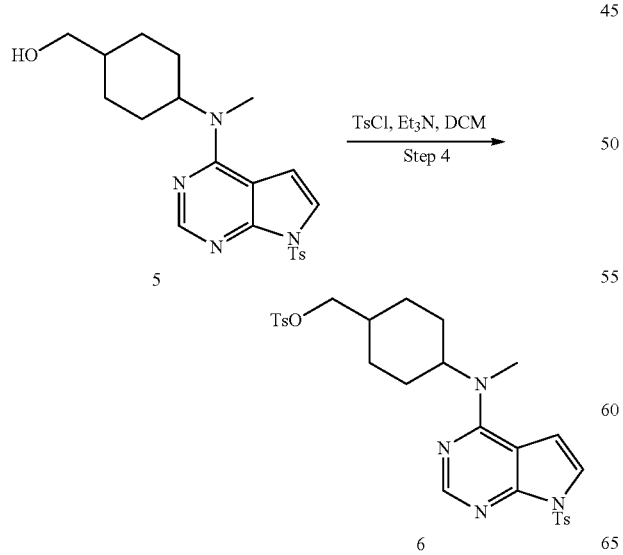

5 (75 g, 181 mmol) (prepared in step 3) and dichloromethane (750 mL) were added into a 2 L single-necked flask at 0° C., then TsCl (51.8 g, 272 mmol) and triethylamine (36.7 g, 362 mmol) were added successively, and a reaction was performed for 3 h at room temperature. The reaction liquid was washed with saturated salt solution, dried with anhydrous sodium sulfate, and spin-dried to obtain a crude product (80 g, yield: 77.8%). LC-MS: 569 [M+H]+

Step 5

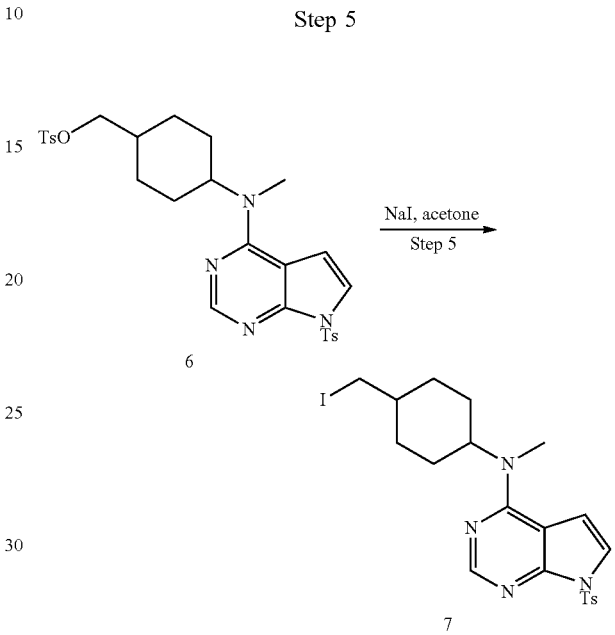

6 (80 g, 141 mmol) (prepared in step 4), acetone (500 mL) and sodium iodide (42.2 g, 282 mmol) were added into a 1 L single-necked flask, refluxed for 16 h, spin-dried, and subjected to column chromatography (petroleum ether:ethyl acetate=1:2) to obtain the target product as a yellow solid (70 g, yield: 94.7%). LC-MS: 525 [M+H]⁺

Step 6

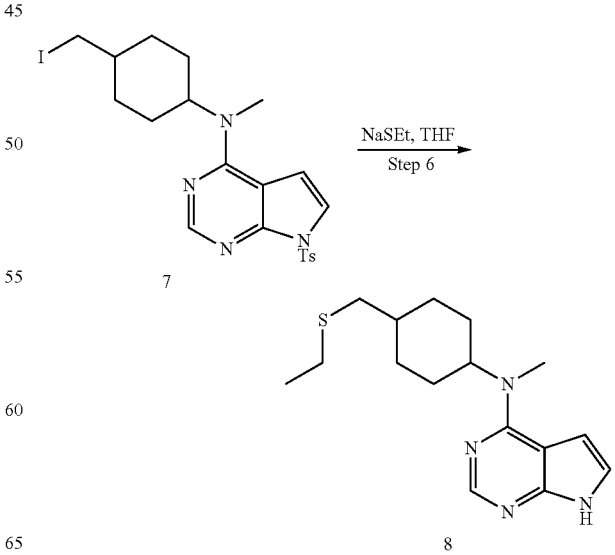

7 (15 g, 28.62 mmol) (prepared in step 5), tetrahydrofuran (200 mL) and sodium ethanethiolate (4.82 g, 57.24 mmol) were added into a 500 mL single-necked flask, refluxed for 12 h, spin-dried, and subjected to column chromatography (petroleum ether:ethyl acetate=1:1) to obtain the target product as a yellow solid (7.5 g, yield: 86.2%). LC-MS: 305 [M+H]+

Step 7

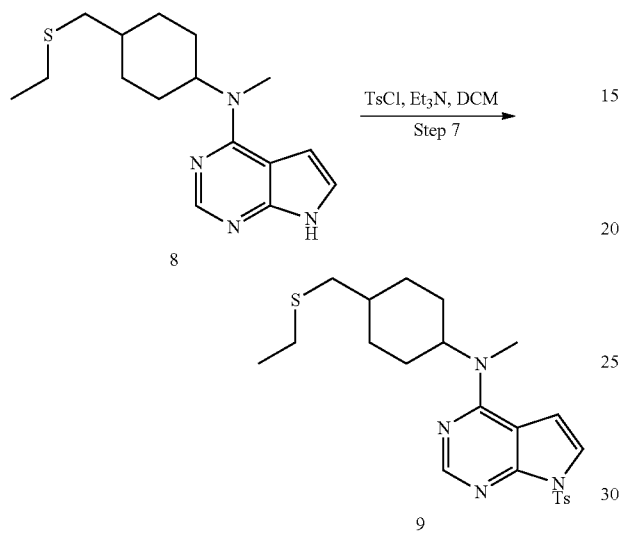

8 (7.5 g, 24.67 mmol) (prepared in step 6) and dichloromethane (80 mL) were added into a 250 mL single-necked flask at 0° C., then TsCl (7.06 g, 37.01 mmol) and triethylamine (5.0 g, 49.34 mmol) were added successively, and a reaction was performed for 3 h at room temperature. The reaction liquid was washed with saturated salt solution, dried with anhydrous sodium sulfate, and spin-dried to obtain a crude product (5.5 g). LC-MS: 459 [M+H]+

Step 8

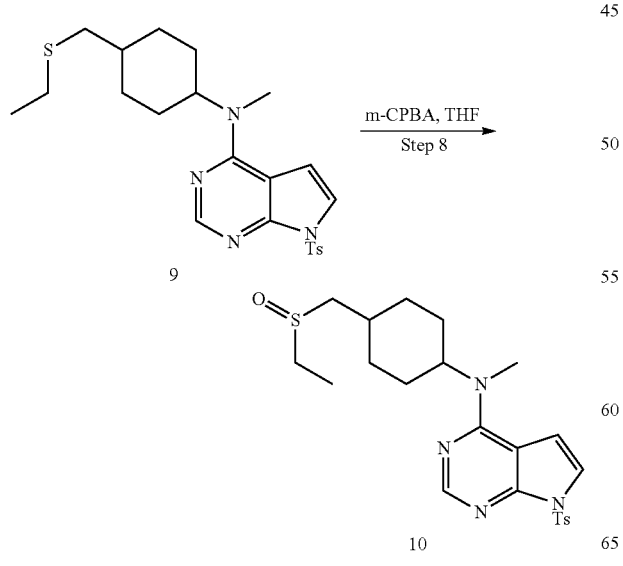

9 (14.5 g, 32.65 mmol) (prepared in step 7), and tetrahydrofuran (120 mL) were added into a 250 mL single-necked flask at 0° C.; metachloroperbenzoic acid (5.63 g, 32.65 mmol) in tetrahydrofuran was added dropwisely, and a reaction was performed for 30 min. The reaction liquid was concentrated, poured into ethyl acetate (100 mL), washed successively with saturated sodium sulfite (50 mL×3), sodium bicarbonate (50 mL×3) and saline solution (50 mL×3), dried with anhydrous sodium sulfate, spin-dried, and then subjected to column chromatography (petroleum ether:ethyl acetate=1:2) to obtain the target product as a yellow solid (7.0 g, yield: 46.6%). LC-MS: 461 [M+H]+

Step 9

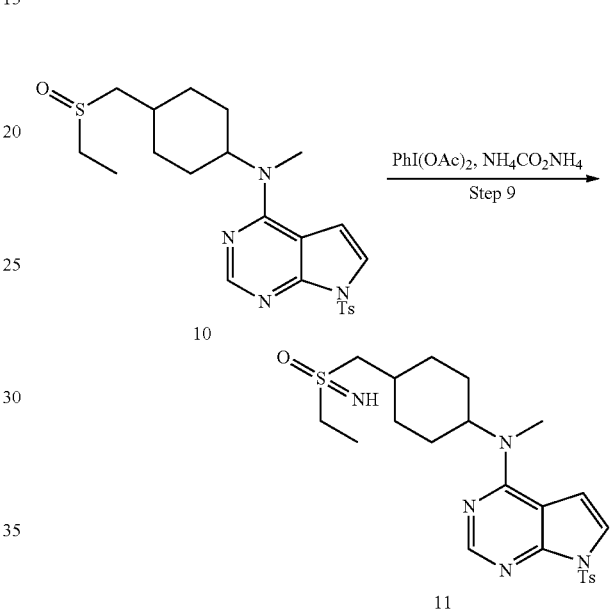

10 (400 mg, 0.84 mmol) (prepared in step 8), dichloromethane (5 mL), PhI(OAc)$_2$ (408 mg, 1.27 mmol) and ammonium carbonate (161 mg, 1.68 mmol) were added into a 25 mL single-necked flask, and a reaction was performed for 6 h at room temperature. The reaction liquid was filtered, concentrated, and poured into methanol, and potassium carbonate was added, the resulting mixture was stirred for 30 min, concentrated, and then subjected to column chromatography (ethyl acetate:methanol=4:1) to obtain the target compound as a white solid (400 mg, yield: 97.4%). LC-MS: 488 [M−H]+

Step 10

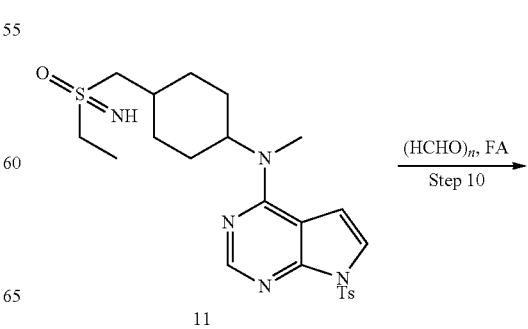

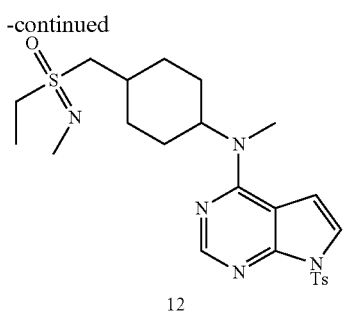

11 (400 mg, 0.82 mmol) (prepared in step 9), paraformaldehyde (147 mL, 1.64 mmol), and formic acid (4 mL) were added into a 25 mL single-necked flask, and a reaction was performed for 48 h at 100° C. The reaction liquid was concentrated, and poured into dichloromethane and 2 N sulfuric acid; the aqueous phase was neutralized with sodium bicarbonate, and extracted with dichloromethane (10 mL×3), and the organic phase was dried with anhydrous sodium sulfate, and concentrated to obtain the target product as a white solid (170 mg, yield: 41.1%). LC-MS: 504 [M+H]+

Step 11

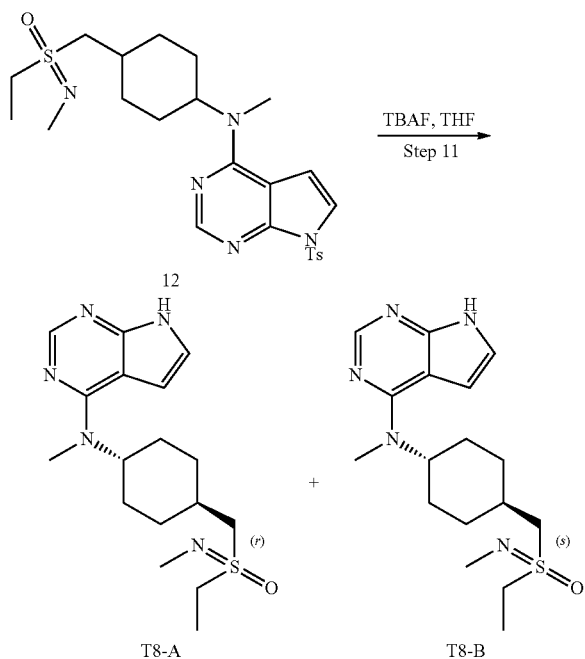 [SMILES: CCS(=O)(CC1CCC(N(C)c2ncnc3c2ccn3S(=O)(=O)c2ccc(C)cc2)CC1)=NC ; CCS(=O)(C[C@H]1CC[C@H](N(C)c2ncnc3[nH]ccc23)CC1)=NC ; "T8-A" ; CCS(=O)(C[C@H]1CC[C@H](N(C)c2ncnc3[nH]ccc23)CC1)=NC ; "T8-B"]

12 (170 mg, 0.34 mmol) (prepared in step 10), tetrahydrofuran (2.0 mL), and tetrabutylammonium fluoride (177 mg, 0.68 mmol) were added into a 25 mL single-necked flask, refluxed for 12 h, concentrated, and poured into dichloromethane and saturated salt solution, the organic phase was dried with anhydrous sodium sulfate, concentrated, and subjected to a conventional preparation method and a chiral preparation method (column: DAICEL CHRAL IC (250 mm×30 mm, 10 μm); Gradient Time: 20 min; Condition: 0.2% DEA EtOH & Hexane; Flow Rate: 18 mL/min; 80% EtOH) to obtain product T8-A as a white solid (20 mg, yield: 16.8%), LC-MS: 350.2 [M+H]+, H¹-NMR:

$^1$H NMR (400 MHz, MeOD) δ 8.13 (s, 1H), 7.16 (d, J=3.6 Hz, 1H), 6.70 (d, J=3.6 Hz, 1H), 4.69 (s, 1H), 3.32-3.25 (m, 5H), 3.18 (dd, J=6.2, 1.9 Hz, 2H), 2.79 (s, 3H), 2.27-2.01 (m, 3H), 1.93-1.82 (m, 4H), 1.45 (d, J=12.0 Hz, 2H), 1.37 (t, J=7.4 Hz, 3H) and product T8-B as a white solid (30 mg, yield: 25.3%), LC-MS: 350.2 [M+H]+, H¹-NMR: $^1$H NMR (400 MHz, MeOD) δ 8.13 (s, 1H), 7.16 (d, J=3.6 Hz, 1H), 6.70 (d, J=3.6 Hz, 1H), 4.69 (s, 1H), 3.27-3.21 (m, 3H), 3.11-3.10 (m, 2H), 3.18 (dd, J=6.2, 1.9 Hz, 2H), 2.79 (s, 3H), 2.19 (dd, J=24.0, 12.8 Hz, 2H), 2.07 (s, 1H), 1.93-1.82 (m, 4H), 1.51-1.42 (m, 2H), 1.37 (t, J=7.4 Hz, 3H).

Example 9: JAK1 Enzymology Experiment

Experimental Materials

JAK1 is a protein tyrosine kinase, and purchased from Thermo (Cat #PV4774). ATP was purchased from Thermo (Cat #PV4774), Tofacitinib was purchased from Selleck (Cat #55001), and HTRF KinEASE-TK kit was purchased from Cisbio (Cat #62TKOPEC).

Experimental Method

HTRF®KinEASE™-TK was a universal method to measure activity of tyrosine kinase by a substrate and a universal detection system. The reaction was performed in a 384-well plate (Greiner, Cat #784075), and the total reaction system was 20 ul. The reaction system mainly included a 1× kinase buffer solution, 5 mM MgCl$_2$, 0.625 mM EGTA, 0.06 uM SEB, 1 mM DTT, 0.01% Brij-35, 1 uM TK-Sub-biotin and 10 uM ATP. The compounds prepared in Examples 1-8 and the control compound Oclacitinib were continuously diluted by DMSO to 10 concentration points, and then 100 nl was transferred to a test plate. After 19.76 nM JAk1 was added, the reaction started, 30 min after reaction at 25° C., a detection reagent was added to terminate the reaction (0.25× TK Antibody, 62.5 nM Streptavidin-XL665). After standing for 60 min at room temperature, FRET signal was read out on a Spark 10M or an envision plate reader. (HTRF 665/615=665 nm signal value/615 nm signal value).

Data Analysis

665/615 signal ratio was converted to percentage inhibition.

Inhibition %=(max−sample)/(max−min)*100, wherein, "min" denotes a ratio of the 665/615 signal value of a control well without enzyme, and "max" denotes a ratio of the 665/615 signal value of a control well with DMSO.

Results

Based on the above experimental method, the IC50 of the compounds measured was shown in the table below:

TABLE 1

| JAK1 enzyme activity test results | |
|---|---|
| Compound | Relative IC$_{50}$ (nM) |
| Oclacitinib | 12.88 |
| T1-A | <100 |
| T1-B | <100 |
| T2-A | <100 |
| T2-B | 100 < IC50 < 1000 |
| T3-A | 100 < IC50 < 1000 |
| T3-B | <100 |
| T4-A | <100 |
| T4-B | 100 < IC50 < 1000 |
| T5-A | 100 < IC50 < 1000 |
| T5-B | 100 < IC50 < 1000 |

TABLE 1-continued

JAK1 enzyme activity test results

| Compound | Relative IC$_{50}$ (nM) |
|---|---|
| T5C | <100 |
| T5-D | <100 |
| T6-A | <100 |
| T6-B | <100 |
| T6-C | <100 |
| T7 | <100 |
| T8-A | <100 |
| T8-B | <100 |

Example 10: Experiment of IL-2 and ConA Inducing Proliferation of Canine PBMC Cells Experimental Materials Recombinant canine IL-2 (Cys147Ser) protein was purchased from R&D (Cat #1815-CL-020/CF). Canine CD4 Alexa Fluor 647-conjugated antibody was purchased from R&D (Cat #1815-CL-020/CF), and concanavalin A from *Canavalia ensiformis* (Jack bean) was purchased from Sigma (Cat #C5275-5MG). Oclacitinib maleate was purchased from AbMole Bioscience (Cat #M5827). PBMC cells were purchased from AllCells (Cat #DPB-002).

Experimental Method

Flow cytometry is a technology used for detecting and measuring physical and chemical characteristics of populations of cells or particles. Canine PBMC was collected and stained with CFSE, and then the cells (1×10*5 cells/well) were inoculated onto a 96-well plate and incubated for 1 h in a 5% $CO_2$ incubator at 37° C. A compound at a corresponding concentration (the compound had an initial concentration of 5 µM, and was diluted by 3 folds to 9%, and final concentration of DMSO was 0.1%) was added to corresponding wells, 4 h later, 50 ng/µl IL-2 and 1 µg/ml concanavalin A were added, cells were incubated in a 5% $CO_2$ incubator at 37° C. for activization for 120 h. Afterwards, cells were collected and stained with canine CD4 Alexa Fluor 647-conjugated antibodies.

Samples containing cells were resuspended by a staining buffer and injected into a flow cytometry. When cell suspension flows through the flow cytometry, the cell suspension flowing out of a small nozzle gathered towards the center under the hydrodynamic action of a sheath fluid. The formed trickle may render the cells to pass through laser beam successively, only one cell for once. When cells passed through laser beam, a detector detected the scattered light of the cells or particles. The front detector detected forward scatter (FS), multiple detectors placed on the side detected side scatter (SS); and a fluorescence detector detected fluorescence emitted by the stained cells or particles. Therefore, these cells could be divided into different cell populations according to different FS and SS.

Data Analysis

A single cell whose SSC-A and SSC-H showed a linear relation was classified. CD4$^+$ was circled from lymphocyte populations. MFI of the CD4$^+$ population was calculated.

Inhibition=(MFI of compound−MFI of negative well)/(MFI of positive well−MFI of negative well). In the inhibition graph, X-axis denoted concentration, and Y-axis denoted inhibition percentage.

An inhibition graph was drawn to obtain IC50 of the compounds. The results are shown in table 2.

TABLE 2

| Test results | |
|---|---|
| Compound | Cell IC50(nM) |
| Oclacitinib | 447.2 |
| T1-A | <1000 |
| T1-B | 1000 < IC50 < 5000 |
| T2-A | <1000 |
| T2-B | <1000 |
| T4-A | 1000 < IC50 < 5000 |
| T5-C | >5000 |
| T5-D | >5000 |

It should be finally specified: the above examples are merely used to describe the technical solution of the present invention, but not intended to limit thereto. Even though the present invention has been specified in detail by reference to the above examples, a person skilled in the art should understand: modifications on the technical solution disclosed in the preceding examples, or equivalent replacements to partial or whole technical features can be still made; moreover, these modifications or replacements do not deviate the nature of the corresponding technical solution from the spirit and scope of the technical solutions embodied in the examples according to the present invention.

The invention claimed is:

1. A compound represented by a general formula I, or a pharmaceutically acceptable salt thereof:

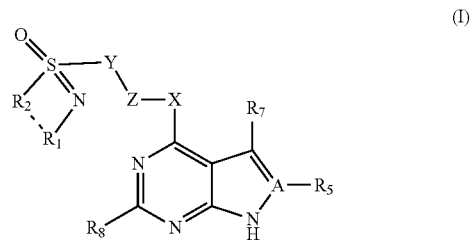

(I)

wherein A is selected from C or N; when A is N, R$_5$ is absent; and when A is C, R$_5$ is selected from: H, halogen, hydroxy, cyano, substituted or unsubstituted alkyl, substituted or unsubstituted haloalkyl, substituted or unsubstituted alkoxy, substituted or unsubstituted hydroxyalkyl, substituted or unsubstituted cycloalkyl, substituted or unsubstituted heterocycloalkyl, substituted or unsubstituted amino, substituted or unsubstituted sulfo, and substituted or unsubstituted sulfonyl, X is selected from: —O— or

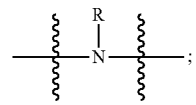

R is selected from: H, C$_{1-10}$ linear or branched alkyl, C$_{2-10}$ linear or branched alkenyl, C$_{2-10}$ linear or branched alkynyl, C$_{6-18}$ aryl, C$_{6-18}$ heterocycloaryl, C$_{3-10}$ cycloalkyl, —OC$_{0-10}$ alkyl, and —O heterocycloalkyl; H attached to carbon atoms can be substituted by the following groups: deutero, hydroxy, halogen, —CN, —OCH$_2$F, —OCHF$_2$, —OCF$_3$, C$_{1-10}$ linear or branched alkyl, —N(C$_{0-10}$ alkyl)(C$_{0-10}$ alkyl), —OC$_{0-10}$ alkyl, C$_{3-10}$ cycloalkyl, —O heterocycloalkyl, —N heterocycloalkyl, —S heterocycloalkyl, C$_{6-18}$ aryl, —N heterocycloaryl, —O heterocycloaryl, or —S heterocycloaryl; wherein, an alkyl moiety of the groups is optionally substituted by any one or more of the following groups: —SO$_2$, —SO$_2$N(C$_{0-10}$ alkyl)(C$_{0-10}$ alkyl), —N(C$_{0-10}$ alkyl)SO$_2$(C$_{0-10}$ alkyl), —CON(C$_{0-10}$ alkyl)(C$_{0-10}$ alkyl), —N(C$_{0-10}$ alkyl)CO(C$_{0-10}$ alkyl), —N(C$_{0-10}$ alkyl)COO(C$_{0-10}$ alkyl), —OCON(C$_{0-10}$ alkyl)(C$_{0-10}$ alkyl), halogen, —CN, —OCH$_2$F, —OCHF$_2$, —OCF$_3$, —N(C$_{0-10}$ alkyl)(C$_{0-10}$ alkyl), —OC$_{0-10}$ alkyl, C$_{6-18}$ aryl, —N heterocycloaryl, —O heterocycloaryl or —S heterocycloaryl;

Y is selected from:

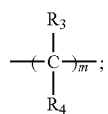

R$_3$ and R$_4$ are independently selected from: H, halogen, —CN, C$_{1-10}$ linear alkyl, C$_{3-10}$ cycloalkyl, —CF$_3$, —OCF$_3$, —OCHF$_2$, —OCH$_2$F, substituted or unsubstituted haloalkyl, substituted or unsubstituted aryl, substituted or unsubstituted alkenyl, substituted or unsubstituted alkynyl, —OC$_{0-10}$ alkyl, —S(O)$_{m1}$C$_{0-10}$ alkyl, —SO$_2$N(C$_{0-10}$ alkyl)(C$_{0-10}$ alkyl), —N(C$_{0-10}$ alkyl)(C$_{0-10}$ alkyl), —N(C$_{0-10}$ alkyl)C(=O)(C$_{0-10}$ alkyl), —N(C$_{0-10}$ alkyl)C(=O)O(C$_{0-10}$ alkyl), —N(C$_{0-10}$ alkyl)C(=O)N(C$_{0-10}$ alkyl), —C(=O)C$_{0-10}$ alkyl, —C(=O)OC$_{0-10}$ alkyl, —C(=O)N(C$_{0-10}$ alkyl)(C$_{0-10}$ alkyl), —O heterocycloalkyl, —N(C$_{0-10}$ alkyl) heterocycloalkyl, —N(C$_{0-10}$ alkyl) heterocycloaryl, —S heterocycloaryl or —O heterocycloaryl, wherein, the heterocycloalkyl can be substituted by any one or more of the following groups: oxygen, C$_{1-10}$ alkyl, C$_{2-10}$ alkenyl, C$_{2-10}$ alkynyl, C$_{6-18}$ aryl, C(=O)OC$_{0-10}$ alkyl, C(=O)N(C$_{0-10}$ alkyl) (C$_{0-10}$ alkyl), —SO$_2$N(C$_{0-10}$ alkyl)(C$_{0-10}$ alkyl) or SO$_2$C$_{1-10}$ alkyl, wherein, the alkyl moiety is optionally substituted by any one or more of the following groups: hydroxy, —OC$_{1-10}$ alkyl, —N(C$_{0-10}$ alkyl)(C$_{0-10}$ alkyl), —C(=O)N(C$_{0-10}$ alkyl)(C$_{0-10}$ alkyl), C(=O)OC$_{0-10}$ alkyl, C$_{6-18}$ aryl, heterocycloalkyl or heterocycloaryl, m is 0, 1, 2, 3, 4, 5 or 6, and m1 is 0, 1, or 2;

Z is selected from: C$_{1-10}$ linear or branched alkyl, C$_{2-10}$ linear or branched alkenyl, C$_{2-10}$ linear or branched alkynyl, substituted or unsubstituted hydroxyalkyl, C$_{3-12}$ cycloalkyl, C$_{1-20}$ alkoxy, C$_{3-12}$ cycloalkoxy, heterocycloalkyl, C$_{6-18}$ aryl, —N heterocycloaryl, —S heterocycloaryl, —O heterocycloaryl, aromatic dicyclo, aromatic heterodicyclo, and tricyclo, wherein the alkyl moiety is optionally substituted by any one or more of the following groups: —N(C$_{0-10}$ alkyl)(C$_{0-10}$ alkyl), —CON(C$_{0-10}$ alkyl)(C$_{0-10}$ alkyl), —N(C$_{0-10}$ alkyl)CO(C$_{0-10}$ alkyl), —N(C$_{0-10}$ alkyl)COO(C$_{0-10}$ alkyl), —OCON(C$_{0-10}$ alkyl)(C$_{0-10}$ alkyl), halogen, —CN, —OCH$_2$F, —OCHF$_2$, —OCF$_3$, —OC$_{0-10}$ alkyl, C$_{6-18}$ alkyl, —N heterocycloaryl, —O heterocycloaryl or —S heterocycloaryl;

R$_1$ are R$_2$ are independently selected from: H, halogen, —CN, —OCH$_2$F, —OCHF$_2$, —OCF$_3$, C$_{1-10}$ linear or branched alkyl, C$_{3-10}$ cycloalkyl, —OC$_{0-10}$ alkyl, —N(C$_{0-10}$ alkyl)(C$_{0-10}$ alkyl), —O heterocycloalkyl, —N heterocycloalkyl, —S heterocycloalkyl, C$_{6-18}$ aryl, —N heterocycloaryl, —S heterocycloaryl or —O heterocycloaryl, wherein, H attached to carbon or nitrogen atoms can be substituted by the following groups: deutero, hydroxy, halogen, —CN, —OCH$_2$F, —OCHF$_2$, —OCF$_3$, C$_{1-6}$ linear alkyl, —N(C$_{0-10}$ alkyl)(C$_{0-10}$ alkyl), —OC$_{0-10}$ alkyl, C$_{3-10}$ cycloalkyl, —O heterocycloalkyl, —N heterocycloalkyl, —S heterocycloalkyl, C$_{6-18}$ aryl, —N heterocycloaryl, —O heterocycloaryl or —S heterocycloaryl; wherein H on the C$_{6-18}$ aryl or heterocycloaryl can be substituted by any one or more of the following groups: halogen, C$_{1-4}$ linear alkyl, —N(C$_{0-10}$ alkyl)SO$_2$(C$_{0-10}$ alkyl), —CON(C$_{0-10}$ alkyl)(C$_{0-10}$ alkyl), —N(C$_{0-10}$ alkyl)CO(C$_{0-10}$ alkyl), —N(C$_{0-10}$ alkyl)COO(C$_{0-10}$ alkyl), —OCON(C$_{0-10}$ alkyl)(C$_{0-10}$ alkyl), —CN, —OCH$_2$F, —OCHF$_2$, —OCF$_3$, —N(C$_{0-10}$ alkyl)(C$_{0-10}$ alkyl), —OC$_{0-10}$ alkyl, —N heterocycloaryl, —O heterocycloaryl or —S heterocycloaryl, or adjacent carbon atoms on the C$_{6-18}$ aryl and heterocycloaryl form C$_{3-8}$ cycloalkyl, —O heterocycloalkyl, —N heterocycloalkyl, —S heterocycloalkyl, —N heterocycloaryl, —O heterocycloaryl, or —S heterocycloaryl; or R$_1$, R$_2$, S and N atoms therebetween form a heterocyclic ring; and R$_7$ and R$_8$ are independently selected from: H, halogen, hydroxy, cyano, substituted or unsubstituted alkyl, substituted or unsubstituted alkenyl, substituted or unsubstituted alkynyl, substituted or unsubstituted haloalkyl, substituted or unsubstituted alkoxy, substituted or unsubstituted hydroxyalkyl, substituted or unsubstituted cycloalkyl, substituted or unsubstituted non-heterocycloaryl, substituted or unsubstituted heterocycloaryl, substituted or unsubstituted heterocycloalkyl, substituted or unsubstituted amino, substituted or unsubstituted sulfo, and substituted or unsubstituted sulfonyl.

2. The compound or pharmaceutically acceptable salt thereof according to claim 1, wherein when A is C, the R$_5$ is selected from: H, C$_{1-3}$ alkyl, and —OC$_{0-2}$ alkyl;

the X is selected from:

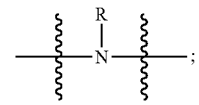

R is selected from: C$_{1-10}$ linear alkyl, and C$_{3-10}$ cycloalkyl; H attached to carbon atoms can be substituted by the following groups: deutero, hydroxy, halogen, —CN, —OCH$_2$F, —OCHF$_2$, —OCF$_3$, C$_{1-3}$ linear alkyl, —N(C$_{0-3}$ alkyl)(C$_{0-3}$ alkyl), —OC$_{0-6}$ alkyl, and C$_{3-8}$ cycloalkyl; wherein, an alkyl moiety of the groups is optionally substituted by any one or more of the following groups: —SO$_2$, —SO$_2$N(C$_{0-10}$ alkyl)(C$_{0-10}$ alkyl), —N(C$_{0-10}$ alkyl)SO$_2$(C$_{0-10}$ alkyl), —CON(C$_{0-10}$ alkyl)(C$_{0-10}$ alkyl), —N(C$_{0-10}$ alkyl)CO(C$_{0-10}$ alkyl), —N(C$_{0-10}$ alkyl)COO(C$_{0-10}$ alkyl), —OCON(C$_{0-10}$ alkyl)(C$_{0-10}$ alkyl), halogen, —CN, —OCH$_2$F, —OCHF$_2$, —OCF$_3$, —N(C$_{0-10}$ alkyl)(C$_{0-10}$ alkyl), —OC$_{0-10}$ alkyl, C$_{6-18}$ aryl, —N heterocycloaryl, —O heterocycloaryl or —S heterocycloaryl;

the R$_3$ and R$_4$ are independently selected from: H, halogen, —CN, C$_{1-6}$ linear alkyl, and C$_{3-6}$ cycloalkyl; the alkyl moiety is optionally substituted by any one or more of the following groups: hydroxy, —OC$_{1-10}$ alkyl, —N(C$_{0-10}$ alkyl)(C$_{0-10}$ alkyl), C$_{6-18}$ aryl, heterocycloalkyl or heterocycloaryl; m is 0, 1, 2, 3 or 4;

the Z is selected from: C$_{3-12}$ cycloalkyl or C$_{3-12}$ cycloalkoxy; wherein the alkyl moiety is optionally substituted by any one or more of the following groups: —N(C$_{0-10}$ alkyl)(C$_{0-10}$ alkyl), —CON(C$_{0-10}$ alkyl)(C$_{0-10}$ alkyl), —N(C$_{0-10}$ alkyl)CO(C$_{0-10}$ alkyl), —N(C$_{0-10}$ alkyl)COO(C$_{0-10}$ alkyl), —OCON(C$_{0-10}$ alkyl)(C$_{0-10}$ alkyl), halogen, —CN, —OCH$_2$F, —OCHF$_2$, —OCF$_3$, —OC$_{0-10}$ alkyl, C$_{6-18}$ alkyl, —N heterocycloaryl, —O heterocycloaryl or —S heterocycloaryl;

R$_1$ is selected from: H, C$_{1-6}$ linear alkyl, and C$_{3-6}$ cycloalkyl; and H attached to carbon atoms can be substituted by the following groups: deutero, hydroxy, halogen, —CN, —OCF$_3$, —N(C$_{0-10}$ alkyl)(C$_{0-10}$ alkyl), —OC$_{0-4}$ alkyl, C$_{3-10}$ cycloalkyl, —O heterocycloalkyl, —N heterocycloalkyl, and C$_{6-18}$ aryl;

R$_2$ is selected from: C$_{1-6}$ linear alkyl, C$_{3-6}$ cycloalkyl, C$_{3-8}$ cycloalkoxy, —N(C$_{0-10}$ alkyl)(C$_{0-10}$ alkyl), C$_{6-18}$ aryl, and —N heterocycloaryl; H attached to carbon or nitrogen atoms can be substituted by one or more of the following groups: deutero, hydroxy, halogen, —CN, OCH$_2$F, —OCHF$_2$, —OCF$_3$, C$_{1-3}$ linear alkyl, —N(C$_{0-10}$ alkyl)(C$_{0-10}$ alkyl), —OC$_{0-10}$ alkyl, C$_{3-10}$ cycloalkyl, —O heterocycloalkyl, —N heterocycloalkyl, C$_{6-18}$ aryl, —N heterocycloaryl, —O heterocycloaryl or —S heterocycloaryl; adjacent carbon atoms on the C$_{6-18}$ aryl or heterocycloaryl form C$_{3-8}$ cycloalkyl, —O heterocycloalkyl, —N heterocycloalkyl, —S heterocycloalkyl, —N heterocycloaryl, or —O heterocycloaryl; and R$_7$ and R$_8$ are independently selected from: H, halogen, C$_{1-3}$ alkyl, and —OC$_{0-2}$ alkyl.

3. The compound or pharmaceutically acceptable salt thereof according to claim 2, wherein when A is C, the R$_5$ is selected from: H, and —CH$_3$;

the X is selected from:

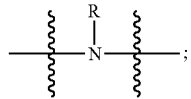

R is a C$_{1-6}$ linear alkyl; H attached to carbon atoms can be substituted by the following groups: deutero, hydroxy, —CN, —OCH$_2$F, —OCHF$_2$, —OCF$_3$, C$_{1-3}$ linear alkyl, and C$_{3-6}$ cycloalkyl;

R$_3$ and R$_4$ are H; m is 0, 1, or 2;

the Z is

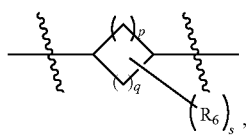

wherein p is any integer of 0-4; q is any integer of 0-4; provided that p and q are not 0 at the same time; R$_6$ is a substituent of H on one or more carbon atoms of the cycloalkyl; R$_6$ is selected from: C$_{1-6}$ alkyl, and C$_{3-6}$ cycloalkyl, and s is an integer of 0-8; and R$_7$ and R$_8$ are independently selected from: H, and —CH$_3$.

4. The compound or pharmaceutically acceptable salt thereof according to claim 3, wherein the Z is a C$_{4-10}$ cycloalkyl.

5. The compound or pharmaceutically acceptable salt according to claim 4, wherein the compound has the following structural formula:

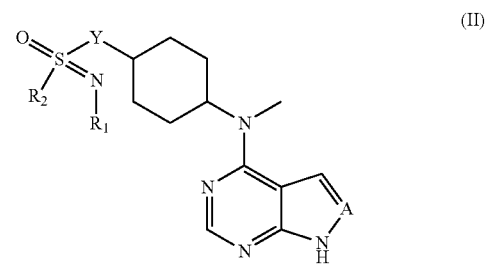

wherein,

R$_1$ is selected from: H, —CH$_3$, —CH$_2$CH$_3$, —CH$_2$CH$_2$CH$_3$, —CH$_2$CH$_2$OCH$_3$, and

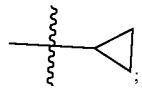

and

R$_2$ is selected from:

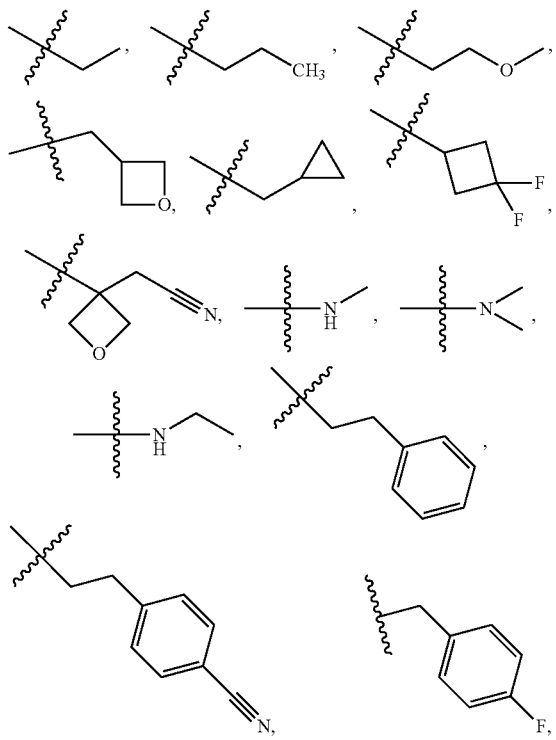

-continued
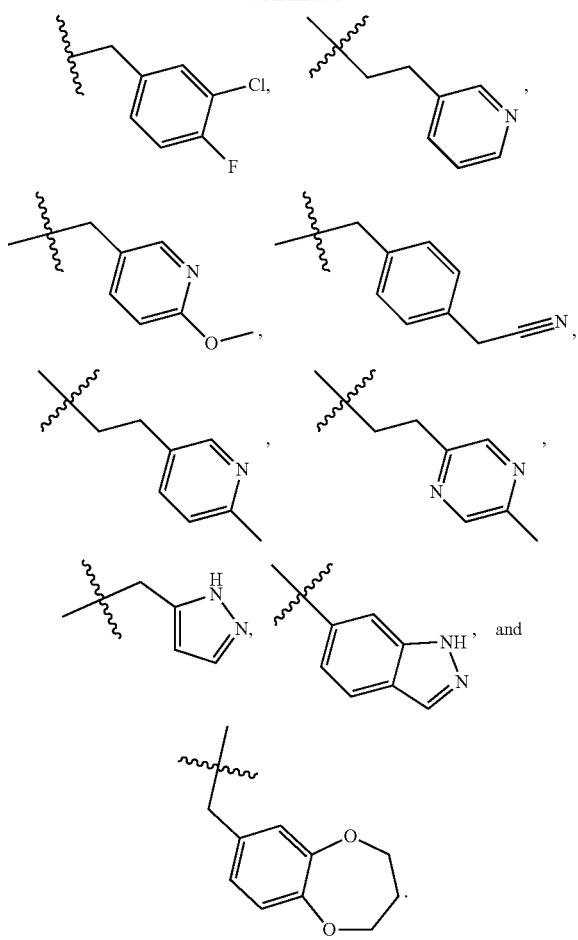
6. A compound, or a pharmaceutically acceptable salt thereof, wherein the compound is:
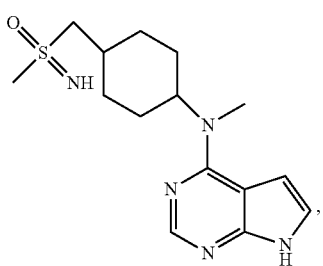
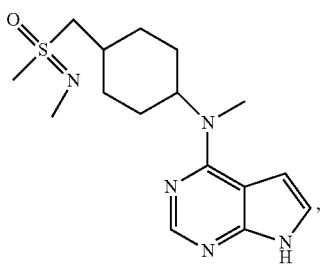
-continued
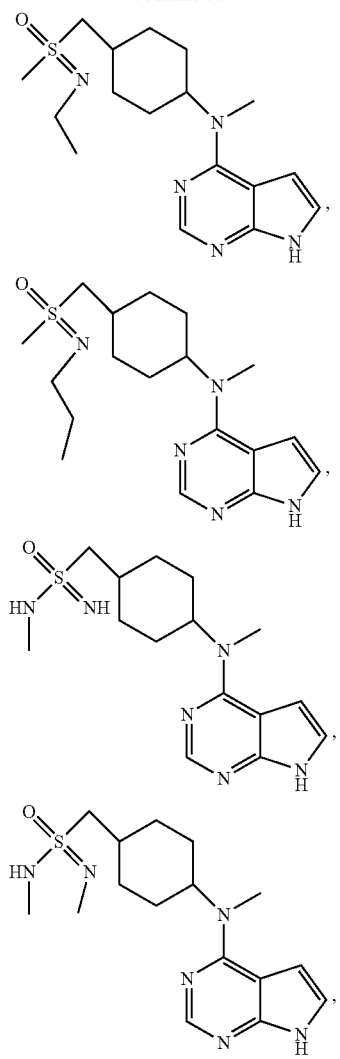
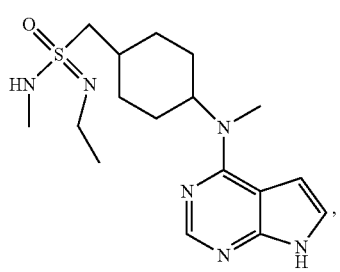
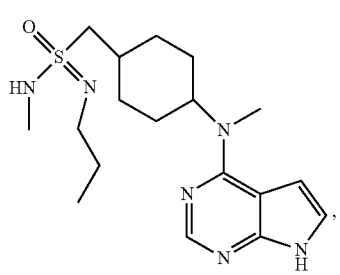

97
-continued
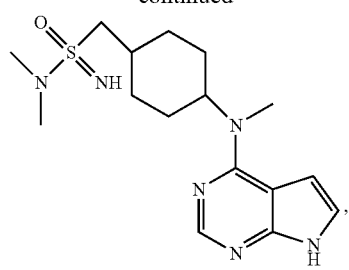
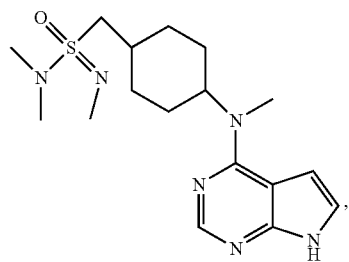
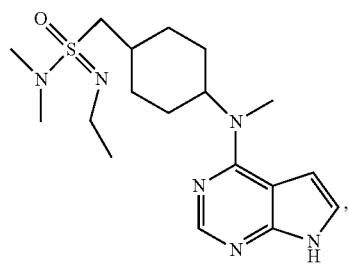
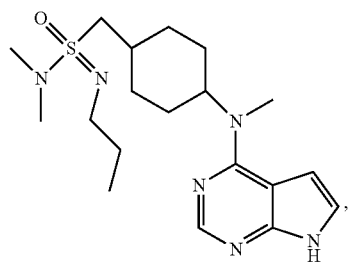
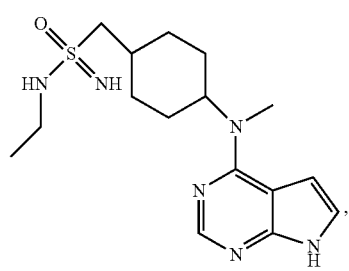
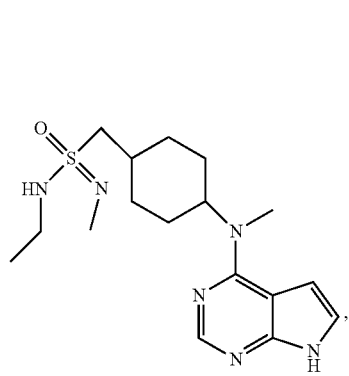
98
-continued
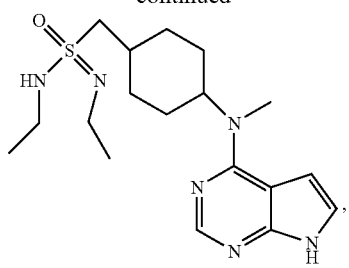
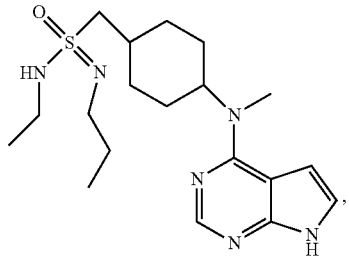
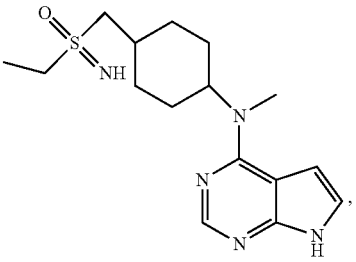
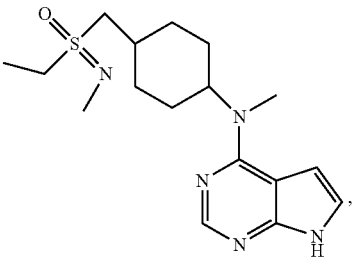
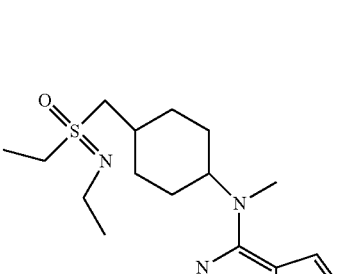
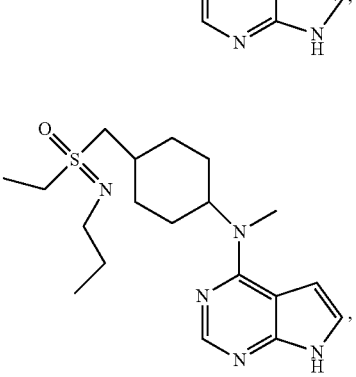

99
-continued
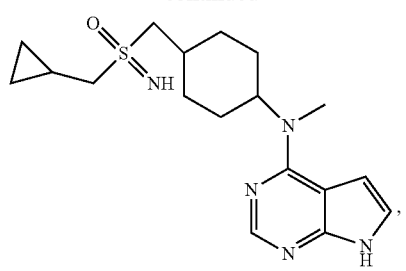,
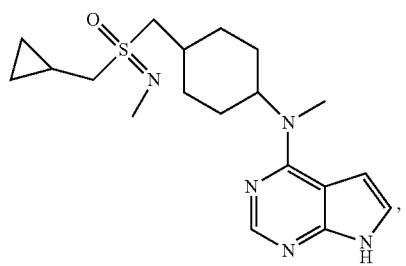,
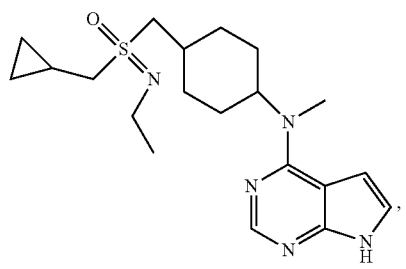,
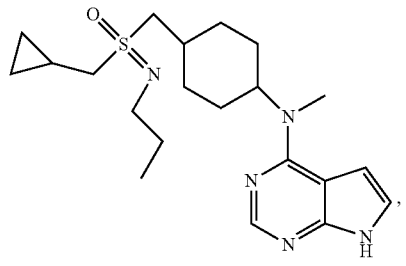,
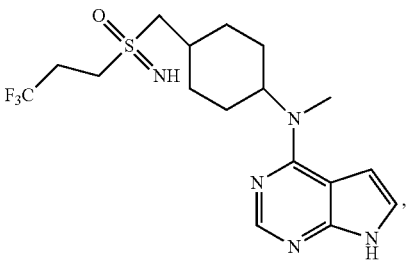,
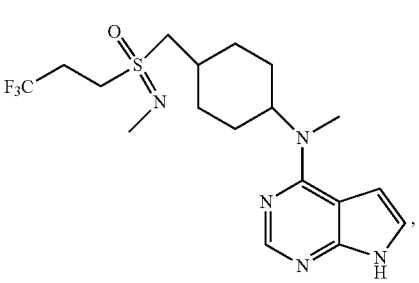,
100
-continued
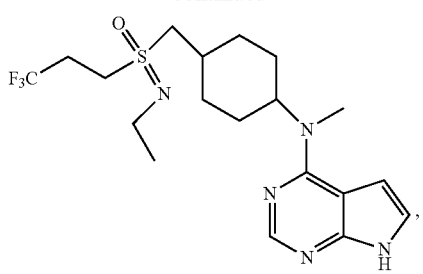,
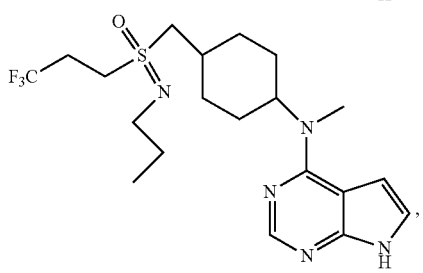,
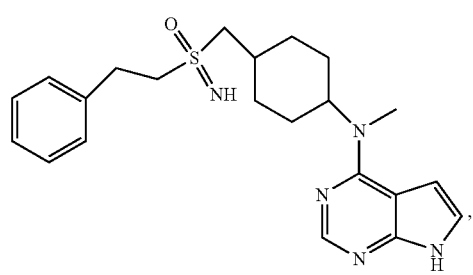,
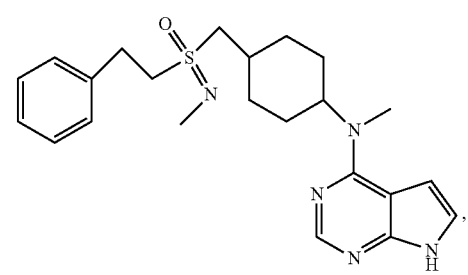,
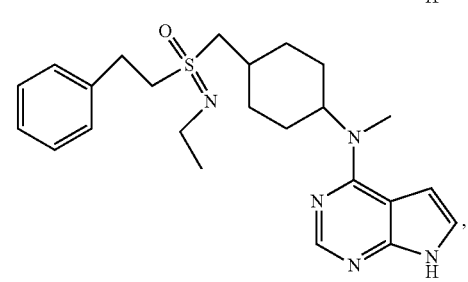,
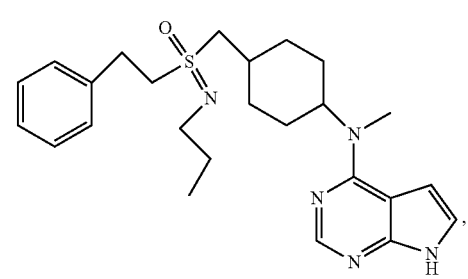, -continued 103
-continued
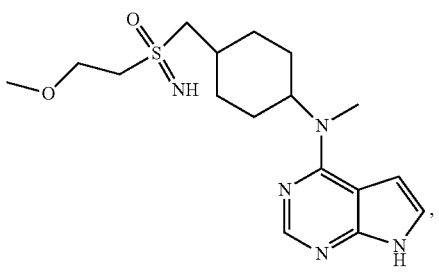
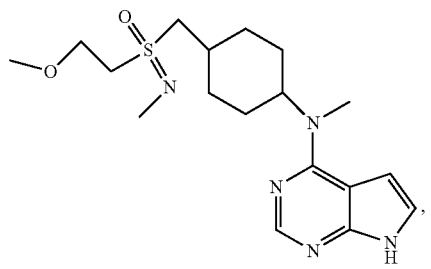
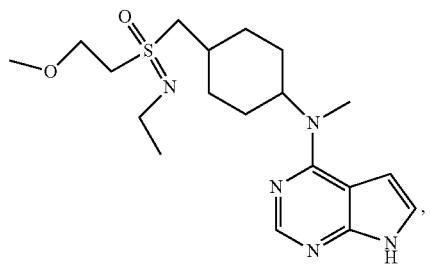
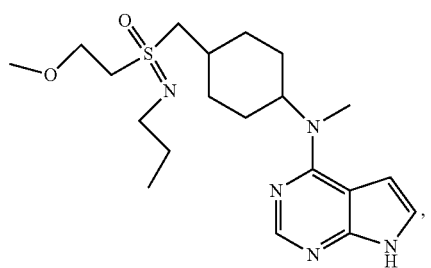
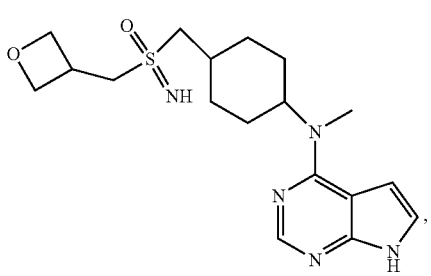
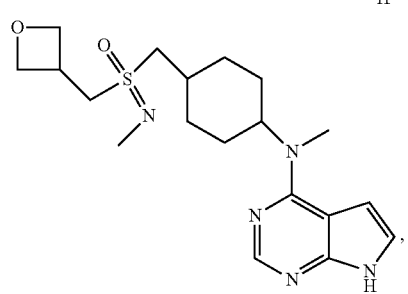
104
-continued
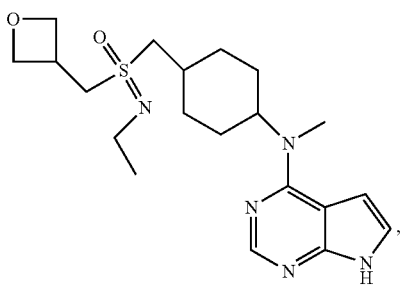
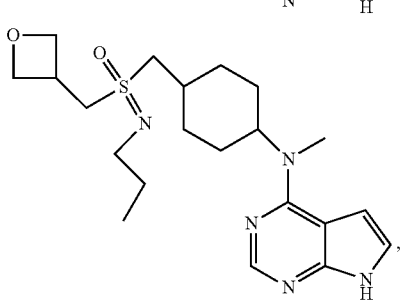
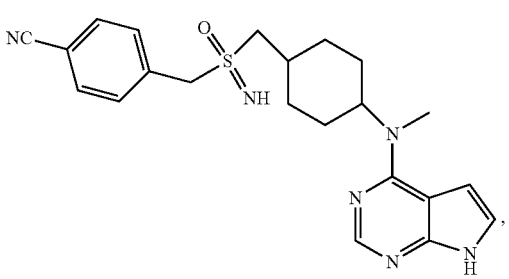
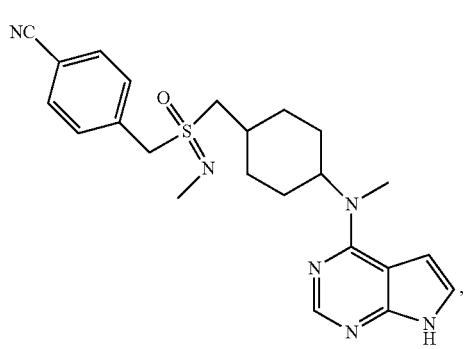
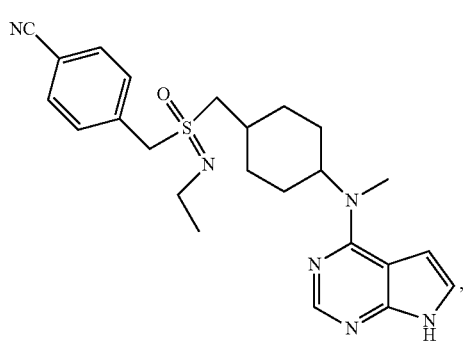

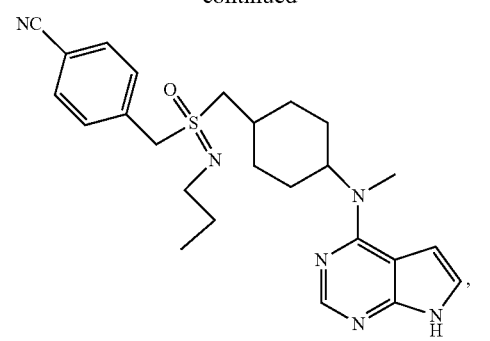
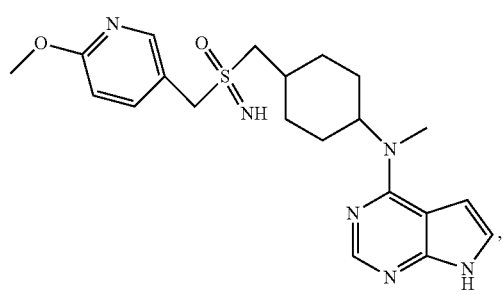
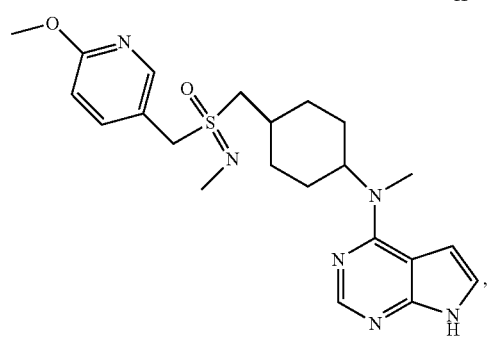
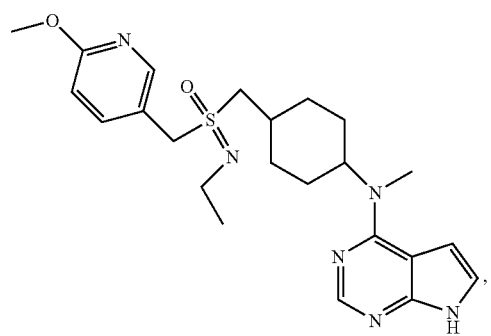
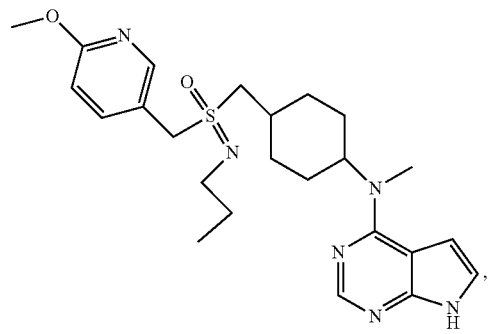
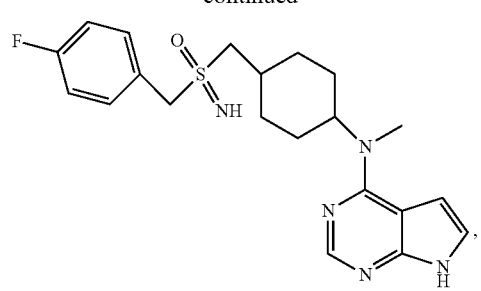
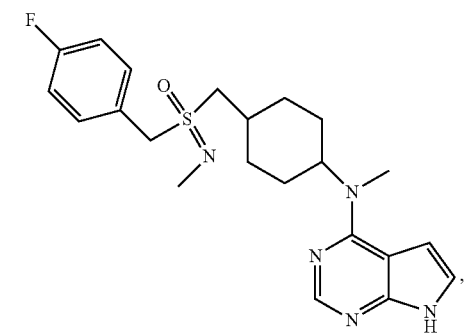
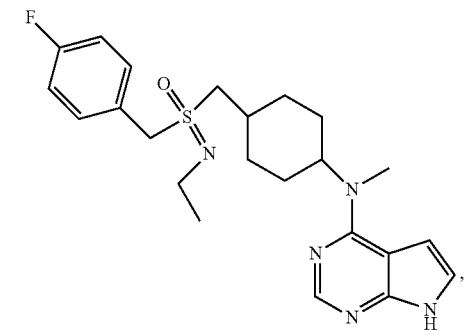
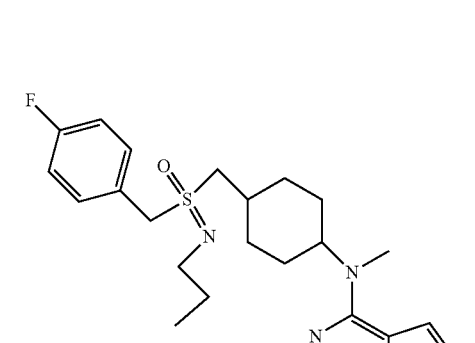
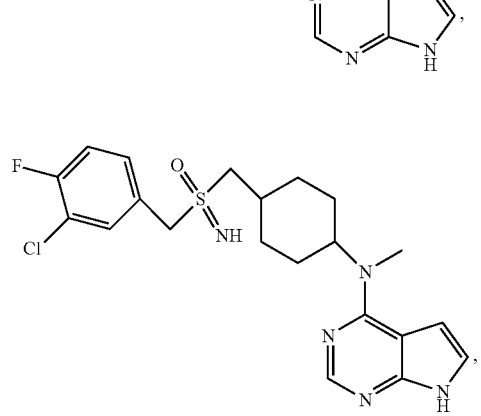

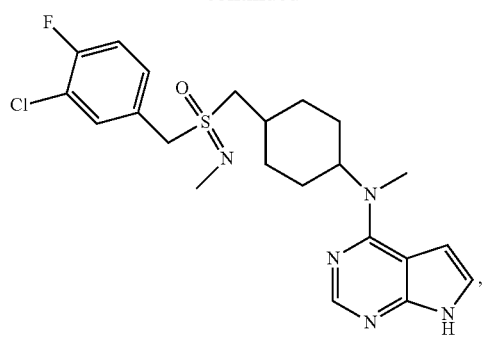
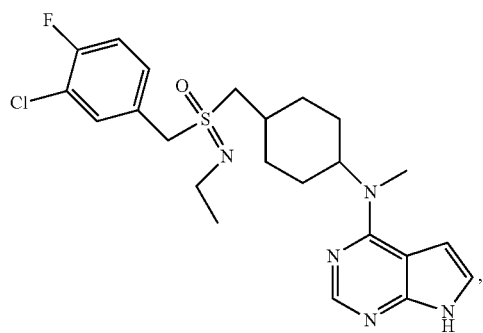
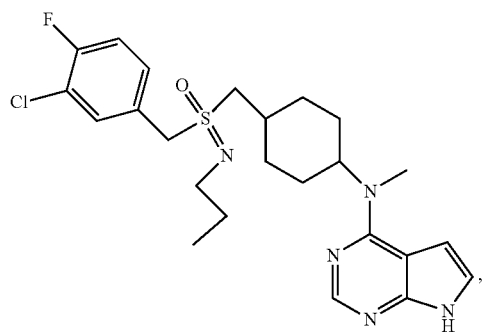
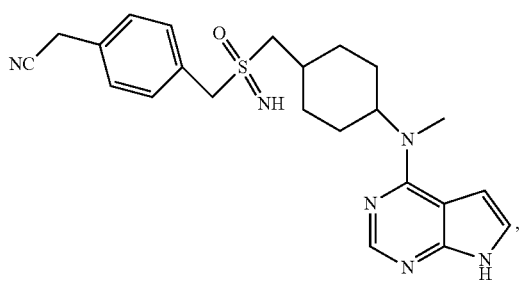
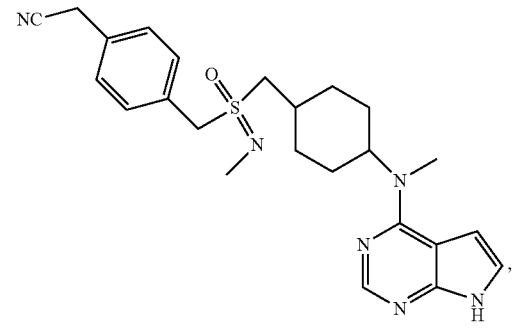
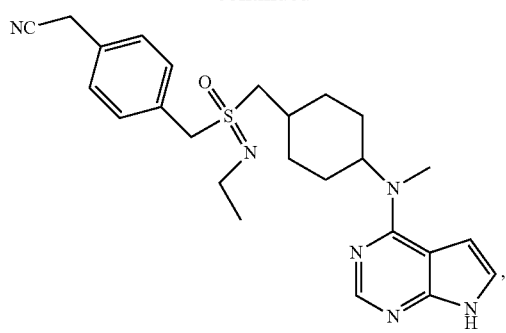
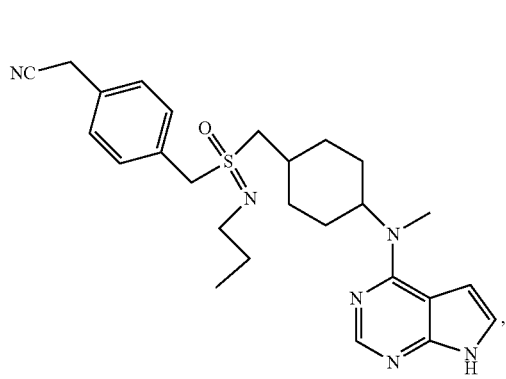
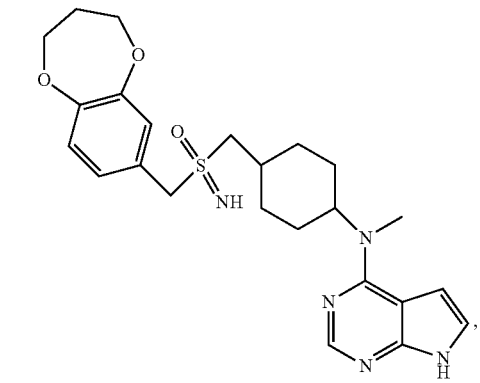
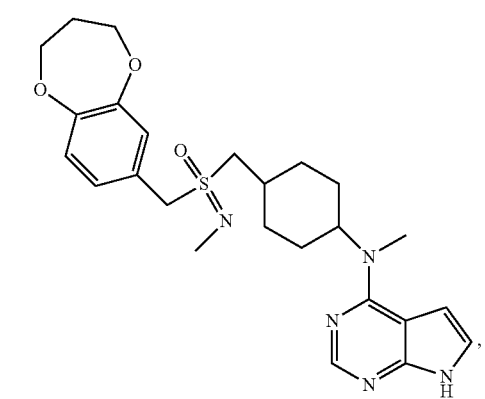

-continued
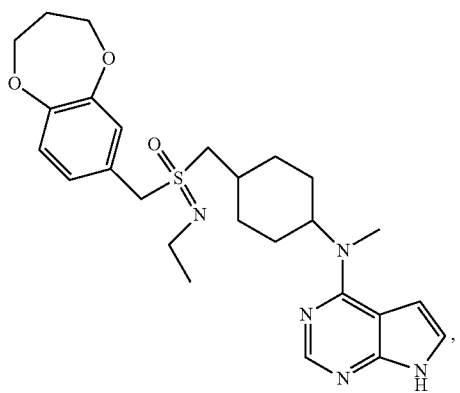
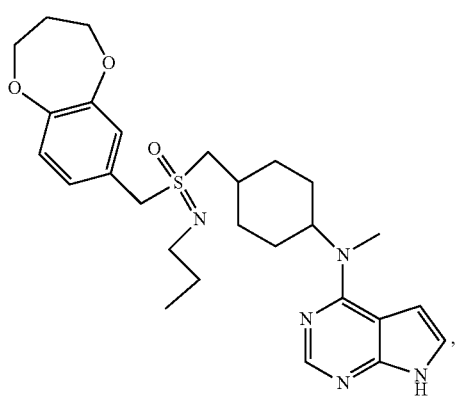
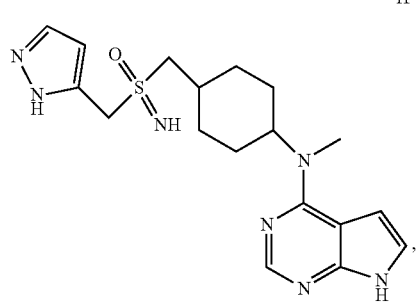
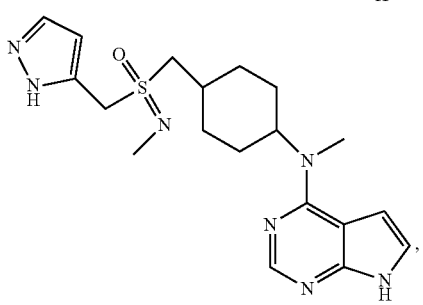
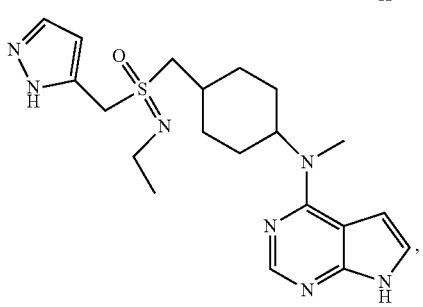
-continued
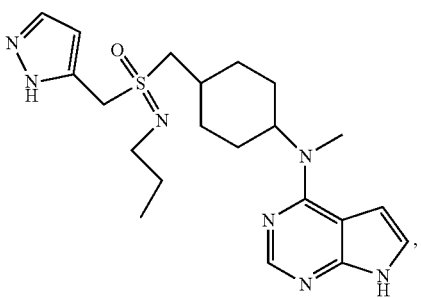
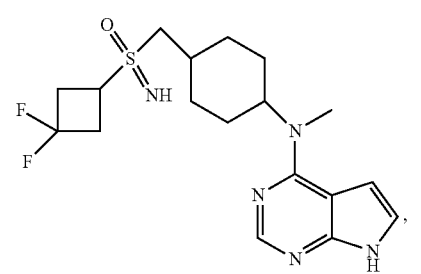
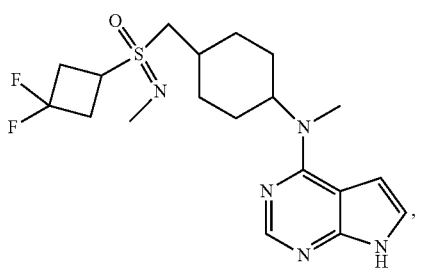
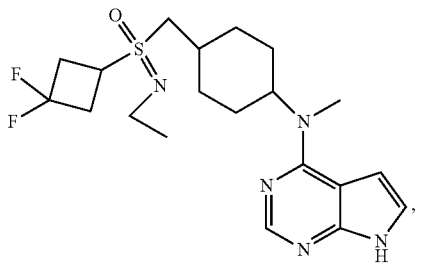
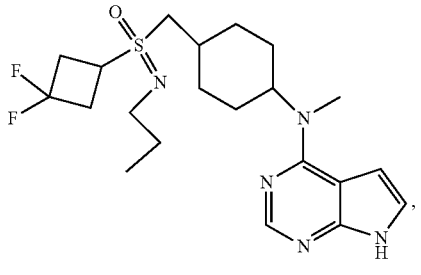
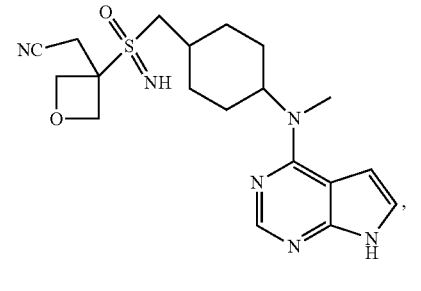

-continued
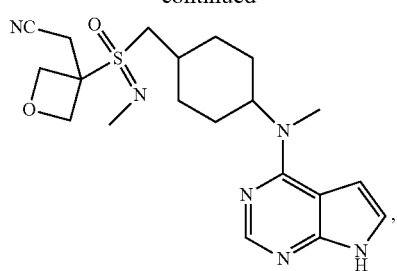
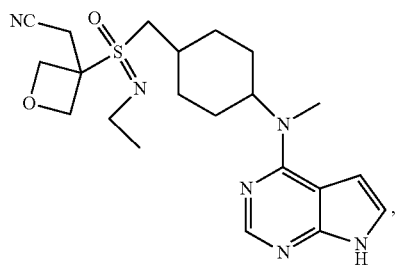
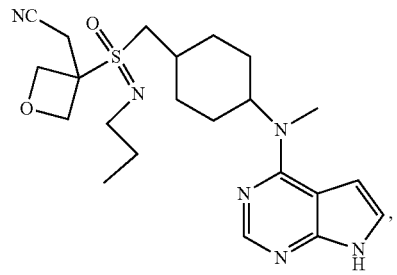
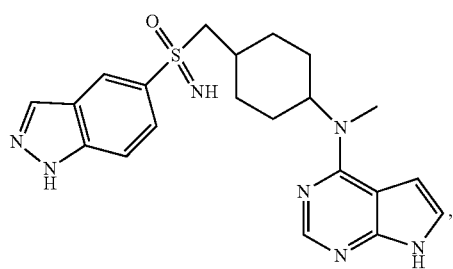
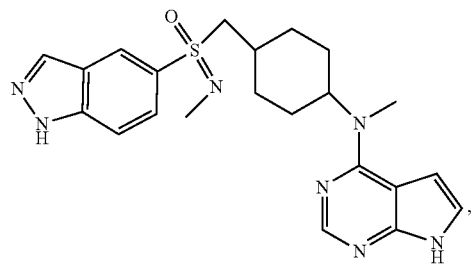
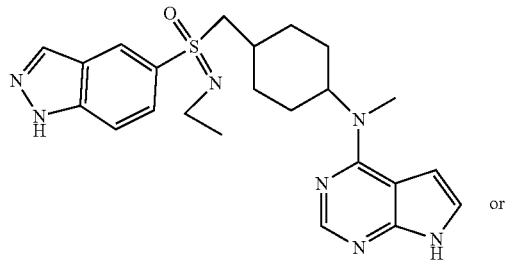
or
-continued
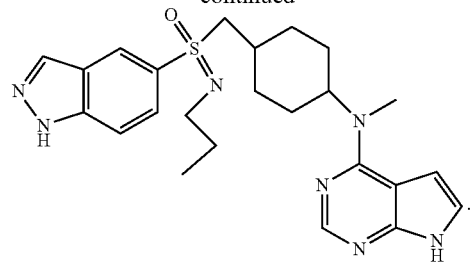
7. The compound or pharmaceutically acceptable salt thereof according to claim 1, wherein the compound has the following structure:
(II-A)
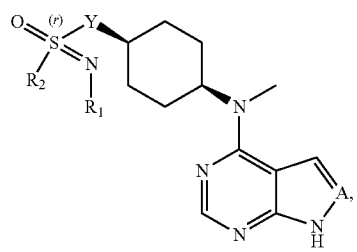
(II-B)
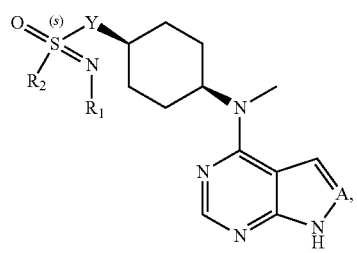
(II-C)
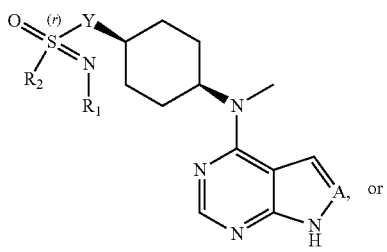
or
(II-D)
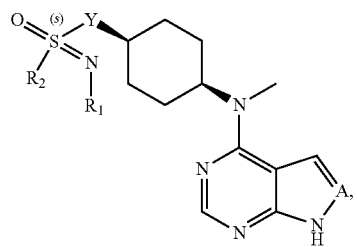
8. The compound or pharmaceutically acceptable salt thereof according to claim 7, wherein the compound has the following structure:

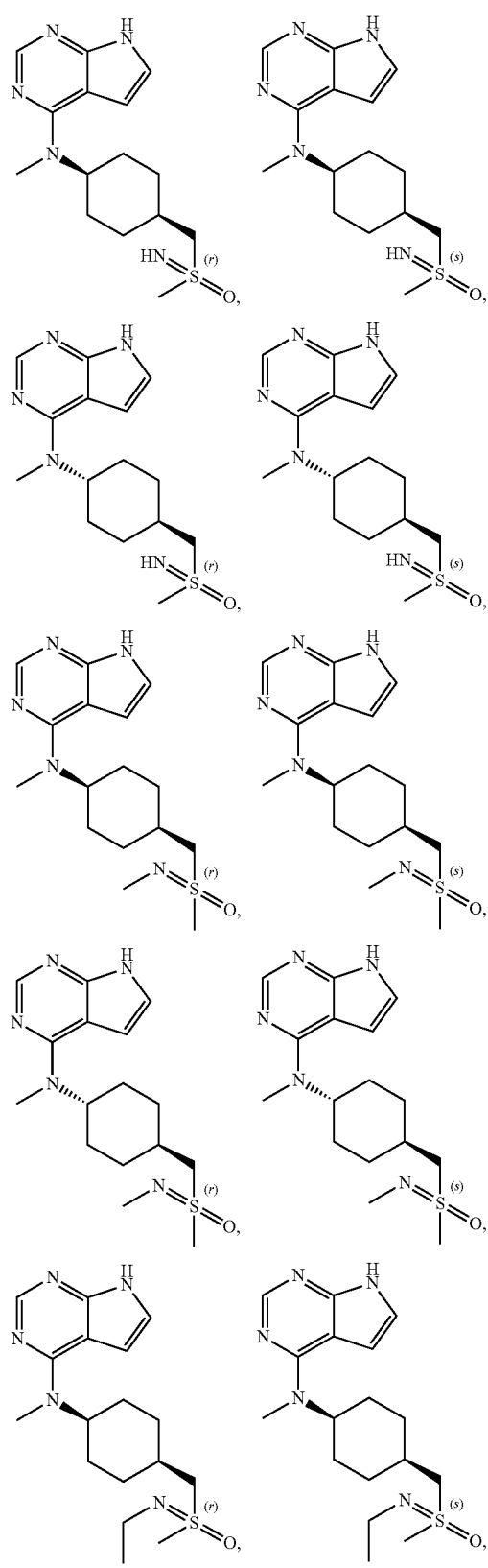
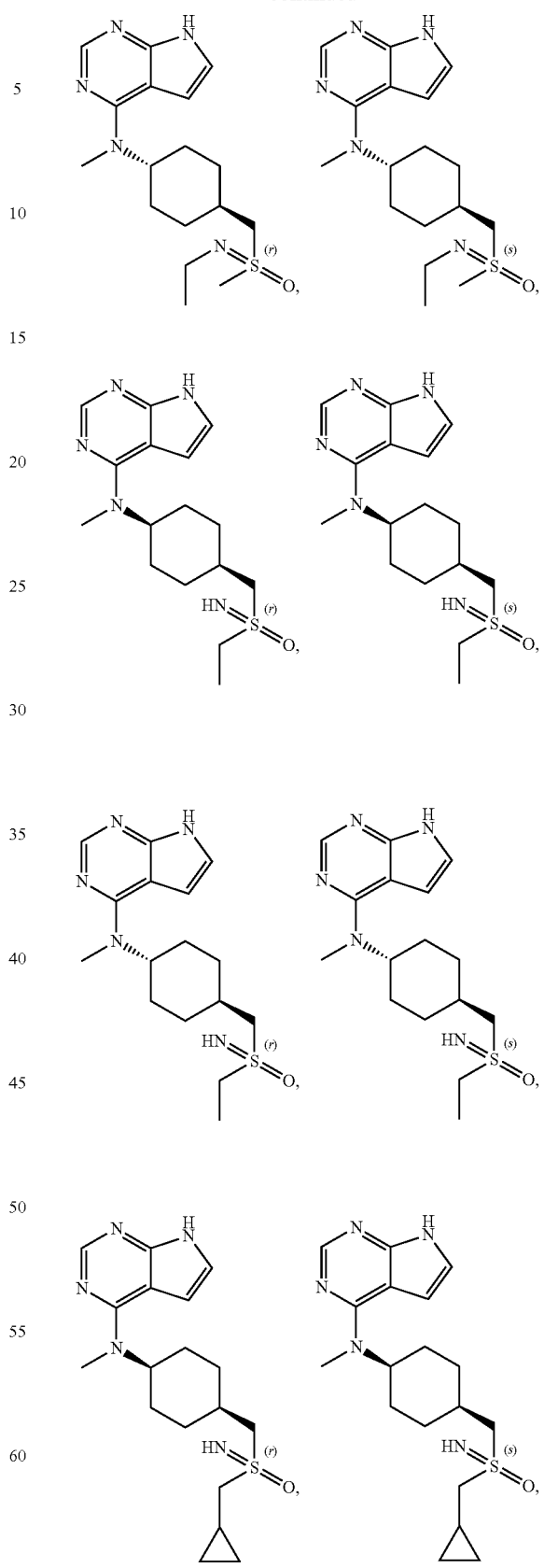

115
-continued
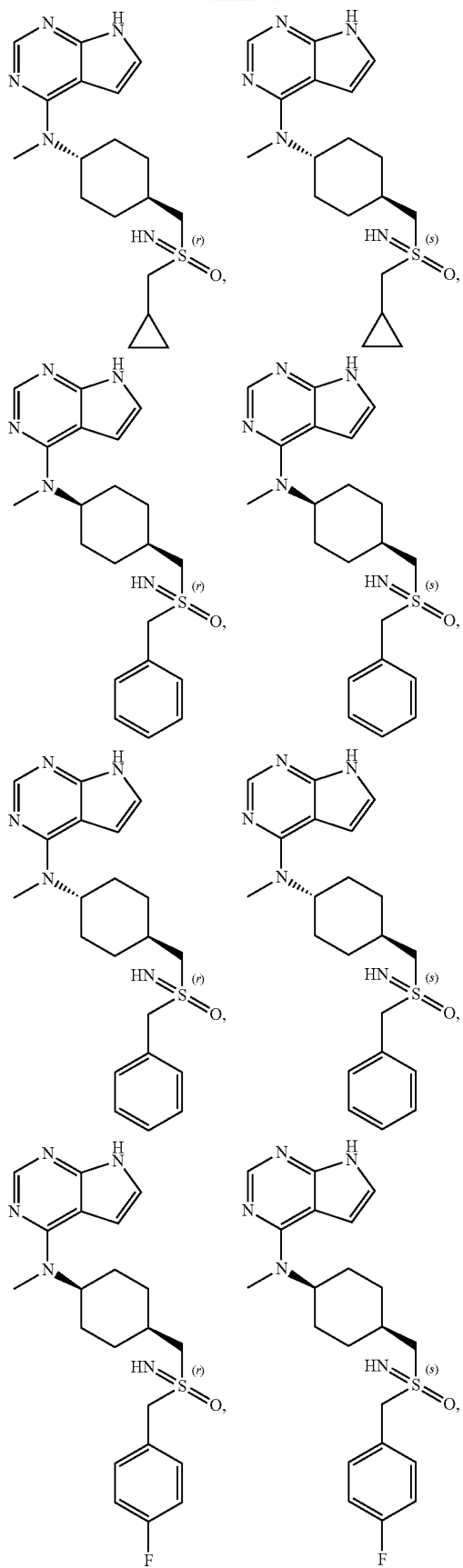
116
-continued
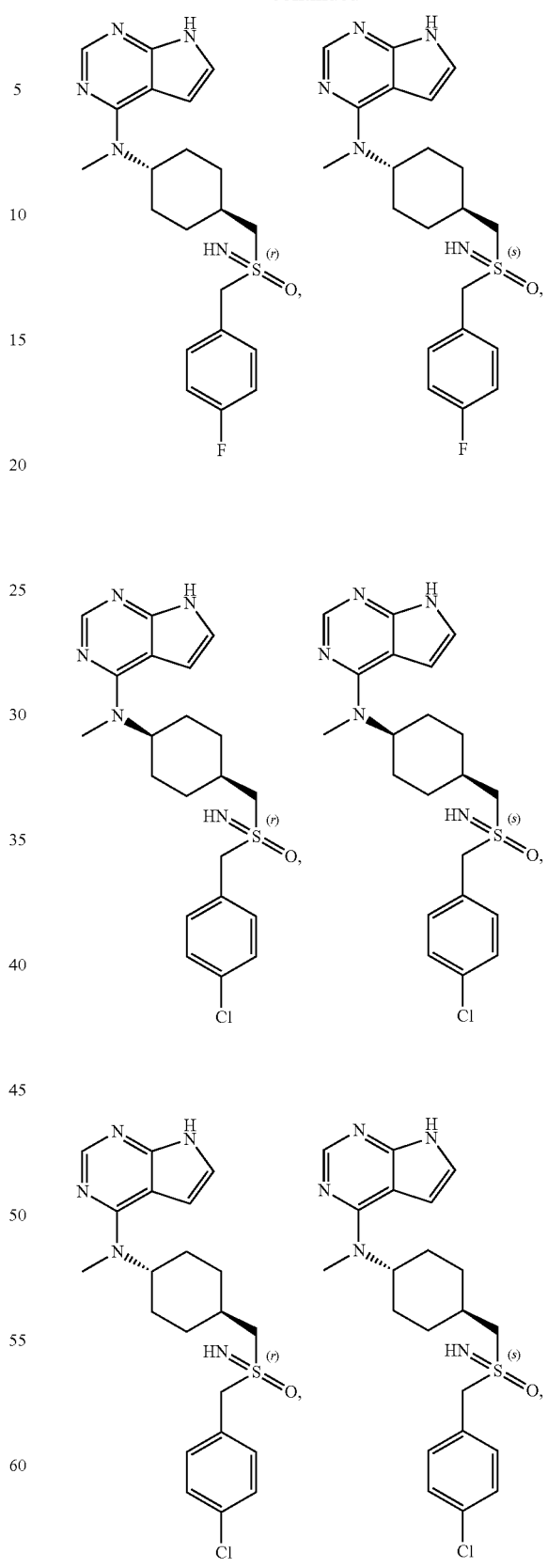

117
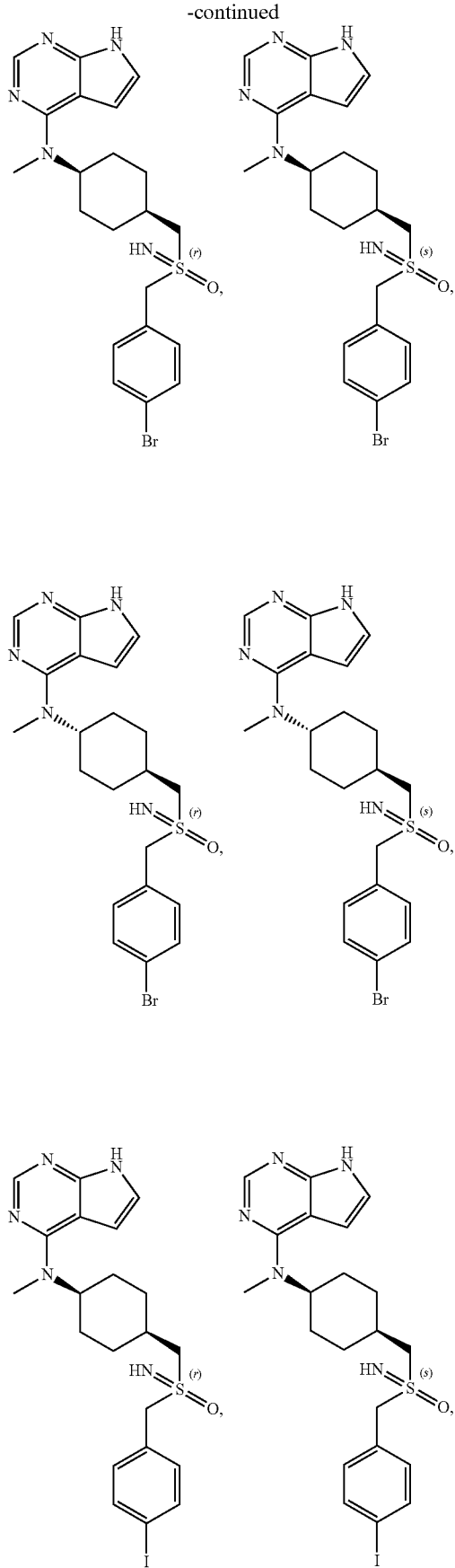
118
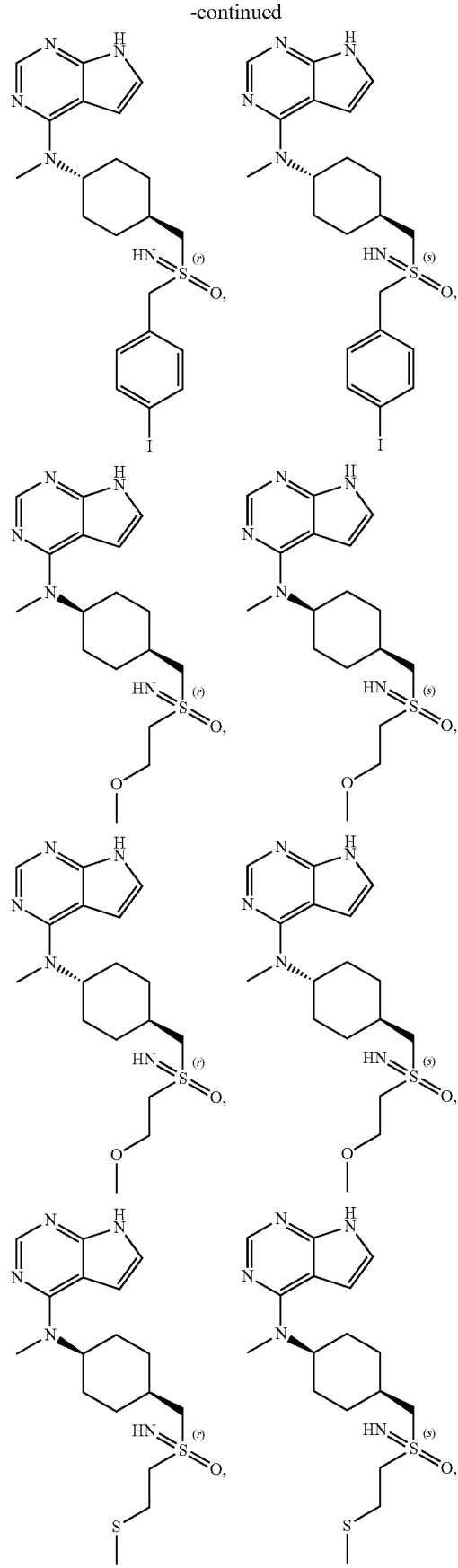

119
-continued
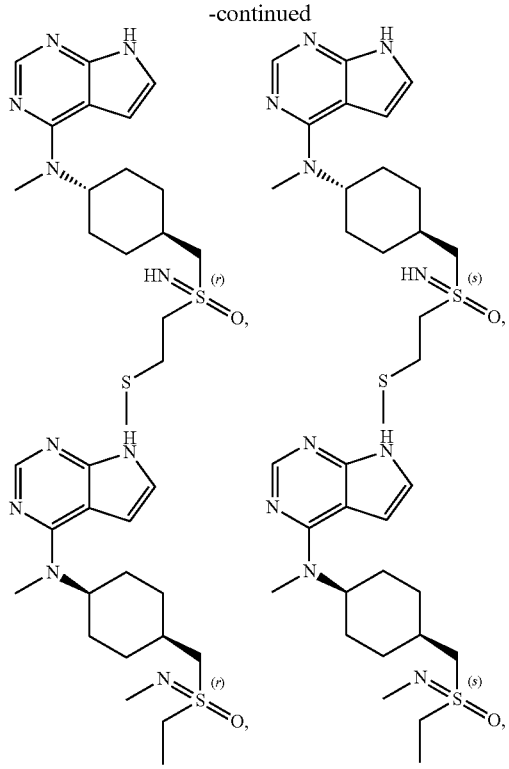
120
-continued
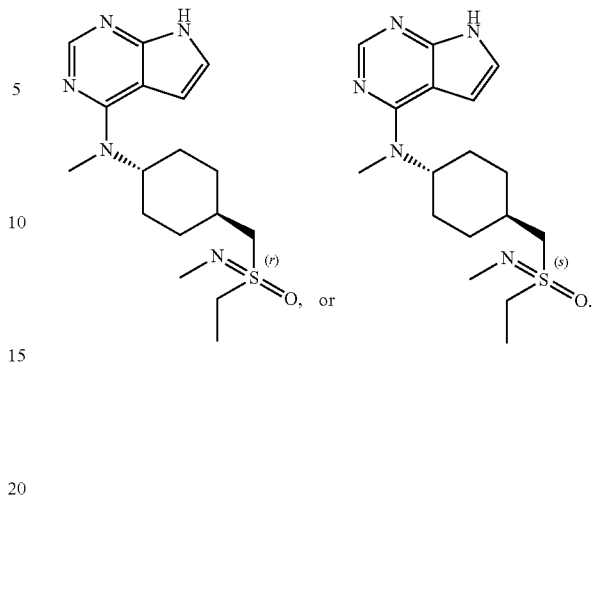
9. A method for preparing the compound represented by the general formula I according to claim 1, comprising the following reaction route:
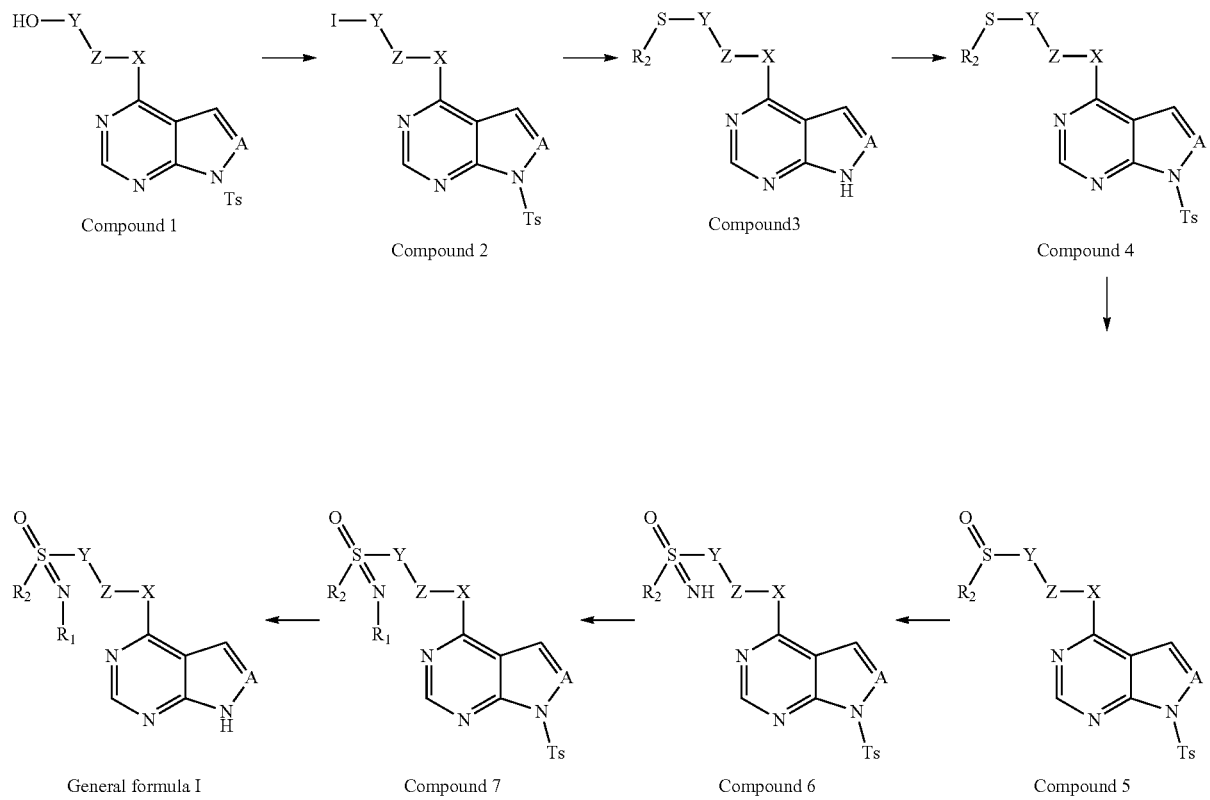

(1) dissolving a compound 1 into a solvent 1, adding triethylamine and paratoluensulfonyl chloride, stirring for 20-24 h at room temperature, concentrating, adding an iodinating agent, heating up to 60-70° C., and stirring for 8-9 h to obtain a compound 2;

(2) dissolving the compound 2 into a solvent 2, adding sodium alkylthiolate, carrying out a reaction for 20-24 h, filtering and concentrating to obtain a compound 3;

(3) dissolving the compound 3 into a solvent 3, adding triethylamine and paratoluensulfonyl chloride, stirring for 20-24 h at room temperature, and separating to obtain a compound 4;

(4) dissolving the compound 4 into a solvent 4, adding metachloroperbenzoic acid (m-CPBA), carrying out a reaction for 1-2 h, extracting, collecting an organic phase, water-washing and drying the organic phase, filtering and concentrating to obtain a compound 5;

(5) dissolving the compound 5 into a solvent 5, adding iodobenzene diacetate (PhI(OAc)$_2$) and ammonium carbamate, carrying out a reaction for 30-35 min, and concentrating under reduced pressure to obtain a compound 6;

(6) dissolving the compound 6 and polyaldehyde into a solvent 6, heating up to 90-95° C., carrying out a reaction for 20-24 h, concentrating, extracting, collecting an organic phase, water-washing and drying the organic phase, filtering and concentrating to obtain a compound 7; and (7) dissolving the compound 7 and cesium carbonate (Cs$_2$CO$_3$) into a solvent 7, carrying out a reaction for 3-4 h at 40-50° C., filtering and concentrating to obtain the compound represented by the general formula I;

wherein, the solvents 1-7 are selected from: one or a combination of two or more of dichloromethane, acetone, tetrahydrofuran, methanol and formic acid.

10. A pharmaceutical composition, wherein the pharmaceutical composition comprises the compound represented by the general formula I or pharmaceutically acceptable salt thereof according to claim 1, and further comprises a pharmaceutically acceptable adjuvant.

11. A method of treating a disease associated with a JAK-STAT pathway, comprising administering to a human or animal the compound represented by the general formula I or pharmaceutically acceptable salt thereof according to claim 1.

12. A method of treating an inflammatory disease or cancer in a human or animal, comprising administering to the human or animal the compound represented by the general formula I or pharmaceutically acceptable salt thereof according to claim 1.

13. The method according to claim 12, wherein, the inflammatory disease comprises rheumatoid arthritis, canine dermatitis, psoriasis, ulcerative colitis or Crohn's disease; and the cancer comprises myelofibrosis, polycythemia vera, essential thrombocythemia, chronic granulocytic leukemia, breast cancer, lung cancer, or pancreatic cancer.

14. The compound or pharmaceutically acceptable salt thereof according to claim 4, wherein the Z is

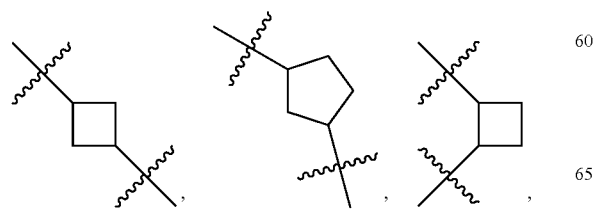

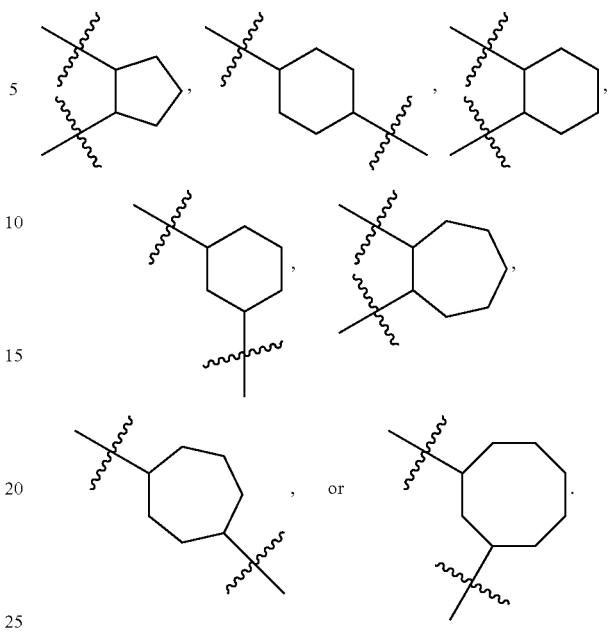

15. The compound or pharmaceutically acceptable salt according to claim 4, wherein the compound has the following structural formula:

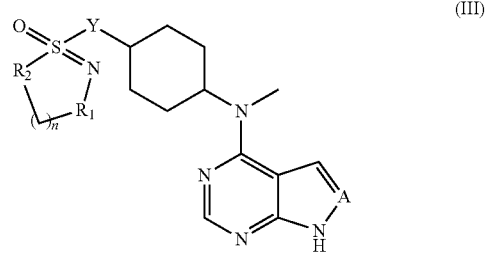

(III)

wherein, n is a positive integer of 1-4;

R$_1$ is —CH$_2$—; and

R$_2$ is —CH$_2$—.

16. The compound or pharmaceutically acceptable salt according to claim 15, wherein the compound is

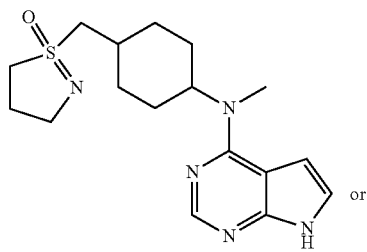

or

-continued

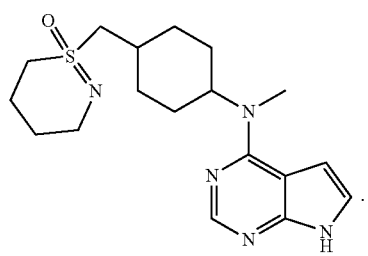

17. The compound or pharmaceutically acceptable salt according to claim 1, wherein the compound is

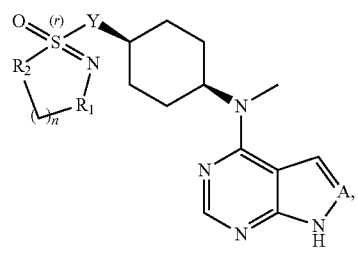
(III-A)

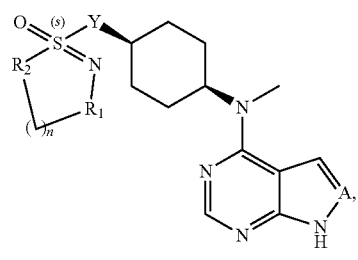
(III-B)

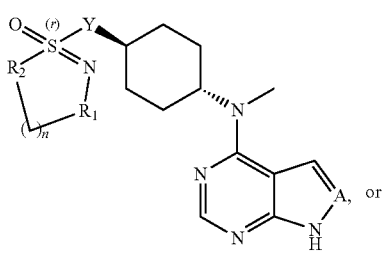
(III-C), or

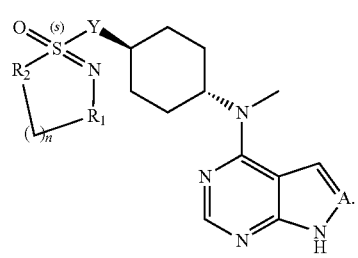
(III-D)

18. A deuterated compound of a compound represented by a general formula I, or a pharmaceutically acceptable salt thereof:

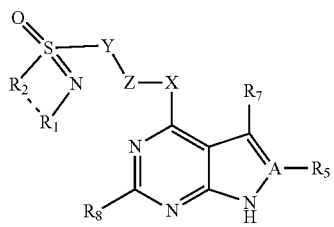
(I)

wherein A is selected from C or N; when A is N, $R_5$ is absent; and when A is C, $R_5$ is selected from: H, halogen, hydroxy, cyano, substituted or unsubstituted alkyl, substituted or unsubstituted haloalkyl, substituted or unsubstituted alkoxy, substituted or unsubstituted hydroxyalkyl, substituted or unsubstituted cycloalkyl, substituted or unsubstituted heterocycloalkyl, substituted or unsubstituted amino, substituted or unsubstituted sulfo, and substituted or unsubstituted sulfonyl;

X is selected from: —O— or

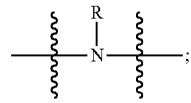

R is selected from: H, $C_{1-10}$ linear or branched alkyl, $C_{2-10}$ linear or branched alkenyl, $C_{2-10}$ linear or branched alkynyl, $C_{6-18}$ aryl, $C_{6-18}$ heterocycloaryl, $C_{3-10}$ cycloalkyl, —$OC_{0-10}$ alkyl, and —O heterocycloalkyl; H attached to carbon atoms can be substituted by the following groups: deutero, hydroxy, halogen, —CN, —OCH$_2$F, —OCHF$_2$, —OCF$_3$, $C_{1-10}$ linear or branched alkyl, —N($C_{0-10}$ alkyl)($C_{0-10}$ alkyl), —$OC_{0-10}$ alkyl, $C_{3-10}$ cycloalkyl, —O heterocycloalkyl, —N heterocycloalkyl, —S heterocycloalkyl, $C_{6-18}$ aryl, —N heterocycloaryl, —O heterocycloaryl, or —S heterocycloaryl; wherein, an alkyl moiety of the groups is optionally substituted by any one or more of the following groups: —SO$_2$, —SO$_2$N($C_{0-10}$ alkyl)($C_{0-10}$ alkyl), —N($C_{0-10}$ alkyl)SO$_2$($C_{0-10}$ alkyl), —CON($C_{0-10}$ alkyl)($C_{0-10}$ alkyl), —N($C_{0-10}$ alkyl)CO($C_{0-10}$ alkyl), —N($C_{0-10}$ alkyl)COO($C_{0-10}$ alkyl), —OCON($C_{0-10}$ alkyl)($C_{0-10}$ alkyl), halogen, —CN, —OCH$_2$F, —OCHF$_2$, —OCF$_3$, —N($C_{0-10}$ alkyl)($C_{0-10}$ alkyl), —$OC_{0-10}$ alkyl, $C_{6-18}$ aryl, —N heterocycloaryl, —O heterocycloaryl or —S heterocycloaryl;

Y is selected from:

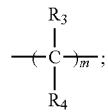

$R_3$ and $R_4$ are independently selected from: H, halogen, —CN, $C_{1-10}$ linear alkyl, $C_{3-10}$ cycloalkyl, —CF$_3$, —OCF$_3$, —OCHF$_2$, —OCH$_2$F, substituted or unsubstituted haloalkyl, substituted or unsubstituted aryl, substituted or unsubstituted alkenyl, substituted or unsubstituted alkynyl, —$OC_{0-10}$ alkyl, —S(O)$_{m1}C_{0-10}$ alkyl, —SO$_2$N($C_{0-10}$ alkyl)($C_{0-10}$ alkyl), —N($C_{0-10}$ alkyl)($C_{0-10}$ alkyl), —N($C_{0-10}$ alkyl)C(=O)($C_{0-10}$ alkyl), —N($C_{0-10}$ alkyl)C(=O)O($C_{0-10}$ alkyl), —N($C_{0-10}$ alkyl)C(=O)N($C_{0-10}$ alkyl), —C(=O)$C_{0-10}$ alkyl, —C(=O)O$C_{0-10}$ alkyl, —C(=O)N($C_{0-10}$ alkyl)($C_{0-10}$ alkyl), —O heterocycloalkyl, —N($C_{0-10}$ alkyl) heterocycloalkyl, —N($C_{0-10}$ alkyl) heterocycloaryl, —S heterocycloaryl or —O heterocycloaryl, wherein, the heterocycloalkyl can be substituted by any one or more of the following groups: oxygen, $C_{1-10}$ alkyl, $C_{2-10}$ alkenyl, $C_{2-10}$ alkynyl, $C_{6-18}$ aryl, C(=O)O$C_{0-10}$ alkyl, C(=O)N($C_{0-10}$ alkyl) ($C_{0-10}$ alkyl), —$SO_2$N($C_{0-10}$ alkyl)($C_{0-10}$ alkyl) or $SO_2C_{1-10}$ alkyl, wherein, the alkyl moiety is optionally substituted by any one or more of the following groups: hydroxy, —O$C_{1-10}$ alkyl, —N($C_{0-10}$ alkyl)($C_{0-10}$ alkyl), —C(=O)N($C_{0-10}$ alkyl)($C_{0-10}$ alkyl), C(=O)O$C_{0-10}$ alkyl, $C_{6-18}$ aryl, heterocycloalkyl or heterocycloaryl, m is 0, 1, 2, 3, 4, 5 or 6, and m1 is 0, 1, or 2;

Z is selected from: $C_{1-10}$ linear or branched alkyl, $C_{2-10}$ linear or branched alkenyl, $C_{2-10}$ linear or branched alkynyl, substituted or unsubstituted hydroxyalkyl, $C_{3-12}$ cycloalkyl, $C_{1-20}$ alkoxy, $C_{3-12}$ cycloalkoxy, heterocycloalkyl, $C_{6-18}$ aryl, —N heterocycloaryl, —S heterocycloaryl, —O heterocycloaryl, aromatic dicyclo, aromatic heterodicyclo, and tricyclo, wherein the alkyl moiety is optionally substituted by any one or more of the following groups: —N($C_{0-10}$ alkyl)($C_{0-10}$ alkyl), —CON($C_{0-10}$ alkyl)($C_{0-10}$ alkyl), —N($C_{0-10}$ alkyl)CO($C_{0-10}$ alkyl), —N($C_{0-10}$ alkyl)COO($C_{0-10}$ alkyl), —OCON($C_{0-10}$ alkyl)($C_{0-10}$ alkyl), halogen, —CN, —$OCH_2F$, —$OCHF_2$, —$OCF_3$, —$OC_{0-10}$ alkyl, $C_{6-18}$ alkyl, —N heterocycloaryl, —O heterocycloaryl or —S heterocycloaryl;

$R_1$ are $R_2$ are independently selected from: H, halogen, —CN, —$OCH_2F$, —$OCHF_2$, —$OCF_3$, $C_{1-10}$ linear or branched alkyl, $C_{3-10}$ cycloalkyl, —$OC_{0-10}$ alkyl, —N($C_{0-10}$ alkyl)($C_{0-10}$ alkyl), —O heterocycloalkyl, —N heterocycloalkyl, —S heterocycloalkyl, $C_{6-18}$ aryl, —N heterocycloaryl, —S heterocycloaryl or —O heterocycloaryl, wherein, H attached to carbon or nitrogen atoms can be substituted by the following groups: deutero, hydroxy, halogen, —CN, —$OCH_2F$, —$OCHF_2$, —$OCF_3$, $C_{1-6}$ linear alkyl, —N($C_{0-10}$ alkyl)($C_{0-10}$ alkyl), —$OC_{0-10}$ alkyl, $C_{3-10}$ cycloalkyl, —O heterocycloalkyl, —N heterocycloalkyl, —S heterocycloalkyl, $C_{6-18}$ aryl, —N heterocycloaryl, —O heterocycloaryl or —S heterocycloaryl; wherein H on the $C_{6-18}$ aryl or heterocycloaryl can be substituted by any one or more of the following groups: halogen, $C_{1-4}$ linear alkyl, —N($C_{0-10}$ alkyl)$SO_2$($C_{0-10}$ alkyl), —CON ($C_{0-10}$ alkyl)($C_{0-10}$ alkyl), —N($C_{0-10}$ alkyl)CO($C_{0-10}$ alkyl), —N($C_{0-10}$ alkyl)COO($C_{0-10}$ alkyl), —OCON ($C_{0-10}$ alkyl)($C_{0-10}$ alkyl), —CN, —$OCH_2F$, —$OCHF_2$, —$OCF_3$, —N($C_{0-10}$ alkyl)($C_{0-10}$ alkyl), —$OC_{0-10}$ alkyl, —N heterocycloaryl, —O heterocycloaryl or —S heterocycloaryl, or adjacent carbon atoms on the $C_{6-18}$ aryl and heterocycloaryl form $C_{3-8}$ cycloalkyl, —O heterocycloalkyl, —N heterocycloalkyl, —S heterocycloalkyl, —N heterocycloaryl, —O heterocycloaryl, or —S heterocycloaryl; or $R_1$, $R_2$, S and N atoms therebetween form a heterocyclic ring; and $R_7$ and $R_8$ are independently selected from: H, halogen, hydroxy, cyano, substituted or unsubstituted alkyl, substituted or unsubstituted alkenyl, substituted or unsubstituted alkynyl, substituted or unsubstituted haloalkyl, substituted or unsubstituted alkoxy, substituted or unsubstituted hydroxyalkyl, substituted or unsubstituted cycloalkyl, substituted or unsubstituted non-heterocycloaryl, substituted or unsubstituted heterocycloaryl, substituted or unsubstituted heterocycloalkyl, substituted or unsubstituted amino, substituted or unsubstituted sulfo, and substituted or unsubstituted sulfonyl.

* * * * *